United States Patent
Fujikawa et al.

(10) Patent No.: US 7,912,857 B2
(45) Date of Patent: Mar. 22, 2011

(54) DOCUMENT MANAGEMENT METHOD AND APPARATUS

(75) Inventors: Shinji Fujikawa, Yokohama (JP); Mikihiko Kamekawa, Matsudo (JP)

(73) Assignee: Canon Kabushiki Kaisha (JP)

( * ) Notice: Subject to any disclaimer, the term of this patent is extended or adjusted under 35 U.S.C. 154(b) by 406 days.

(21) Appl. No.: 12/037,641

(22) Filed: Feb. 26, 2008

(65) Prior Publication Data

US 2009/0006408 A1   Jan. 1, 2009

(30) Foreign Application Priority Data

Jun. 26, 2007   (JP) .................. 2007-168083

(51) Int. Cl.
*G06F 17/30* (2006.01)
(52) U.S. Cl. ........................ 707/782; 707/783
(58) Field of Classification Search .............. 707/783, 707/782
See application file for complete search history.

(56) References Cited

U.S. PATENT DOCUMENTS

| | | | |
|---|---|---|---|
| 6,279,000 B1 * | 8/2001 | Suda et al. ............ | 1/1 |
| 2002/0123913 A1 * | 9/2002 | Butterly et al. ........ | 705/6 |
| 2004/0030702 A1 * | 2/2004 | Houston et al. ........ | 707/10 |
| 2006/0190306 A1 * | 8/2006 | Ishibashi .............. | 705/5 |
| 2007/0282654 A1 * | 12/2007 | Sarkar ................. | 705/8 |
| 2008/0147695 A1 * | 6/2008 | Masek ................. | 707/101 |

FOREIGN PATENT DOCUMENTS

| | | |
|---|---|---|
| EP | 0462918 A2 | 12/1991 |
| JP | 11-85598 A | 3/1999 |

OTHER PUBLICATIONS

Karjoth, Gunter; "The Authorization Service of Tivoli Policy Director", IBM Research; Zurich Research Laboratory; pp. 319-328; Cited in search report issued in corresponding EP application No. 08151730.2, issued Jul. 10, 2008.

Tzelepi, Sofia et al. ; "A Flexible Role-Based Access Control Model for Multimedia Medical Image Database Systems"; XP-002486068 Informatics Laboratory Computers Division; pp. 335-346; Cited in search report issued in corresponding EP application No. 08151730.2, issued Jul. 10, 2008.

Extended search report issued in corresponding European application No. 08151730.2-1527, issued Jul. 10, 2008.

* cited by examiner

*Primary Examiner* — Jean B. Fleurantin
*Assistant Examiner* — Dennis Myint
(74) *Attorney, Agent, or Firm* — Rossi, Kimms & McDowell LLP

(57) ABSTRACT

A start date of check-out processing of setting a shared document accessible by a plurality of users via a network into an exclusive state is reserved as a check-out start date based on an instruction of a user. In the exclusive state, the shared document can be updated by the user but cannot be updated by other users. When current date has reached the check-out start date, the shared document is set into the exclusive state for the user. The shared document can be released from the exclusive state in response to an instruction of the user checking-out the shared document. An expected check-in date to release the shared document from the exclusive state after the check-out start date can be reserved. This invention enables reservation for a document operation and prevents any decrease in the operation efficiency of users.

20 Claims, 60 Drawing Sheets

| | 632 | 633 | 634 | 635 | 636 | 637 |
|---|---|---|---|---|---|---|
| 631 | DOCUMENT ID | RESERVED CHECK-OUT DATE | RESERVING USER ID | EXPECTED CHECK-IN DATE | PRECEDING RESERVATION TRACKING FLAG | STATUS |
| | | | | | | |
| | | | | | | | ~638
| | | | | | | |

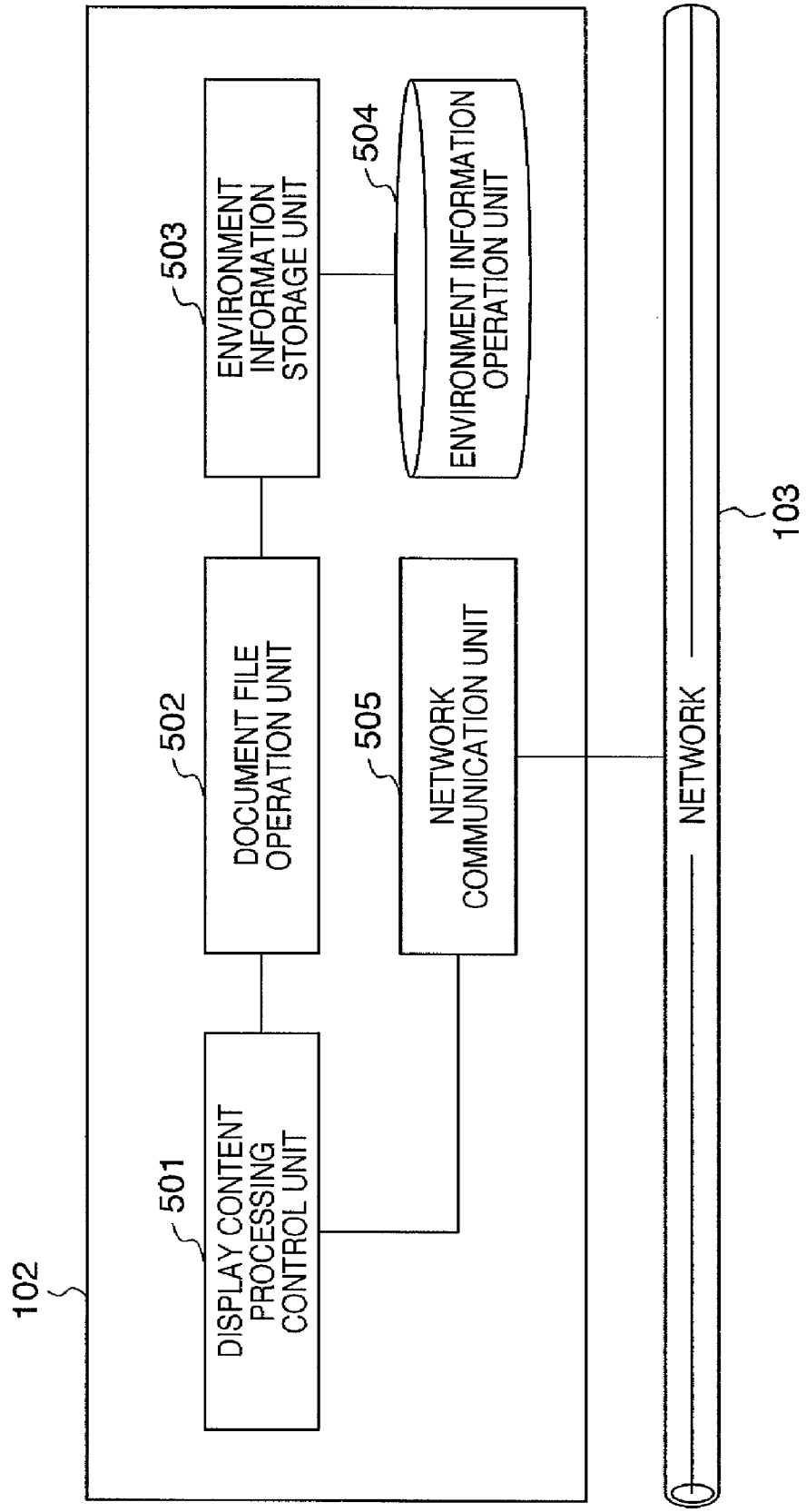

FIG. 6A

|  | 602 | 603 | 604 |  |
|---|---|---|---|---|
|  | DOCUMENT ID | DOCUMENT NAME | STATUS |  |
| 601 |  |  |  | 605 |
|  |  |  |  |  |

FIG. 6B

| DOCUMENT ID | VERSION ID | REGISTERED DATE | REGISTERING USER ID | FILE CONTENT |
|---|---|---|---|---|
| | | | | |
| | | | | |
| | | | | |

| DOCUMENT ID | CHECKED-OUT DATE | CHECKING-OUT USER ID |
|---|---|---|
|  |  |  |
|  |  |  |
|  |  |  |
|  |  |  |

FIG. 6D

| 632 | 633 | 634 | 635 | 636 | 637 |
|---|---|---|---|---|---|
| DOCUMENT ID | RESERVED CHECK-OUT DATE | RESERVING USER ID | EXPECTED CHECK-IN DATE | PRECEDING RESERVATION TRACKING FLAG | STATUS |
|  |  |  |  |  |  |
|  |  |  |  |  |  |
|  |  |  |  |  |  |

FIG. 6E

| USER ID | USER NAME | MAIL ADDRESS |
|---|---|---|
| A | USER A | user_a@domain.jp |
| B | USER B | user_b@domain.jp |
| C | USER C | user_c@domain.jp |
| D | USER D | user_d@domain.jp |
| E | USER E | user_e@domain.jp |

FIG. 7

DOCUMENT BROWSING

| DOCUMENT ID | DOCUMENT NAME | STATUS |
|---|---|---|
| 0001 | SPECIFICATION 01 | NORMAL |
| 0002 | PROPOSAL 01 | ON CHECKED-OUT |
| 0003 | REPORT A | NORMAL |
| 0004 | REPORT B | NORMAL |

[RESERVATION LIST] [CHECK-IN] [CHECK-OUT] [DETAILS]

FIG. 9

CHECK-OUT RESERVATION LIST — 901

| | | |
|---|---|---|
| DOCUMENT ID | | 0001 |
| DOCUMENT NAME | | SPECIFICATION 01 |
| STATUS | | NORMAL |

907 — RESERVED START DATE, 908 — RESERVED END DATE, 909 — RESERVING USER

| RESERVED START DATE | RESERVED END DATE | RESERVING USER |
|---|---|---|
| 2005/01/01 | 2005/01/04 | USER A |
| 2005/01/05 | 2005/01/10 | USER B |
| 2005/01/13 | 2005/01/15 | USER C |
| 2005/02/01 | - | USER D |

[ RETURN ] 910  [ CANCEL ] 911  [ RESERVE ] 912

FIG. 11

CHECK-OUT RESERVATION COMPLETION — 1101

| | 1102 | 1103 | 1104 | 1105 |
|---|---|---|---|---|
| DOCUMENT ID | 0001 | | | |
| DOCUMENT NAME | SPECIFICATION 01 | | | |
| RESERVED START DATE | 2005/01/25 | | | |
| RESERVED END DATE | 2005/01/28 | | | |

RETURN — 1106

FIG. 18

CHECK-IN COMPLETION

| | |
|---|---|
| DOCUMENT ID | 0002 |
| DOCUMENT NAME | PROPOSAL 01 |
| STATUS | NORMAL |
| LATEST VERSION ID | 05 |

1801, 1802, 1803, 1804, 1805

[RETURN] 1806

F I G. 21
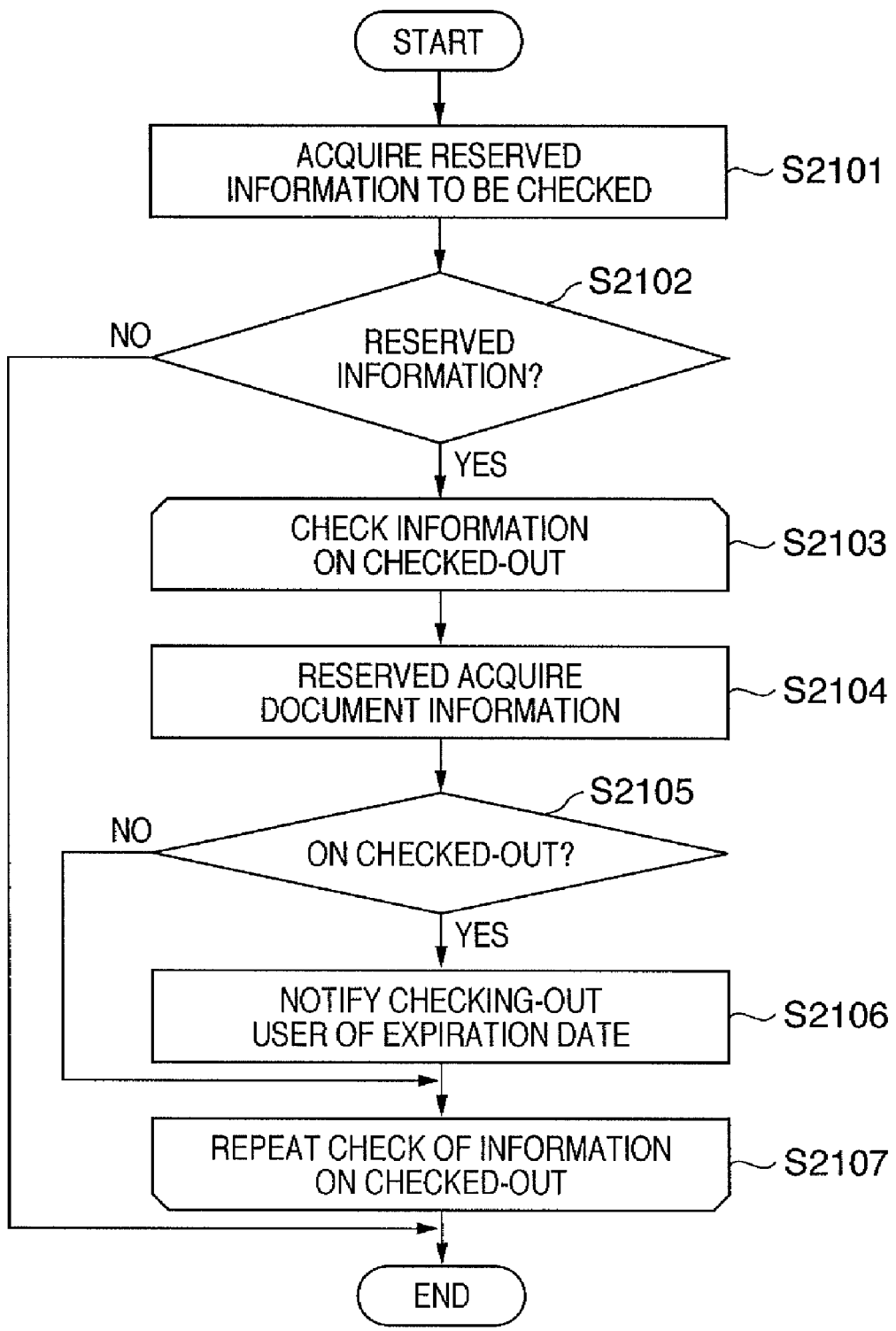

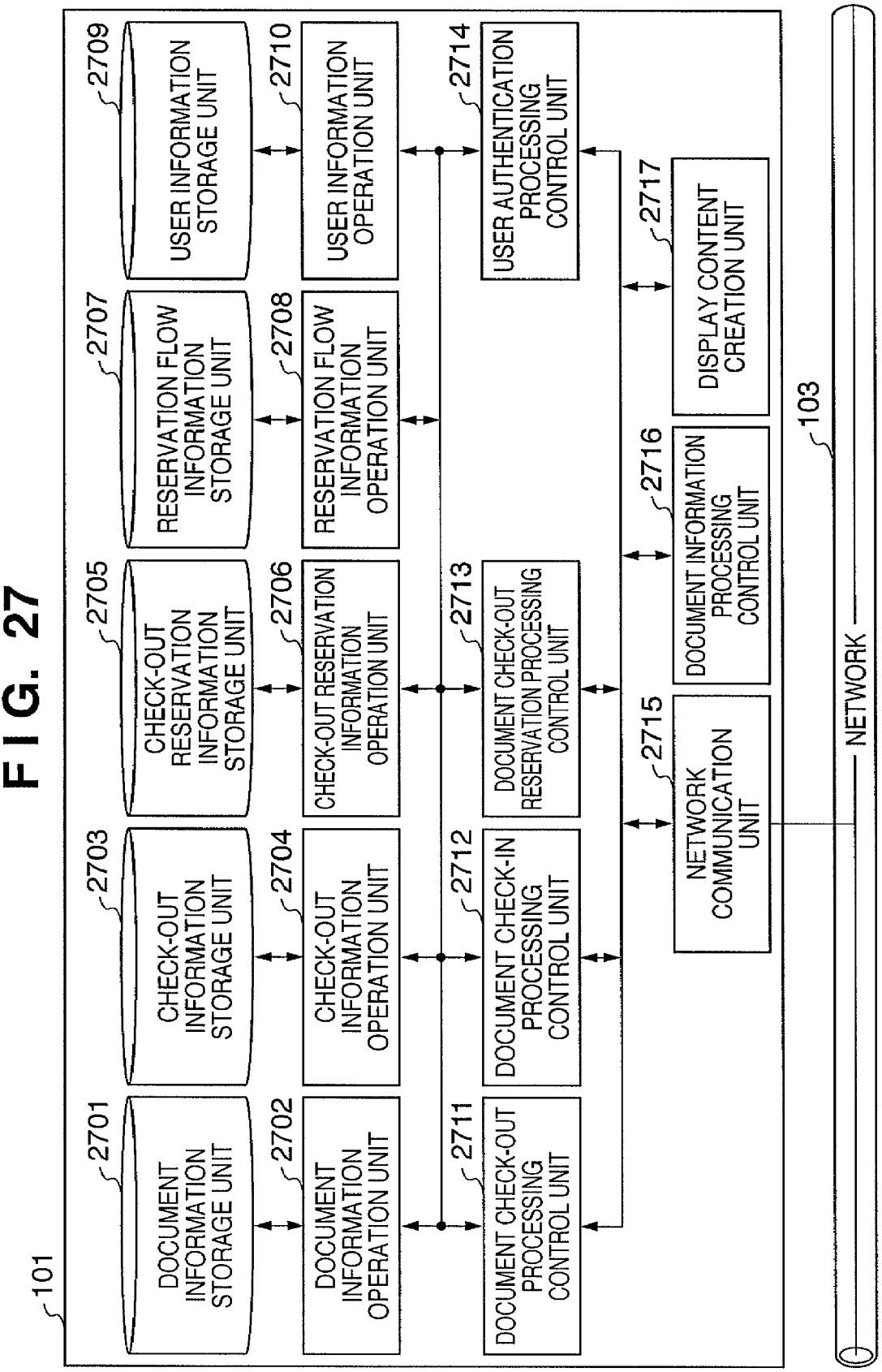

FIG. 28A

| DOCUMENT ID | DOCUMENT NAME | STATUS |
|---|---|---|
|  |  |  |
|  |  |  |

| DOCUMENT ID | VERSION ID | REGISTERED DATE | REGISTERING USER ID | FILE CONTENT |
|---|---|---|---|---|
| | | | | |
| | | | | |
| | | | | |

2812 — DOCUMENT ID
2813 — VERSION ID
2814 — REGISTERED DATE
2815 — REGISTERING USER ID
2816 — FILE CONTENT
2817, 2811

F I G. 28C
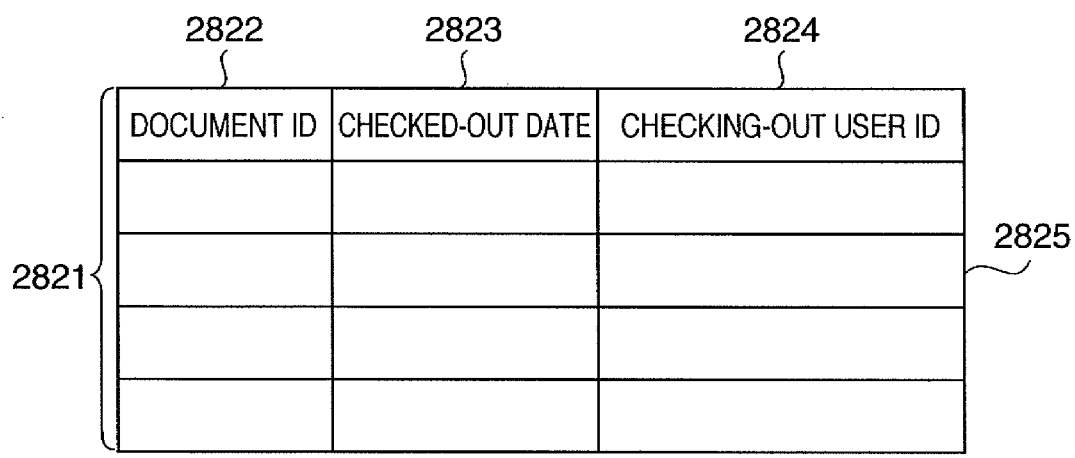

F I G. 28D

| RESERVATION ID | DOCUMENT ID | RESERVED CHECK-OUT DATE | RESERVING USER ID | EXPECTED CHECK-IN DATE | PRECEDING RESERVATION TRACKING FLAG | STATUS |
|---|---|---|---|---|---|---|
| | | | | | | |
| | | | | | | |
| | | | | | | |
| | | | | | | |

2832 — RESERVATION ID
2833 — DOCUMENT ID
2834 — RESERVED CHECK-OUT DATE
2835 — RESERVING USER ID
2836 — EXPECTED CHECK-IN DATE
2837 — PRECEDING RESERVATION TRACKING FLAG
2838 — STATUS
2831, 2839

F I G. 28F

| RESERVATION FLOW ID | FLOW ORDER | RESERVATION ID |
|---|---|---|
| | | |
| | | |
| | | |

FIG. 28G

| USER ID | USER NAME | MAIL ADDRESS |
|---|---|---|
| A | USER A | user_a@domain.jp |
| B | USER B | user_b@domain.jp |
| C | USER C | user_c@domain.jp |
| D | USER D | user_d@domain.jp |
| E | USER E | user_e@domain.jp |

FIG. 29

DOCUMENT BROWSING — 2901

| DOCUMENT ID | DOCUMENT NAME | STATUS |
|---|---|---|
| 0001 | SPECIFICATION 01 | NORMAL |
| 0002 | PROPOSAL 01 | ON CHECKED-OUT |
| 0003 | REPORT A | NORMAL |
| 0004 | REPORT B | NORMAL |

- 2903: DOCUMENT ID
- 2904: DOCUMENT NAME
- 2905: STATUS
- 2906: (highlighted row)
- 2902: (display area)
- 2907: RESERVATION LIST
- 2908: CHECK-IN
- 2909: CHECK-OUT
- 2910: DETAILS

FIG. 31

CHECK-OUT RESERVATION LIST — 3101

3102:
| DOCUMENT ID | 0001 |
| --- | --- |
| DOCUMENT NAME | SPECIFICATION 01 |
| STATUS | NORMAL |

3103: DOCUMENT ID
3104: DOCUMENT NAME
3105: STATUS

3106:
| RESERVED START DATE | RESERVED END DATE | RESERVING USER |
| --- | --- | --- |
| 2005/01/01 | 2005/01/04 | USER A |
| 2005/01/05 | 2005/01/10 | USER B |
| 2005/01/13 | 2005/01/15 | USER C |
| 2005/02/01 | - | USER D |

3107: RESERVED START DATE
3108: RESERVED END DATE
3109: RESERVING USER

3110: RETURN
3111: CANCEL
3112: RESERVE

FIG. 35

CHECK-OUT RESERVATION CANCELING — 3501

| | |
|---|---|
| DOCUMENT ID | 0001 — 3502 |
| DOCUMENT NAME | SPECIFICATION 01 — 3503 |
| RESERVED START DATE | 2005/01/25 — 3504 |
| RESERVED END DATE | 2005/01/28 — 3505 |

RETURN — 3506
CANCEL — 3507

FIG. 38

CHECK-OUT LIMITATION ACCEPTING  3801

| DOCUMENT ID | 0001 | 3802 |
| DOCUMENT NAME | SPECIFICATION 01 | 3803 |

3804: THIS DOCUMENT HAS BEEN RESERVED FROM 2005/01/25, SO CHECK-IN MUST BE DONE BEFORE 2005/01/24. OK?

CANCEL 3805    ACCEPT 3806

FIG. 41

CHECK-IN COMPLETION — 4101

| | | |
|---|---|---|
| DOCUMENT ID | 0002 | 4102 |
| DOCUMENT NAME | PROPOSAL 01 | 4103 |
| STATUS | NORMAL | 4104 |
| LATEST VERSION ID | 05 | 4105 |

RETURN — 4106

DOCUMENT MANAGEMENT METHOD AND APPARATUS

BACKGROUND OF THE INVENTION

1. Field of the Invention

The present invention relates to a document management method and apparatus. More particularly, the present invention relates to a document management method and apparatus in a document management system which allows a client apparatus on a network to update document information managed on the same network.

2. Description of the Related Art

A method of sharing documents in an environment connected via a network such as the Internet or an intranet is known. For example, there are systems which cause a client apparatus such as a PC to, by using a Web browser or dedicated client software, register, update, delete, and acquire document information and document files managed on a document management apparatus in which document management software is installed.

To use a general document management apparatus, a user must register user information to be managed by the apparatus and must be authenticated based on user identification information such as a user ID and password issued by the apparatus. The authenticated user information is used to check the access right for document browsing. Additionally, when the user registers or updates document information or document file, the authenticated user information is stored in association with the processed document information, thereby making an operation record.

As a general update method, the user designates a document and makes a declaration for document update, which is called "check-out", thereby excluding update by other users. After correcting the checked-out document, the user designates the corrected document and executes check-in processing. That is, the document in the checked-out state is set in an exclusive state to prevent update by any other user. The user executes the check-in processing to release the document from the exclusive state. This function is already known and imparted to many existing document management apparatuses (Japanese Patent Application Laid-Open No. 11-085598).

However, while a document is checked out for update, update processing by other users is excluded. The excluded users cannot update the document and must wait until the checking-out user checks in the document or releases it from the checked-out state. If, during a period in which an operator is expected to update a document with a due date, another user checks out the document, the operation efficiency becomes poor. That is, the operation remains undone because the operator must wait until the checking-out user checks in the document to enable the operator to check out the document.

Individual users cannot know the schedules of other users, that is, the expected check-out time and check-out target document of each user and the expected time of checking in the checked-out document. For example, assume that a document is currently being checked out by a user, and another user wants to check out the document when it is checked in. However, if still another user also wants to check out the document, he/she may check out the document first. It is therefore necessary before an operation to always monitor whether a document is released. This greatly decreases the user's operation efficiency.

Another problem is posed when a user needs to update a plurality of documents. To update a plurality of documents, normally, the user repeats the document check-out operation, document update operation, and document check-in operation a plurality of number of times. However, as described above, if another user can easily check out a target document, check-out by another user is often prevented in the following way. The user first checks out all documents to be updated and then repeats the document update operation and document check-in operation for each document.

In the method of checking out documents at once, however, the documents are left in the checked-out state until their turn for update comes. The later the order of document update is, the longer the time in which a document is left unprocessed is. The document is not necessarily being checked out during the period without processing. That is, if the user checks out the documents at once, many documents remain checked out for a time more than necessary. This consequently hinders other users who want to update the documents from checking out them. That is, the operation efficiency of other users decreases more than what is necessary.

SUMMARY OF THE INVENTION

The present invention has been made to solve the problems of the above-described prior art, and has as its object to provide a document management method and apparatus which enable reservation for a document operation and prevent any decrease in the operation efficiency of all users.

In order to solve the above-described problems, a document management apparatus of the present invention for storing, as a shared document in a storage unit, an electronic file accessible by a plurality of users via a network and managing the electronic file, comprises: a check-out start date reservation unit adapted to reserve, as a check-out start date, a start date of check-out processing of setting a shared document into an exclusive state based on an instruction by a user of the plurality of users, wherein in the exclusive state, the shared document can be updated by the user but cannot be updated by other users; a check-out unit adapted to set the shared document for which the check-out start date had been reserved into the exclusive state when current date has reached the check-out start date; and a check-in unit adapted to release the shared document from the exclusive state in response to an instruction of the user checking-out the shared document.

Also, a document management system of the present invention, including at least one client apparatus and a document management apparatus for storing, as a shared document in a storage unit, an electronic file accessible from the client apparatus by a plurality of users via a network and managing the electronic file, comprises: a check-out start date reservation unit adapted to reserve, as a check-out start date, a start date of check-out processing of setting a shared document into an exclusive state based on an instruction by a user of the plurality of users, wherein in the exclusive state, the shared document can be updated by the user but cannot be updated by other users; a check-out unit adapted to set the shared document for which the check-out start date is reserved into the exclusive state when current date has reached the check-out start date; and a check-in unit adapted to release the shared document from the exclusive state in response to an instruction of the user checking-out the shared document.

Further, a document management method of the present invention of storing, as a shared document in a storage unit, an electronic file accessible by a plurality of users via a network and managing the electronic file, comprises: a reservation step of reserving, as a check-out start date, a start date of check-out processing of setting a shared document into an exclusive state based on an instruction by a user of the plurality of users, wherein in the exclusive state, the shared document can be updated by the user but cannot be updated by other users; a check-out step of setting the shared document for which the check-out start date is reserved into the exclusive state when current date has reached the check-out start date; and a check-in step releasing the shared document from the exclusive state in response to an instruction of the user checking-out the shared document.

According to the present invention, it is possible to provide a document management method and apparatus which enable reservation for a document operation and prevent any decrease in the operation efficiency of all users.

More specifically, a means for causing a user to reserve check-out is prepared in a document management apparatus, thereby implementing smooth document management while minimizing the wait time and eliminating limitations by the document operation timing.

Additionally, a means for managing a plurality of check-out reservations as one flow and a means for correcting a check-out reservation in accordance with the actual operation state are prepared in the document management apparatus. This facilitates the check-out reservation operation of a plurality of documents and also allows to manage check-out reservations in accordance with the actual operation state.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a block diagram showing an example of the functional arrangement of the client apparatus according to the embodiment;

FIG. 6A is a view showing an example of the data structure of document information according to the first embodiment;

FIG. 6B is a view showing an example of the data structure of version information according to the first embodiment;

FIG. 6C is a view showing an example of the data structure of check-out information according to the first embodiment;

FIG. 6D is a view showing an example of the data structure of check-out reservation information according to the first embodiment;

FIG. 6E is a view showing an example of the data structure of user information according to the first embodiment;

FIG. 7 is a view showing an example of a document browsing screen according to the first embodiment;

FIG. 9 is a view showing an example of a check-out reservation list screen according to the first embodiment;

FIG. 11 is a view showing an example of a check-out reservation completion screen according to the first embodiment;

FIG. 18 is a view showing an example of a check-in completion screen according to the first embodiment;

FIG. 21 is a flowchart illustrating an example of a procedure of reserved check-out period end state confirmation processing according to the first embodiment;

FIG. 27 is a block diagram showing an example of the functional arrangement of a document management apparatus according to the second embodiment;

FIG. 28A is a view showing an example of the data structure of document information according to the second embodiment;

FIG. 28B is a view showing an example of the data structure of version information according to the second embodiment;

FIG. 28C is a view showing an example of the data structure of check-out information according to the second embodiment;

FIG. 28D is a view showing an example of the data structure of check-out reservation information according to the second embodiment;

FIG. 28F is a view showing an example of the data structure of reservation flow configuration information according to the second embodiment;

FIG. 28G is a view showing an example of the data structure of user information according to the second embodiment;

FIG. 29 is a view showing an example of a document browsing screen according to the second embodiment;

FIG. 31 is a view showing an example of a check-out reservation list screen according to the second embodiment;

FIG. 35 is a view showing an example of a check-out reservation canceling screen according to the second embodiment;

FIG. 38 is a view showing an example of a check-out limitation accepting screen according to the second embodiment;

FIG. 41 is a view showing an example of a check-in completion screen according to the second embodiment;

DESCRIPTION OF THE EMBODIMENTS

The best mode for carrying out the present invention will be described below in detail with reference to the accompanying drawings. The relative arrangement, data contents, and the like of the constituent elements described in the embodiment are not intended to limit the scope of the invention, unless otherwise specified.

First Embodiment

A document management apparatus according to the first embodiment of the present invention will be described below.

<Example of Configuration of Document Management System of Embodiment>

Figure 1:
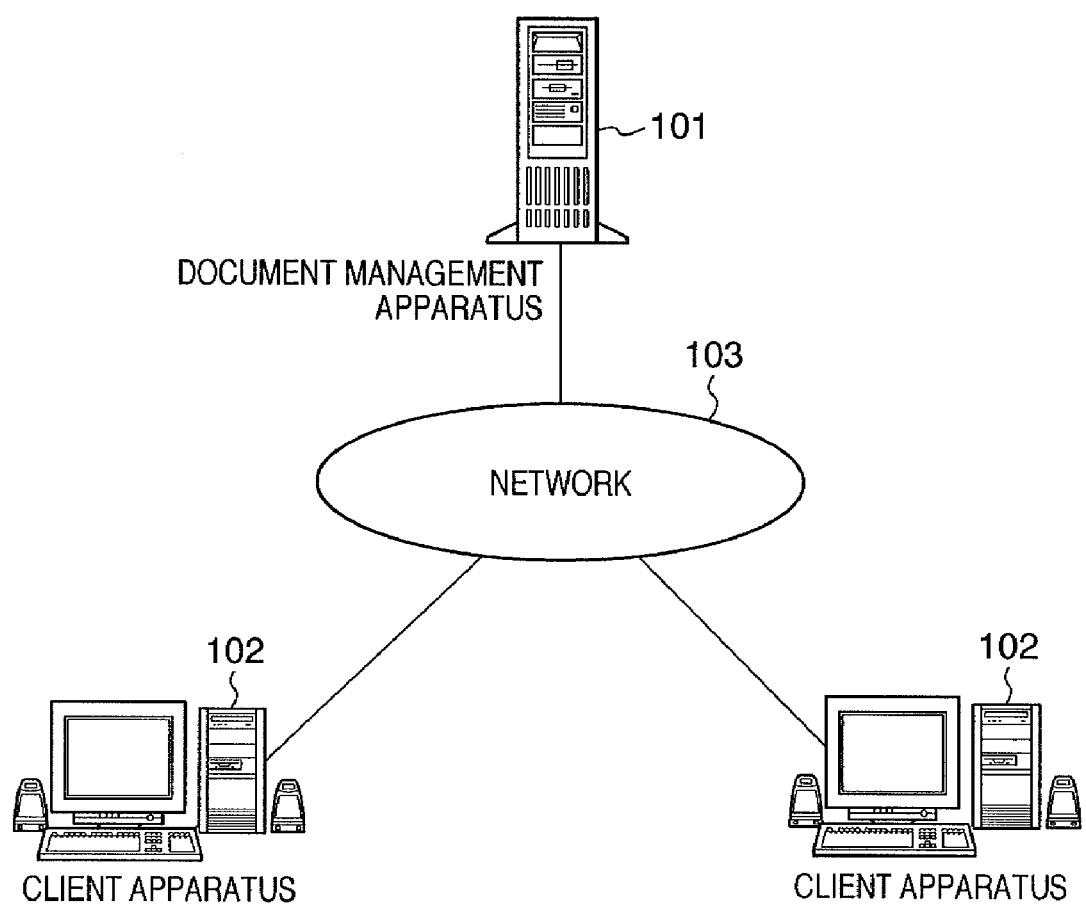
FIG. 1 is a block diagram showing an example of the device configuration of a document management system according to an embodiment.

FIG. 1 is a block diagram showing an example of the configuration of the entire system including the document management system according to this embodiment.

The document management system has a document management apparatus 101 which comprehensively manages documents that are electronic files, and a client apparatus 102 serving as an interface for operations such as document information display, registration, update, and deletion in the document management apparatus 101. The document management apparatus 101 and client apparatus (terminal) 102 are connected via a network 103.

The document management system does not necessarily include only one client apparatus 102 and can include a plurality of client apparatuses. The network 103 is an infrastructure to connect a plurality of devices and indicates a network system such as Ethernet@. The network 103 is used as a LAN (Local Area Network) or WAN (Wide Area Network).

Document data to be managed by the document management apparatus 101 are stored in the document management apparatus 101. Alternatively, the document data may exist in an independent storage device in the network 103 if the document management apparatus 101 can access it. In this embodiment, an explanation will be made assuming that document data are present in the document management apparatus 101. In the document management apparatus 101, the document data are managed as documents shared by a plurality of users.

<Example of Arrangement of Document Management Apparatus of Embodiment>

(Example of Hardware Configuration of Document Management Apparatus)

The hardware configuration of the document management apparatus 101 will be described with reference to the block diagram of FIG. 2.

Figure 2:
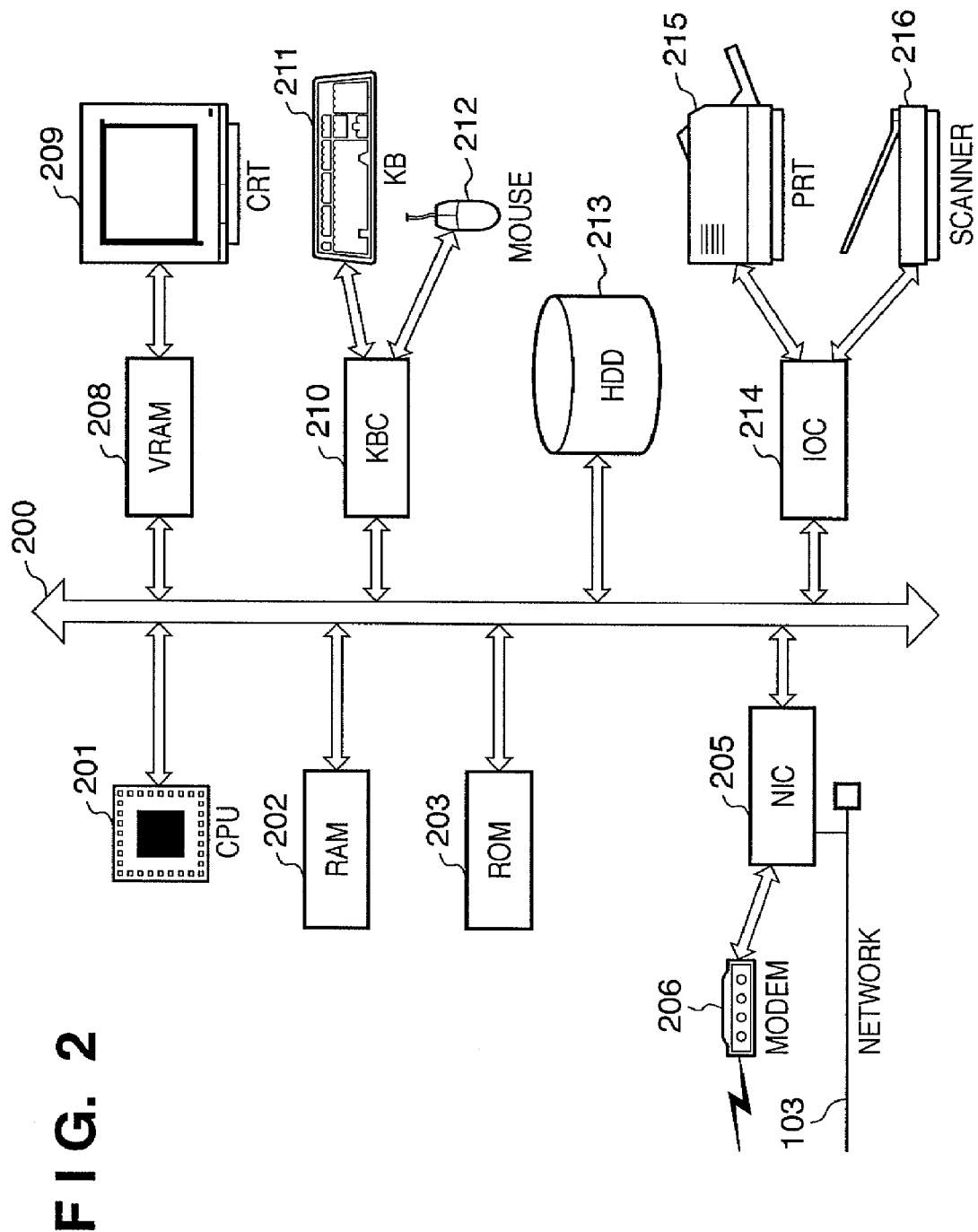
FIG. 2 is a block diagram showing an example of the hardware configuration of a document management apparatus according to the embodiment.

As shown in FIG. 2, the document management apparatus 101 comprises a CPU 201, RAM 202, ROM 203, NIC 205, VRAM 208, KBC 210, HDD 213, and IOC 214. These units are connected via a system bus 200 which transmits various kinds of data and control information.

The CPU 201 is a central processing unit which executes various kinds of control and operations of the document management apparatus 101. The RAM 202 is a random access memory which serves as the main memory of the CPU 201 and provides an executive program storage area, executive program execution area, and data storage area. The document management apparatus of this embodiment causes the computer to execute an executive program and makes the computer function as each processing unit (FIG. 3) of the present invention to be described later. Processing of each processing unit of the present invention is performed by executing the steps of flowcharts to be described later. In this embodiment, each processing unit is implemented by executing a computer program. However, the present invention is not limited to this. Some or all processing units may be implemented by dedicated electronic circuits (hardware).

The ROM 203 is a read-only memory which stores the operation processing procedure of the CPU 201. The ROM 203 stores a basic program (generally called a BIOS) to control the units of the document management apparatus 101 and information necessary for operating the system.

The NIC 205 is a controller which controls input and output signals between the document management apparatus and an external network. The NIC 205 is a communication controller used to connect the apparatus to a modem 206 or the network 103. The modem 206 is a communication device such as a modem or terminal adapter for ISDN connection, which is connected to the NIC 205 to transmit or receive data to or from another apparatus by using a public network.

The VRAM 208 is a video RAM which rasterizes image data to be displayed on a CRT 209 and controls display. The CRT 209 is a display device which is connected to the VRAM 208 to display various kinds of information of the document management apparatus 101. The CRT 209 is included in the document management apparatus 101 or separated from it. As the display device, a liquid crystal display device or touch-panel liquid crystal display device is also usable.

The KBC 210 is a controller which receives and controls an input signal from an input device such as a KB (keyboard) 211 or MOUSE 212 connected to the document management apparatus 101. The KB 211 and MOUSE 212 are input devices which receive information input by a user. The input unit of the above-described touch-panel liquid crystal display device is also usable in place of the input devices.

The HDD 213 is a hard disk drive which is used to store application programs, document data, and various management data to be used in the document management apparatus 101.

The IOC 214 is a controller which controls input/output signals of a scanner 216 serving as an information input device and a PRT (printer) 215 serving as an output device with respect to the document management apparatus 101. An external input or output device except the scanner 216 and PRT 215 and, for example, an information device such as an externally connected HDD or MO drive can also be connected. The PRT 215 is a printer to print electronic image data held in the document management apparatus 101. The scanner 216 is a reading device to read contents described on a surface of a paper document as electronic image data.

(Example of Functional Arrangement of Document Management Apparatus)

The functional arrangement of the document management apparatus 101 will be described next with reference to the block diagram of FIG. 3. Note that check-out indicates setting an exclusive state in which it is excluded for the other users to access the shared document, and check-in indicates resetting the exclusive state for releasing the shared document.

Figure 3:
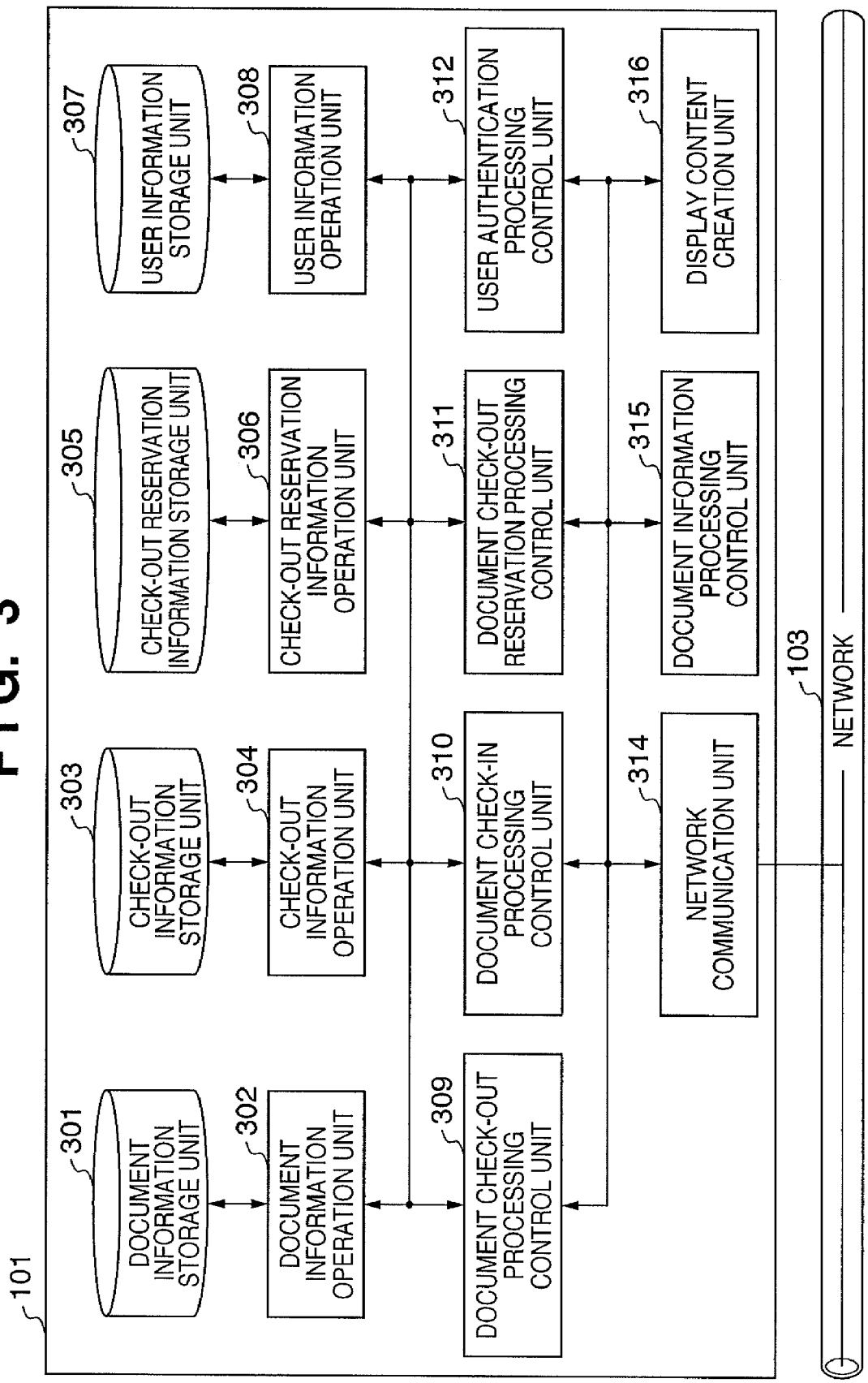
FIG. 3 is a block diagram showing an example of the functional arrangement of a document management apparatus according to the first embodiment.

As shown in FIG. 3, the document management apparatus 101 includes the following elements.

The document management apparatus includes a document information storage unit 301 and document information operation unit 302. The document management apparatus also includes a check-out information storage unit 303, check-out information operation unit 304, check-out reservation information storage unit 305, and check-out reservation information operation unit 306. The document management apparatus also includes a user information storage unit 307 and user information operation unit 308. These units 301-308 serve as an information processing portion.

The document management apparatus includes a document check-out processing control unit 309, document check-in processing control unit 310, document check-out reservation processing control unit 311, and user authentication processing control unit 312, which serve as a processing control portion.

The document management apparatus also includes a network communication unit 314, document information processing control unit 315, and display content creation unit 316.

The document information storage unit 301 is a place to store registered document information and document files and is allocated in the RAM 202 or HDD 213. The document information operation unit 302 includes an executable program which is stored in the RAM and executed by the CPU 201, and executes, for the document information storage unit 301, input and output processing such as registration, update, deletion, and acquisition of document information or a document file.

The check-out information storage unit 303 is a place to store check-out information of a document stored in the document information storage unit 301 and is allocated in the RAM 202 or HDD 213. The check-out information operation unit 304 includes an executable program which is stored in the RAM and executed by the CPU 201, and executes, for the check-out information storage unit 303, input and output processing such as registration, update, deletion, and acquisition of check-out information.

The check-out reservation information storage unit 305 is a place to store check-out reservation information of a document stored in the document information storage unit 301 and is allocated in the RAM 202 or HDD 213. The check-out reservation information operation unit 306 includes an executable program which is stored in the RAM and executed by the CPU 201, and executes, for the check-out reservation information storage unit 305, input and output processing such as registration, update, deletion, and acquisition of check-out reservation information.

The user information storage unit 307 is a place to store information of a user who uses the document management apparatus 101 and is allocated in the RAM 202 or HDD 213. The user information operation unit 308 includes an executable program which is stored in the RAM 202 and executed by the CPU 201, and executes, for the user information storage unit 307, input and output processing such as registration, update, deletion, and acquisition of user information.

The document check-out processing control unit 309 uses the document information operation unit 302, check-out information operation unit 304, check-out reservation information operation unit 306, user information operation unit 308, and display content creation unit 316. The document check-out processing control unit 309 controls check-out processing in response to a request of the document check-out processing transmitted from the client apparatus 102.

The document check-in processing control unit 310 uses the document information operation unit 302, check-out information operation unit 304, check-out reservation information operation unit 306, user information operation unit 308, and display content creation unit 316. The document check-in processing control unit 310 controls check-in processing in response to a request of the document check-in processing transmitted from the client apparatus 102.

The document check-out reservation processing control unit 311 uses the document information operation unit 302, check-out information operation unit 304, check-out reservation information operation unit 306, user information operation unit 308, and display content creation unit 316. The document check-out reservation processing control unit 311 controls check-out reservation processing in response to a request of the document check-out reservation processing transmitted from the client apparatus 102. The document check-out reservation processing control unit 311 corresponds to the check-out start date reservation unit or expected check-in date reservation unit of the present invention.

When connecting the client apparatus 102 to the document management apparatus 101, the user authentication processing control unit 312 executes user authentication processing using the check-out reservation information operation unit 306 and display content creation unit 316.

The network communication unit 314 is connected to the network 103 via the modem 206 or NIC 205 and transmits a processing request received from the client apparatus 102 via the network 103 to each processing control unit in the document management apparatus 101. The network communication unit 314 also transmits a processing result from each control unit in the document management apparatus 101 to the client apparatus 102.

The document information processing control unit 315 uses the document information operation unit 302, check-out information operation unit 304, and check-out reservation information operation unit 306. The document information processing control unit 315 creates the display contents of a document information details display screen 801 (to be described later) to be transmitted to the client apparatus 102.

The display content creation unit 316 performs creating and formatting of display contents on a document management screen to be provided to the client apparatus 102. Particularly, the display content creation unit 316 is assumed to provide display contents in accordance with the display form on the client side and create display contents in a hypertext format such as HTML or binary format for dedicated client software.

<Example of Arrangement of Client Apparatus of Embodiment>

(Example of Hardware Configuration of Client Apparatus)

The hardware configuration of the client apparatus 102 in FIG. 1 will be described with reference to the block diagram of FIG. 4.

Figure 4:
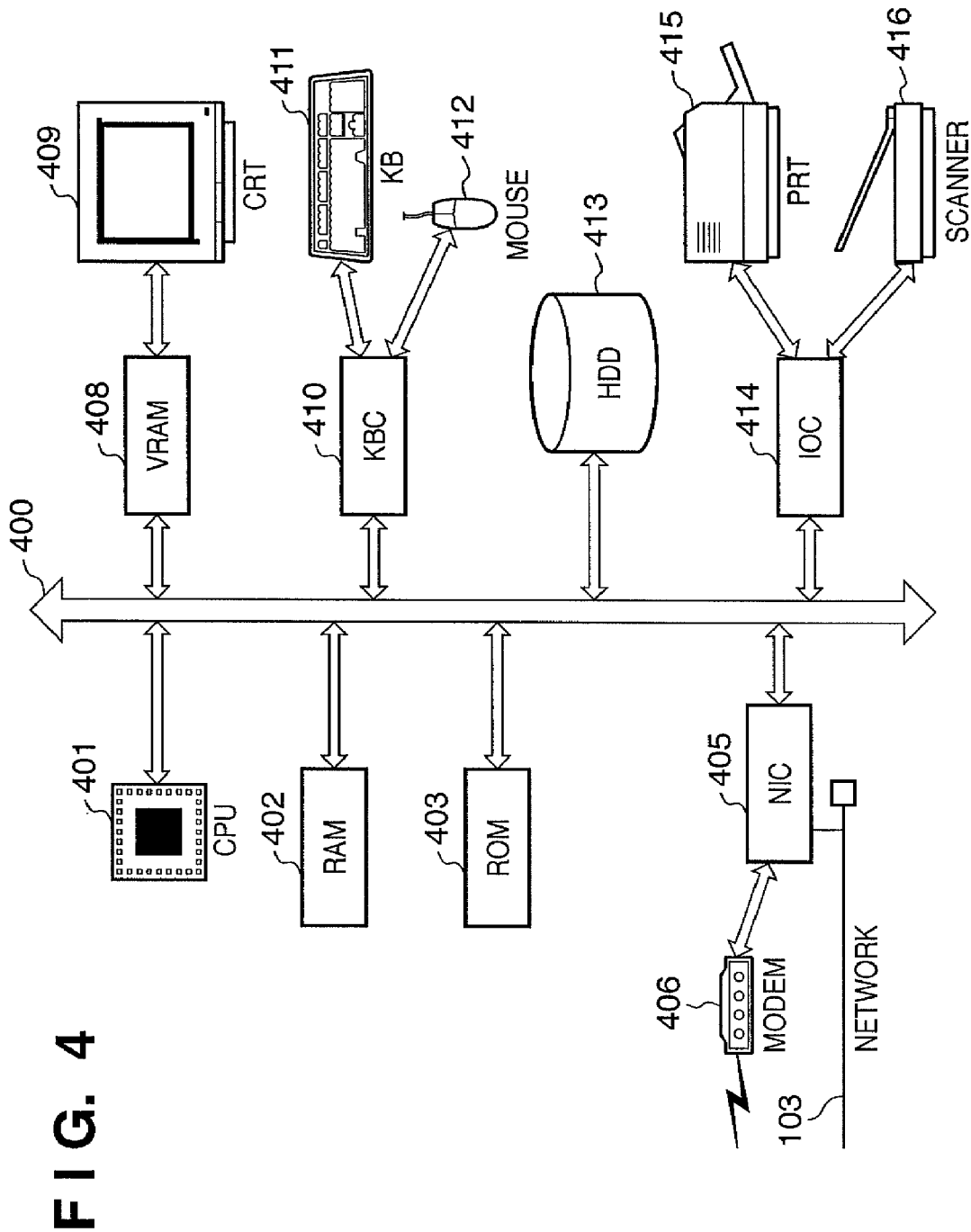
FIG. 4 is a block diagram showing an example of the hardware configuration of a client apparatus according to the embodiment.

As shown in FIG. 4, the client apparatus 102 comprises a CPU 401, RAM 402, ROM 403, NIC 405, VRAM 408, KBC 410, HDD 413, and IOC 414. These units are connected via a system bus 400 which transmits various kinds of data and control information.

The CPU 401 is a central processing unit which executes various kinds of control and operations of the client apparatus 102. The RAM 402 is a random access memory which serves as the main memory of the CPU 401 and provides an executive program storage area, executive program execution area, and data storage area. The ROM 403 is a read-only memory which stores the operation processing procedure of the CPU 401. The ROM 403 stores a basic program (generally called a BIOS) to control the units of the client apparatus 102 and information necessary for operating the system.

The NIC 405 is a controller which controls input and output signals between the document management apparatus and an external network. The NIC 405 is a communication controller used to connect the apparatus to a modem 406 or the network 103. The modem 406 is a communication device such as a modem or terminal adapter for ISDN connection, which is connected to the NIC 405 to transmit or receive data to or from another apparatus by using a public network.

The VRAM 408 is a video RAM which rasterizes image data to be displayed on a CRT 409 and controls display. The CRT 409 is a display device which is connected to the VRAM 408 to display various kinds of information of the client apparatus 102. The CRT 409 is included in the client apparatus 102 or separated from it. As the display device, a liquid crystal display device or touch-panel liquid crystal display device is also usable.

The KBC 410 is a controller which receives and controls an input signal from an input device such as a KB 411 or MOUSE 412 connected to the client apparatus 102. The KB 411 and MOUSE 412 are input devices which receive information input by a user. The input unit of the above-described touch-panel liquid crystal display device is also usable in place of the input devices.

The HDD 413 is a hard disk drive which is used to store application programs, document data, and various management data to be used in the client apparatus 102.

The IOC 414 is a controller which controls input/output signals of a scanner 416 serving as an information input device and a PRT 415 serving as an output device with respect to the client apparatus 102. An external input or output device except the scanner 416 and PRT 415 and, for example, an information device such as an externally connected HDD or MO drive can also be connected. The PRT 415 is a printer to print electronic image data held in the client apparatus 102. The scanner 416 is a reading device to read contents described on a surface of a paper document as electronic image data.

(Example of Functional Arrangement of Client Apparatus)

The functional arrangement of the client apparatus 102 will be described next with reference to the block diagram of FIG. 5.

As shown in FIG. 5, the client apparatus 102 includes a display content processing control unit 501, document file operation unit 502, environment information storage unit 503, environment information operation unit 504, and network communication unit 505.

The display content processing control unit 501 interprets display contents transmitted from the document management apparatus 101 and displays them on the CRT 409. The display content processing control unit 501 also executes processing control to transmit the contents of document information or a document file from the KB 411 or MOUSE 412 to the document management apparatus 101 via the network communication unit 505.

The document file operation unit 502 designates a document file to be registered in the document management apparatus by, for example, searching the HDD 413, RAM 402, or an external disk via the NIC 405.

The environment information storage unit 503 is a place to store connection destination information of the document management apparatus 101 to which the client apparatus 102 is connected and is allocated in the RAM 402 or HDD 413. The environment information operation unit 504 includes an executable program which is stored in the RAM 402 and executed by the CPU 401, and executes input and output processing of environment information for the environment information storage unit 503.

The network communication unit 505 is connected to the network via the modem 406 or NIC 405 and transmits a processing result received from the document management apparatus 101 via the network 103 to the display content processing control unit 501. The network communication unit 505 also transmits processing request contents from the display content processing control unit 501 to the document management apparatus 101.

<Formats and Configurations of Data Handled in Embodiment>

FIGS. 6A to 6E are views for explaining the formats and configurations of data used in this embodiment. Data items below are minimum necessary items for the explanation of the embodiment.

Figure 6A:
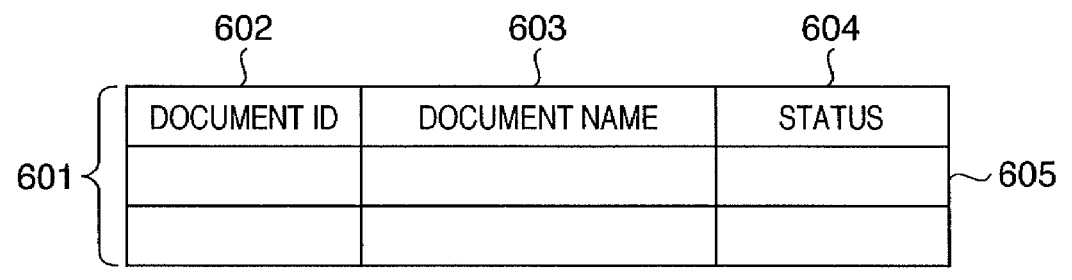
Figure 6B:
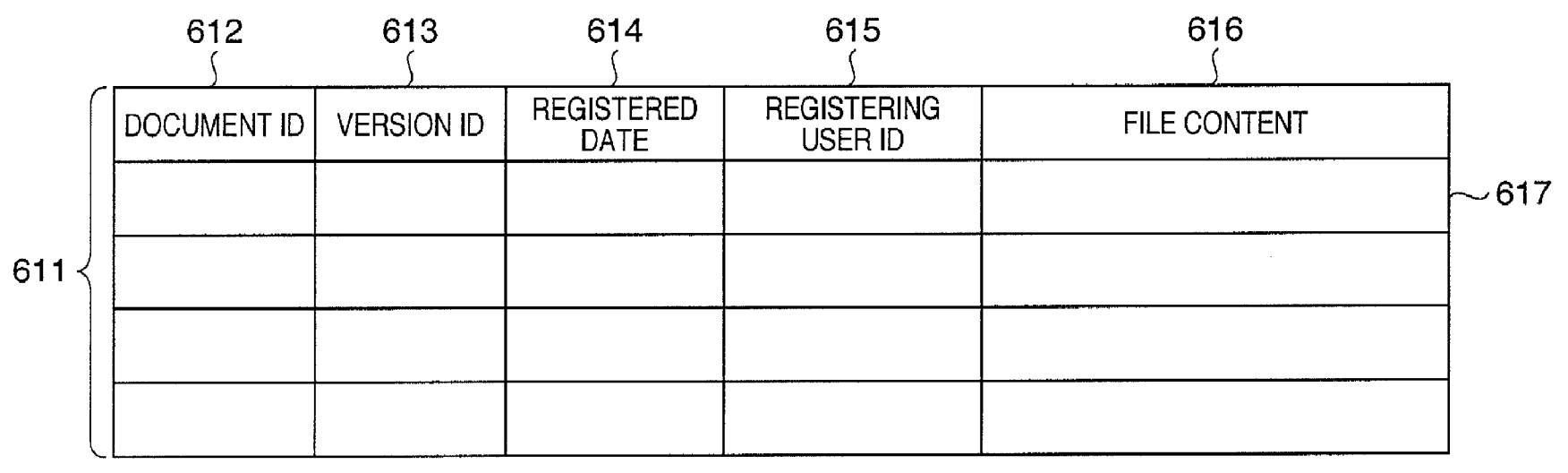

FIGS. 6A and 6B are views showing the formats and configurations of information stored in the document information storage unit 301 of the document management apparatus 101 shown in FIG. 3.

Document information 601 in FIG. 6A represents a format of information stored for each document.

The document information 601 is managed in a table including, as items, a document ID 602, document name 603, and status 604 representing a status. One of "normal", "abnormal", and "on checked-out" is set as a status value represented by the status 604.

Each piece of document information is specified as unique information based on the document ID 602. One unit stored in the document information 601 is expressed as a record 605.

Version information 611 in FIG. 6B represents a format of information stored for each version which changes every time the document is updated.

The version information 611 is managed in a table including, as items, a document ID 612, version ID 613, registered date 614, registering user ID 615, and file content 616. The document ID 612 is linked with the document ID 602 defined in the document information 601.

Each version information is specified using the document ID 612 and version ID 613. One unit stored in the version information 611 is expressed as a record 617. That is, document information with a single document ID is stored in the version information table as different records with different version IDs.

FIG. 6C is a view showing the format and configuration of information stored in the check-out information storage unit 303 of the document management apparatus 101 shown in FIG. 3.

Check-out information 621 represents a format for storing information of each document that is on checked-out.

The check-out information 621 is managed in a table including, as items, a document ID 622, checked-out date 623, and checking-out user ID 624. The document ID 622 is linked with the document ID 602 defined in the document information 601. Document information having information in this table is currently on checked-out.

Each piece of check-out information represents unique information based on the document ID 622. One unit stored in the check-out information 621 is expressed as a record 625.

FIG. 6D is a view showing the format and configuration of information stored in the check-out reservation information storage unit 305 of the document management apparatus 101 shown in FIG. 3.

Check-out reservation information 631 is managed in a table including, as items, a document ID 632, reserved check-out date 633, reserving user ID 634, expected check-in date 635, preceding reservation tracking flag 636, and status 637.

The document ID 632 is linked with the document ID 602 defined in the document information 601. One of "unprocessed", "on processing", "processed" is set as a status value represented by the status 637.

Document information which has information in this table currently has a check-out reservation. One unit stored in the check-out reservation information 631 is expressed as a record 638.

FIG. 6E is a view showing the format and configuration of information stored in the user information storage unit 307 of the document management apparatus 101 shown in FIG. 3.

User information 641 is information about a user who can access the document management apparatus 101 and operate a document.

The user information 641 is managed in a table including, as items, a user ID 642, user name 643, and mail address 644.

Each piece of user information is specified as unique information based on the user ID 642. The user information defined herein is used as the registering user ID 615 in FIG. 6B, the checking-out user ID 624 in FIG. 6C, or the reserving user ID 634 in FIG. 6D. One unit stored in the user information 641 is expressed as a record 645.

<Examples of Display Screens of Embodiment>

Screens which are displayed on the client apparatus 102 by the document management apparatus 101 used in this embodiment will be described next. On the screens to be described herein, minimum necessary contents are displayed but any other information can be displayed. The screen configurations and expression methods shown in the drawings are not particularly limited to those of the embodiment.

(Example of Document Browsing Screen)

FIG. 7 is a view showing an example of a document browsing screen displayed on the CRT 409 of the client apparatus 102 in FIG. 1.

A document browsing screen 701 in FIG. 7 is used to browse document information managed by the document management apparatus 101 and includes a document information display area 702 and buttons 707 to 710.

The document information display area 702 is an area to display a list of document information managed by the document management apparatus 101 and identify each document and includes, as displayed document information, a document ID 703, document name 704, and status 705. When the user of the client apparatus 102 selects document information from the document list, a selected document 706 changes its display manner to indicate that it is being selected.

The button 707 activates processing of displaying a list of check-out reservations (for example, FIG. 9) made for a document selected as the selected document 706. When the user presses the button 707, the document information of the selected document 706 in the document information display area 702 is transmitted to the document check-out reservation processing control unit 311.

The button 708 activates check-in processing (for example, FIG. 17) of a document (for this example, a document on checked-out is selected) selected as the selected document 706. When the user presses the button 708, the document information of the selected document 706 in the document information display area 702 is transmitted to the document check-in processing control unit 310.

The button 709 activates check-out processing of a document (for this example, a normal document that is not checked out is selected) selected as the selected document 706. When the user presses the button 709, the document information of the selected document 706 in the document information display area 702 is transmitted to the document check-out processing control unit 309.

The button 710 activates processing of displaying detailed information (for example, FIG. 8) of a document selected as the selected document 706. When the user presses the button 710, the information of the selected document 706 in the document information display area 702 is transmitted to the document information processing control unit 315.

(Example of Document Information Details Display Screen)

Figure 8:
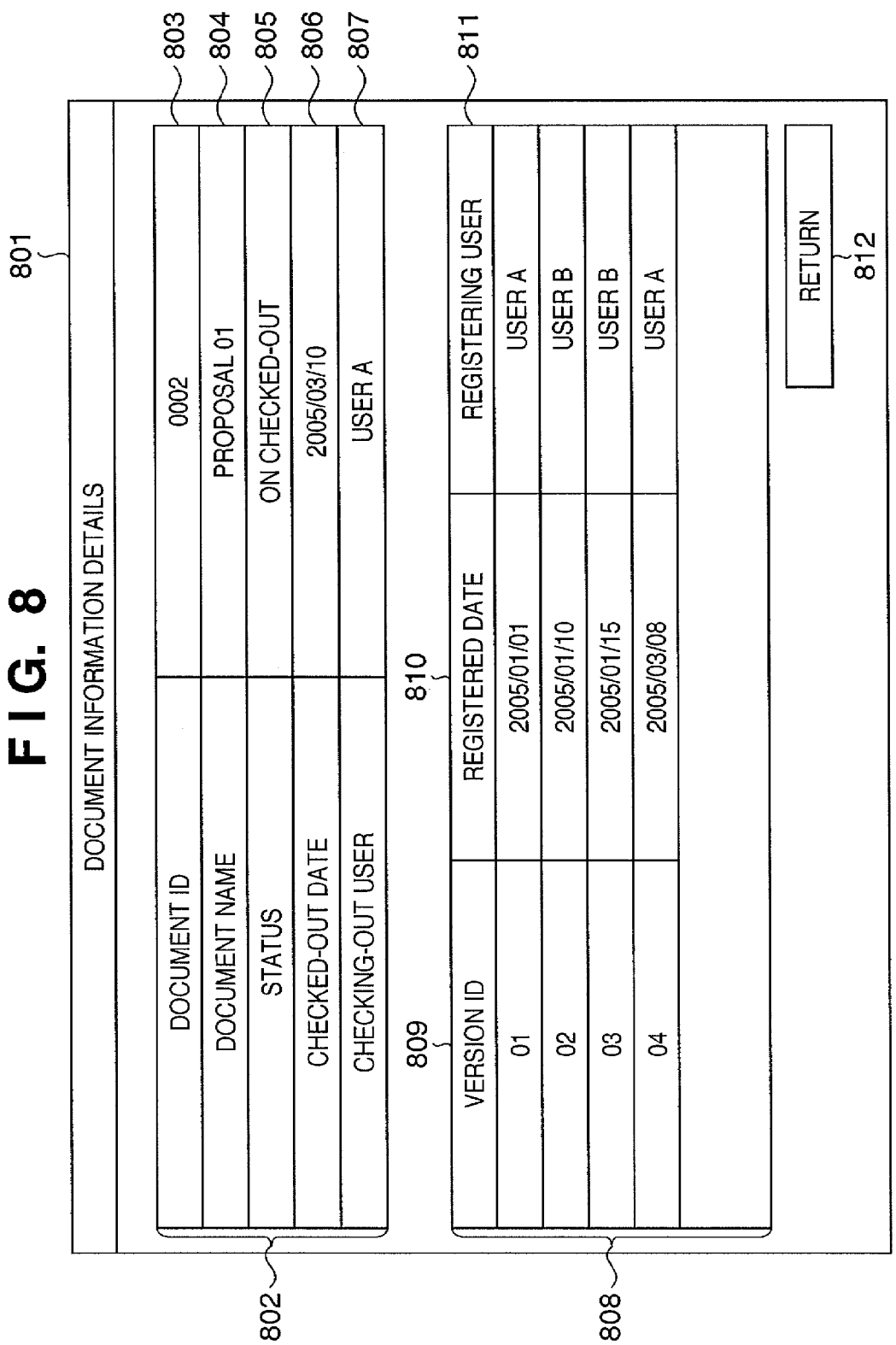
FIG. 8 is a view showing an example of a document information details display screen according to the first embodiment.

FIG. 8 is a view showing an example of a document information details display screen displayed on the CRT 409 of the client apparatus 102 in FIG. 1.

A document information details display screen 801 in FIG. 8 is used to display the detailed information of the selected document (which is "proposal 01 here") selected on the document browsing screen 701 when the user presses the button 710 in FIG. 7. The document information details display screen 801 includes a document information display area 802, document version information display area 808, and button 812.

The document information display area 802 is an area to display information held by a document and the state of the document and includes a document ID 803, document name 804, status 805, checked-out date 806, and checking-out user 807. The checked-out date 806 and checking-out user 807 are displayed only when the status 805 is "on checked-out".

The document version information display area 808 is an area to display the log of version information updated for a document and includes a version ID 809, registered date 810, and registering user 811.

The button 812 finishes the screen. When the user presses the button 812, the screen returns to the document browsing screen 701 in FIG. 7.

(Example of Check-Out Reservation List Screen)

FIG. 9 is a view showing an example of a check-out reservation list screen 901 displayed on the CRT 409 of the client apparatus 102 in FIG. 1.

The check-out reservation list screen 901 in FIG. 9 is used to display check-out reservation information set for the selected document (which is "specification 01" here) selected on the document browsing screen 701 when the user presses the button 707 in FIG. 7. The check-out reservation list screen 901 includes a document information display area 902, check-out reservation information display area 906, and buttons 910 to 912.

The document information display area 902 is an area to display information held by a document and the state of the document and includes a document ID 903, document name 904, and status 905.

The check-out reservation information display area 906 includes a reserved start date 907 as a check-out start date, a reserved end date 908 as an expected check-in date, and a reserving user 909. The data displayed here are pieces of check-out reservation information related to a document designated by the document ID 903 registered in the check-out reservation information 631 in FIG. 6D and are displayed in ascending order of reserved start dates 907. The interval between the reserved start date 907 and the reserved end date 908 is the expected period for performing check-out.

The button 910 finishes the screen. When the user presses the button 910, the screen returns to the document browsing screen 701 in FIG. 7.

The button 911 activates processing of canceling (deleting) check-out reservation information displayed in the check-out reservation information display area 906. The user selects one of pieces of reservation information displayed on the check-out reservation information display area 906 and presses the button 911. With this operation, the selected reservation information is transmitted to the document check-out reservation processing control unit 311 of the document management apparatus 101. The screen changes to a check-out reservation canceling screen 1201 in FIG. 12. This processing corresponds to check-out reservation cancel processing.

The button 912 activates processing of adding a check-out reservation related to the document ID 903. When the user presses the button 912, the document information displayed on this screen is transmitted to the document check-out reservation processing control unit 311 of the document management apparatus 101. The screen changes to a check-out reservation setting screen 1001 in FIG. 10.

(Example of Check-Out Reservation Setting Screen)

Figure 10:
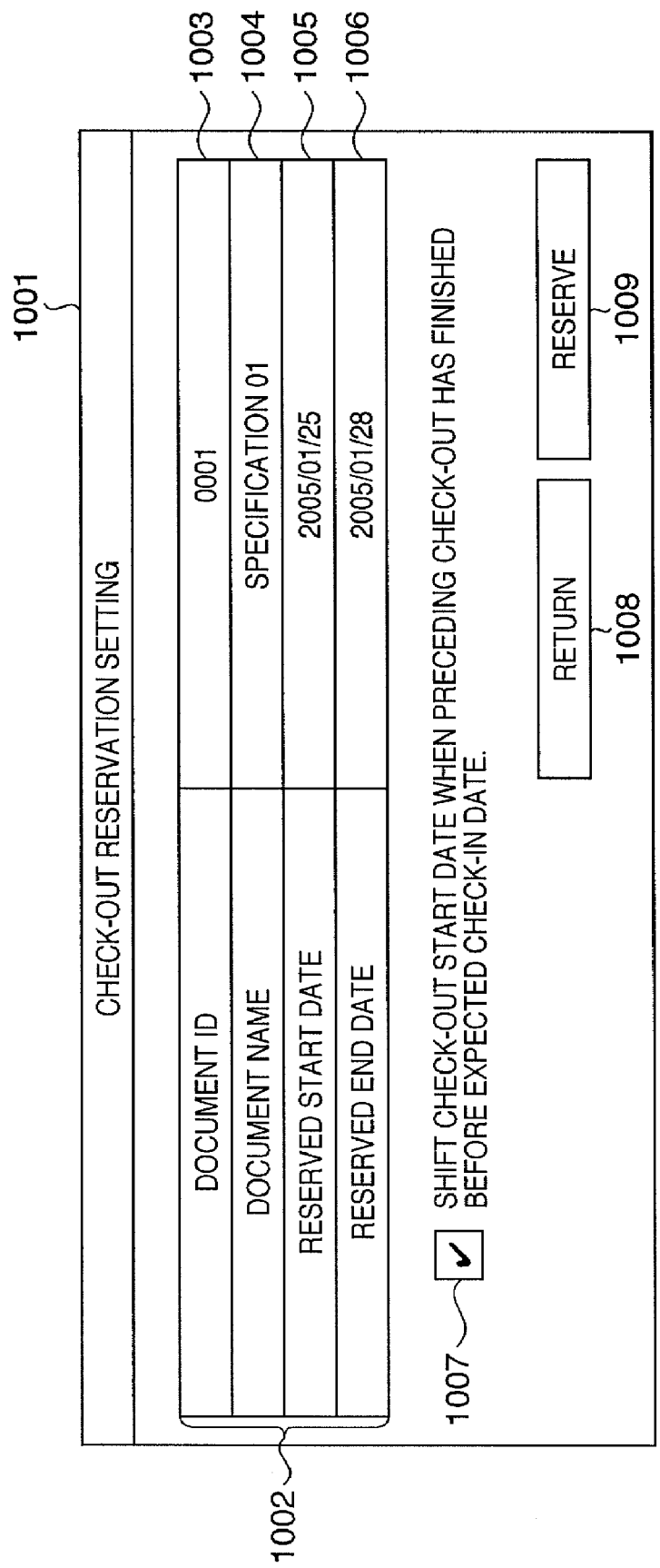
FIG. 10 is a view showing an example of a check-out reservation setting screen according to the first embodiment.

FIG. 10 is a view showing an example of a check-out reservation setting screen displayed on the CRT 409 of the client apparatus 102 in FIG. 1.

The check-out reservation setting screen 1001 in FIG. 10 is used as a setting screen to add a check-out reservation for the document displayed on the check-out reservation list screen 901 in FIG. 9. The check-out reservation setting screen 1001 includes a check-out reservation setting information display area 1002, check box 1007, and buttons 1008 and 1009.

The check-out reservation setting information display area 1002 includes a document ID 1003, document name 1004, reserved start date 1005, and reserved end date 1006. The reserved start date 1005 and reserved end date 1006 are in an input enable state to make the user designate the reserved period. The user designates expected start and end dates using a predetermined format (year, month, and day in this example).

The check box 1007 is used to designate whether to advance a start of reserved check-out if the previous check-out reservation is canceled, or the document is checked-in before the reserved end date. When the check box 1007 has a check mark, the next check-out starts immediately after the end of the previous check-out reservation. When the check box 1007 has no check mark, check-out is not performed until the designated reserved start date.

The button 1008 cancels the set contents on the screen and changes the screen to the check-out reservation list screen 901 in FIG. 9.

The button 1009 activates processing of registering the check-out reservation information set on the screen. When the user presses the button 1009, the check-out reservation information input to the screen is transmitted to the document check-out reservation processing control unit 311 of the document management apparatus 101. The document management apparatus 101 registers the check-out reservation information in the check-out reservation information storage unit 305. Then, the screen changes to a check-out reservation completion screen 1101 in FIG. 11.

Figure 13:
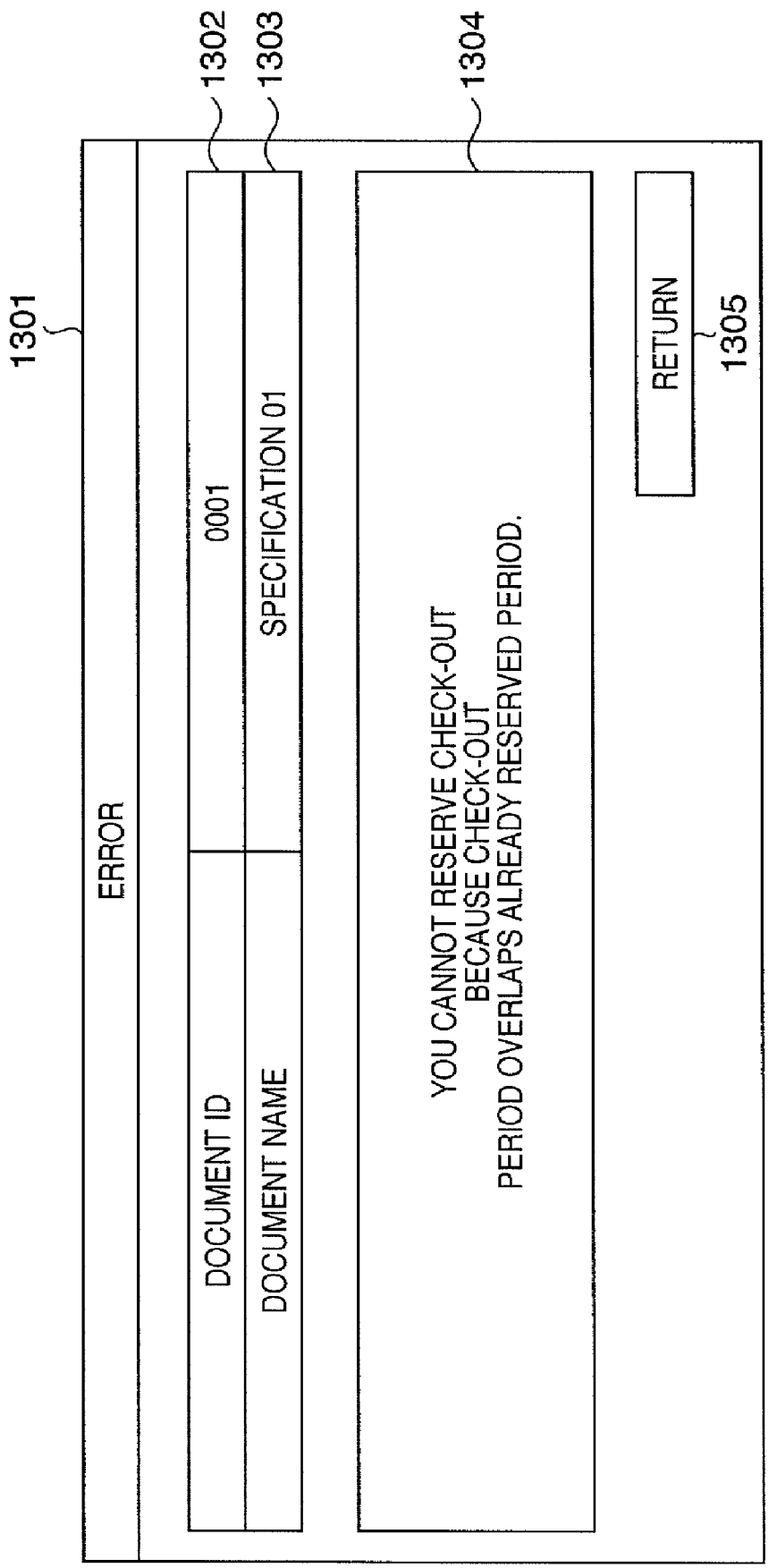
FIG. 13 is a view showing an example of an error screen according to the first embodiment.

If an error has occurred during the processing of the document check-out reservation processing control unit 311, the screen changes to an error screen 1301 in FIG. 13. The sequence of this processing will be described later in detail with reference to FIG. 20.

(Example of Check-Out Reservation Completion Screen)

FIG. 11 is a view showing an example of the check-out reservation completion screen 1101 displayed on the CRT 409 of the client apparatus 102 in FIG. 1.

The check-out reservation completion screen 1101 in FIG. 11 is used to display the result of the document check-out reservation processing activated by pressing the button 1009 on the check-out reservation setting screen 1001 in FIG. 10. The check-out reservation completion screen 1101 includes a document ID 1102, document name 1103, reserved start date 1104, reserved end date 1105, and button 1106.

The document ID 1102, document name 1103, reserved start date 1104, and reserved end date 1105 are display areas to notify the user of the registered check-out reservation information.

The button 1106 finishes the screen. When the user presses the button 1106, the screen returns to the check-out reservation list screen 901 in FIG. 9.

(Example of Check-Out Reservation Canceling Screen)

Figure 12:
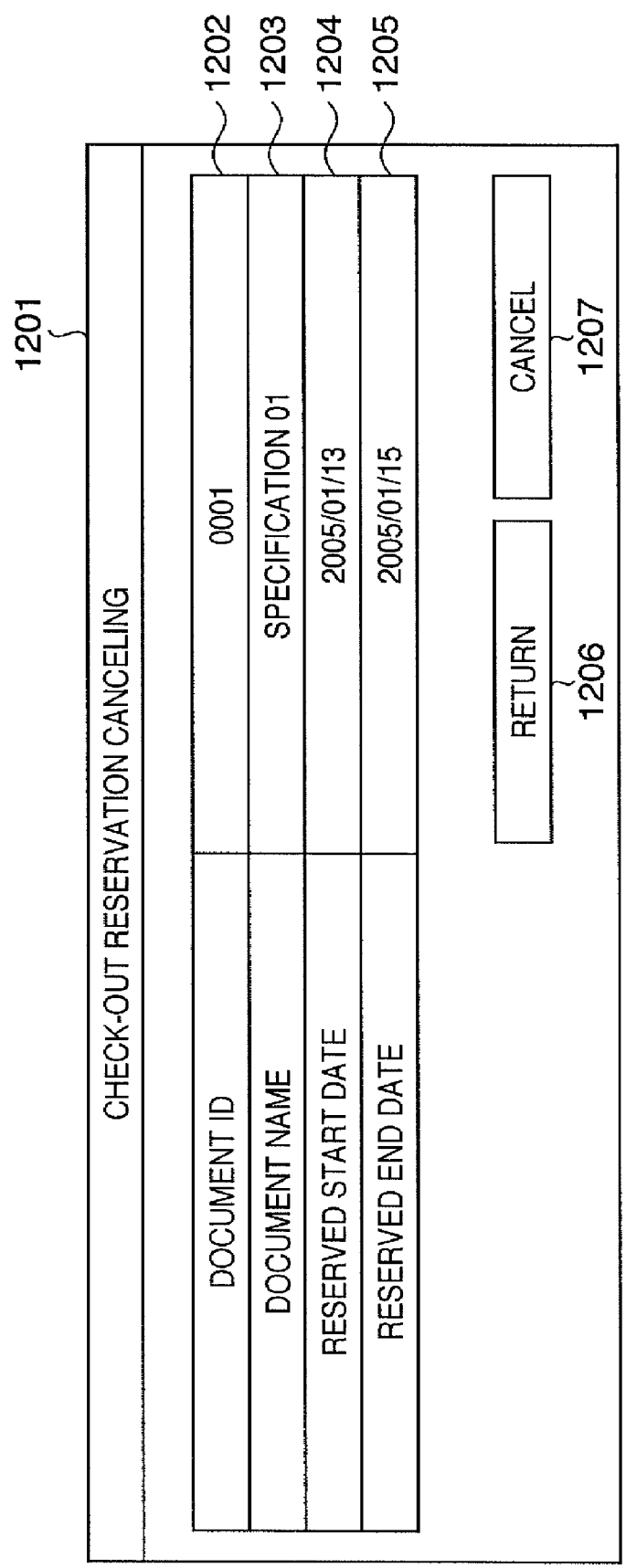
FIG. 12 is a view showing an example of a check-out reservation canceling screen according to the first embodiment.

FIG. 12 is a view showing an example of the check-out reservation canceling screen 1201 displayed on the CRT 409 of the client apparatus 102 in FIG. 1.

The check-out reservation canceling screen 1201 in FIG. 12 is used as a confirmation screen in canceling check-out reservation information displayed on the check-out reservation list screen 901 in FIG. 9. The check-out reservation canceling screen 1201 includes a document ID 1202, document name 1203, reserved start date 1204, reserved end date 1205, and buttons 1206 and 1207.

The document ID 1202, document name 1203, reserved start date 1204, and reserved end date 1205 are areas to display cancel target reservation information from the document information in FIG. 6A and the check-out reservation information in FIG. 6D. The displayed contents represent the contents selected in the check-out reservation information display area 906 of the check-out reservation list screen 901 in FIG. 9.

The button 1206 is used to cancel the processing of canceling the reservation information displayed on the screen. When the user presses the button 1206, the screen returns to the check-out reservation list screen 901 in FIG. 9 without executing the reservation cancel processing.

The button 1207 activates processing of canceling (deleting) the check-out reservation information displayed on the screen. When the user presses the button 1207, the check-out reservation information displayed on the screen is transmitted to the document check-out reservation processing control unit 311 of the document management apparatus 101 and deleted from the check-out reservation information storage unit 305. Then, the screen changes to the check-out reservation list screen 901 in FIG. 9. After deletion of the reservation information, if a reservation follows the canceled reservation, reserved period shifting processing is done in accordance with the contents of the reservation before the screen changes to the check-out reservation list screen 901.

If an error has occurred during the processing of the document check-out reservation processing control unit 311, the screen changes to the error screen 1301 in FIG. 13.

(Example of Error Screen)

FIG. 13 is a view showing an example of the error screen 1301 displayed on the CRT 409 of the client apparatus 102 in FIG. 1.

The error screen 1301 in FIG. 13 is used to display, on the client apparatus 102, error contents when an error has occurred during each processing executed in the document management apparatus 101. The error screen 1301 includes a document ID 1302 of the target document with an error, document name 1303, error message display area 1304, and button 1305.

The document ID 1302 and document name 1303 are areas to display the target document information with the error. The error message display area 1304 displays the contents of the error that has occurred. The message displayed here need not always be a character string and can be any other means such as an image.

The button 1305 finishes the screen. When the user presses the button 1305, the screen returns to the document browsing screen 701 in FIG. 7 or the check-out reservation list screen 901 in FIG. 9.

(Example of Check-Out Screen)

Figure 14:
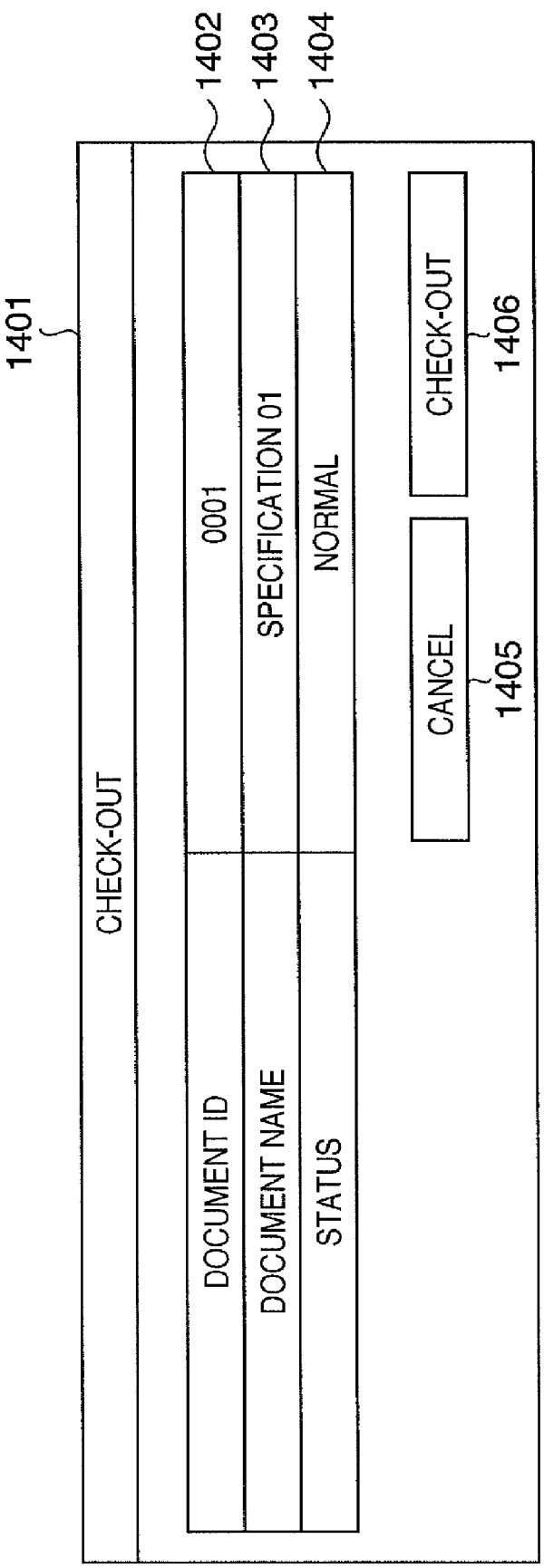
FIG. 14 is a view showing an example of a check-out screen according to the first embodiment.

FIG. 14 is a view showing an example of a check-out screen 1401 displayed on the CRT 409 of the client apparatus 102 in FIG. 1.

A check-out screen 1401 in FIG. 14 is used to confirm the check-out processing of the selected document 706 selected on the document browsing screen 701 in FIG. 7. The check-out screen 1401 includes a document ID 1402, document name 1403, status 1404, and buttons 1405 and 1406.

The document ID 1402, document name 1403, and status 1404 are areas to display the latest information, at the time of displaying this screen, of the selected document 706 selected on the document browsing screen 701 in FIG. 7.

The button 1405 is used to cancel the processing of checking out the document information displayed on the screen. When the user presses the button 1405, the screen returns to the document browsing screen 701 in FIG. 7 without executing the check-out processing.

The button 1406 activates processing of checking out the document indicated by the document ID 1402. When the user presses the button 1406, the document information displayed on the screen is transmitted to the document check-out processing control unit 309 of the document management apparatus 101.

Figure 15:
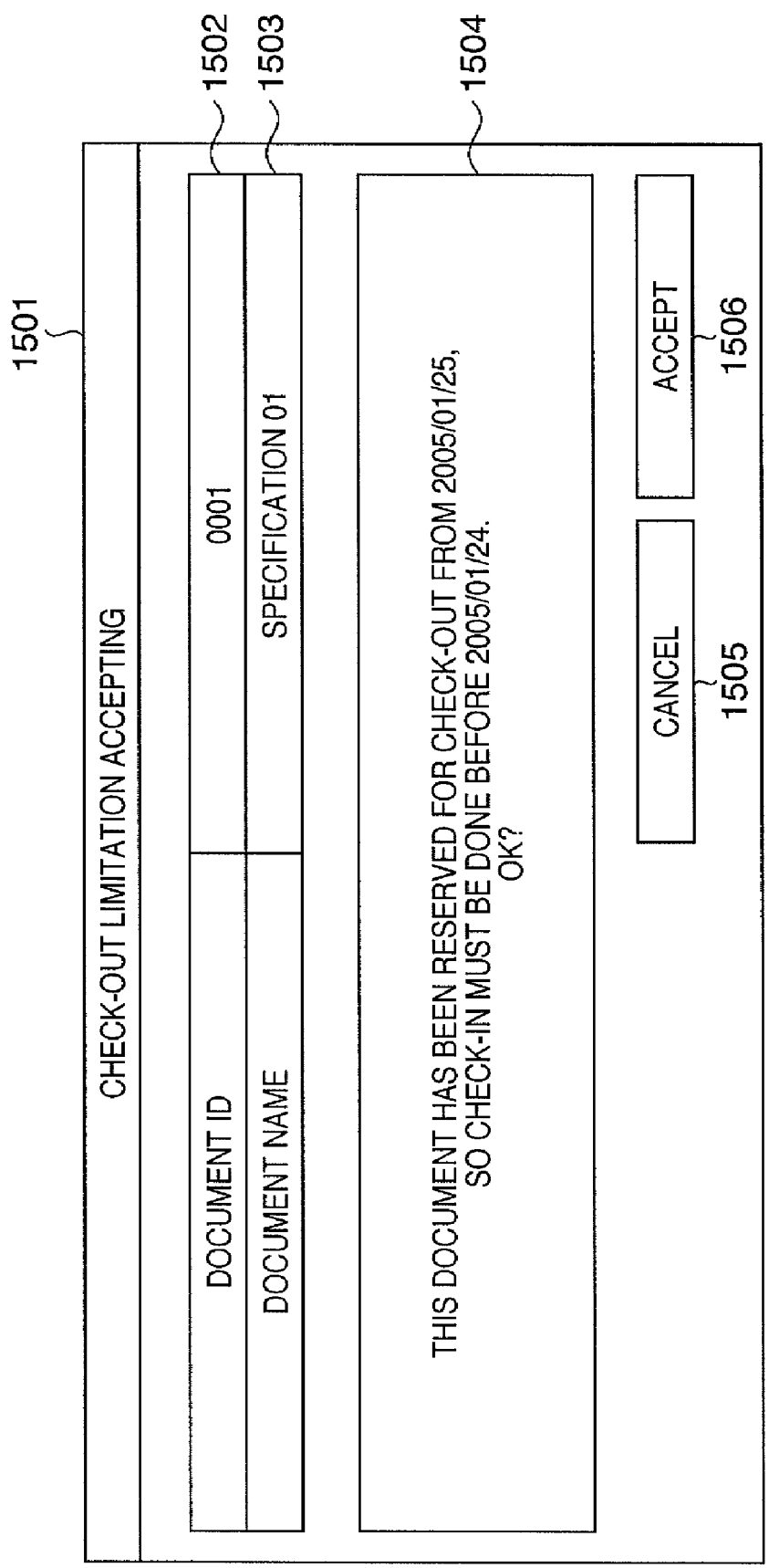
FIG. 15 is a view showing an example of a check-out limitation accepting screen according to the first embodiment.
Figure 16:
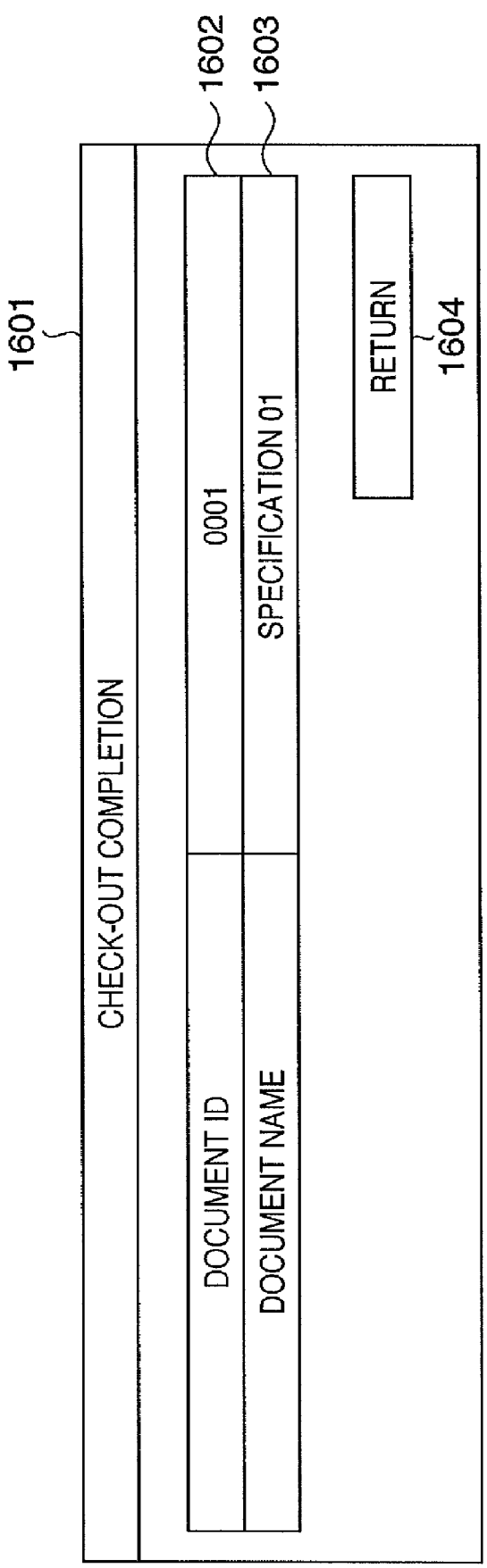
FIG. 16 is a view showing an example of a check-out completion screen according to the first embodiment.

When the document check-out processing control unit 309 finishes the check-out processing, the screen changes to a check-out completion screen 1601 in FIG. 16. However, if a limitation is found in the check-out processing of the document check-out processing control unit 309, the contents of the limitation are displayed on a check-out limitation accepting screen 1501 in FIG. 15. After the user instructs to accept the limitation contents, the check-out processing is performed. If an error has occurred during the processing of the document check-out processing control unit 309, the screen changes to the error screen 1301 in FIG. 13. The sequence of the check-out processing will be described later in detail with reference to FIG. 23.

(Example of Check-Out Limitation Accepting Screen)

FIG. 15 is a view showing an example of the check-out limitation accepting screen 1501 displayed on the CRT 409 of the client apparatus 102 in FIG. 1.

The check-out limitation accepting screen 1501 in FIG. 15 includes a document ID 1502, document name 1503, limitation content display area 1504, and buttons 1505 and 1506.

The document ID 1502 and document name 1503 are areas to display the document information of the check-out target. The limitation content display area 1504 is an area to display the contents of a limitation for the user in check-out processing. The limitation content display area 1504 displays, for example, a message representing that the period when the user can check out and operate a document is limited by another reservation.

The button 1505 is used to cancel the document information check-out processing if the user cannot agree with the limitation contents displayed on the screen. When the user presses the button 1505, the screen returns to the document browsing screen 701 in FIG. 7 without executing the check-out processing.

The button 1506 is used to continue the document information check-out processing if the user can agree with the limitation contents displayed on the screen. When the user presses the button 1506, the document check-out processing control unit 309 of the document management apparatus 101 executes the check-out processing. When the check-out processing is ended, the screen changes to the check-out completion screen 1601 in FIG. 16. If an error has occurred during the processing of the document check-out processing control unit 309, the screen changes to the error screen 1301 in FIG. 13.

(Example of Check-Out Completion Screen)

FIG. 16 is a view showing an example of the check-out completion screen 1601 displayed on the CRT 409 of the client apparatus 102 in FIG. 1.

The check-out completion screen 1601 in FIG. 16 is activated by pressing the button 1406 on the check-out screen 1401 in FIG. 14 or the button 1506 on the check-out limitation accepting screen 1501 in FIG. 15. The check-out completion screen 1601 is used to display the result of the check-out processing and includes a document ID 1602, document name 1603, and button 1604.

The document ID 1602 and document name 1603 are areas to notify the user of the document information that is checked out.

The button 1604 finishes the screen. When the user presses the button 1604, the screen returns to the document browsing screen 701 in FIG. 7.

(Example of Check-In Screen)

Figure 17:
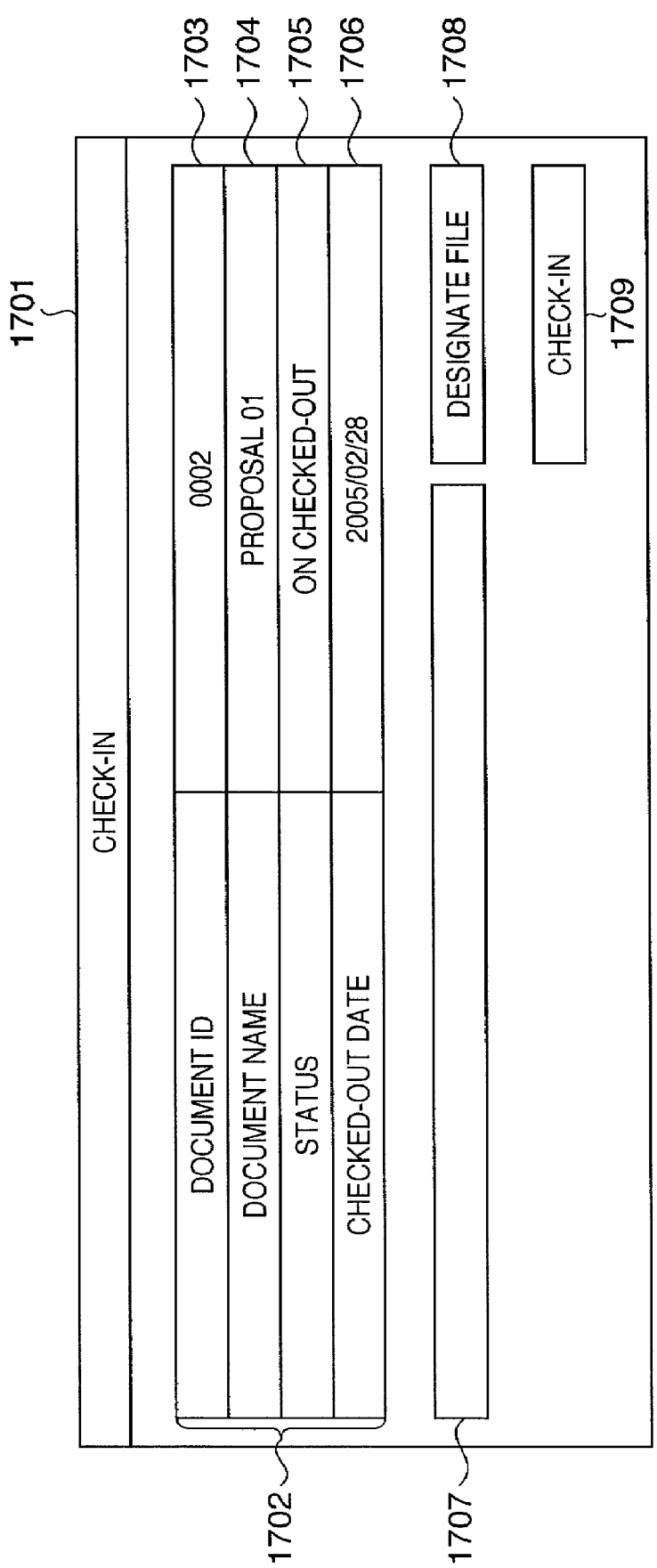
FIG. 17 is a view showing an example of a check-in screen according to the first embodiment.

FIG. 17 is a view showing an example of a check-in screen 1701 displayed on the CRT 409 of the client apparatus 102 in FIG. 1.

The check-in screen 1701 in FIG. 17 is used to execute check-in processing setting of the selected document (which is "proposal 01" here) selected on the document browsing screen 701 in FIG. 7. The check-in screen 1701 includes a check-in document information display area 1702, document file information display area 1707 where a document file is registered in check-in, and buttons 1708 and 1709.

The check-in document information display area 1702 is an area to display the latest information, at the time of displaying this screen, of the selected document 706 as a check-in target. The check-in document information display area 1702 includes a document ID 1703, document name 1704, status 1705, and checked-out date 1706.

The document file information display area 1707 is an area to display information indicating a document file to be registered at the time of check-in. The document file information display area 1707 displays the path and file name of the document information to be registered. The user can also directly input the information.

The button 1708 activates processing of designating a file to be registered. The operation of this button makes it possible to identify a local file provided by the client apparatus or a file in a remote site to be accessed via the network. The screen for this is provided by the OS and has no particular characteristic feature in the embodiment, and a detailed description based on a drawing will be omitted. The path and file name of a registration target document selected on the selection screen displayed by the button are displayed in the document file information display area 1707.

The button 1709 activates check-in processing of registering the file designated in the document file information display area 1707 as a new version of the document. When the user presses the button 1709, information necessary for checking in the document displayed on the screen is transmitted to the document check-in processing control unit 310 of the document management apparatus 101.

When the document check-in processing control unit 310 finishes the check-in processing, the screen changes to a check-in completion screen 1801 in FIG. 18. If an error has occurred during the processing of the document check-in processing control unit 310, the screen changes to the error screen 1301 in FIG. 13. The sequence of the check-in processing will be described later in detail with reference to FIG. 25.

(Example of Check-In Completion Screen)

FIG. 18 is a view showing an example of the check-in completion screen 1801 displayed on the CRT 409 of the client apparatus 102 in FIG. 1.

The check-in completion screen 1801 in FIG. 18 is used to display the result of the document check-in processing activated by pressing the button 1709 on the check-in screen 1701 in FIG. 17. The check-in completion screen 1801 includes a document ID 1802, document name 1803, status 1804, latest version ID 1805, and button 1806.

The document ID 1802, document name 1803, status 1804, and latest version ID 1805 are areas to notify the user of the document information that is checked in.

The button 1806 finishes the screen. When the user presses the button 1806, the screen returns to the document browsing screen 701 in FIG. 7.

<Example of Format of Notification Mail of Embodiment>

Figure 19:
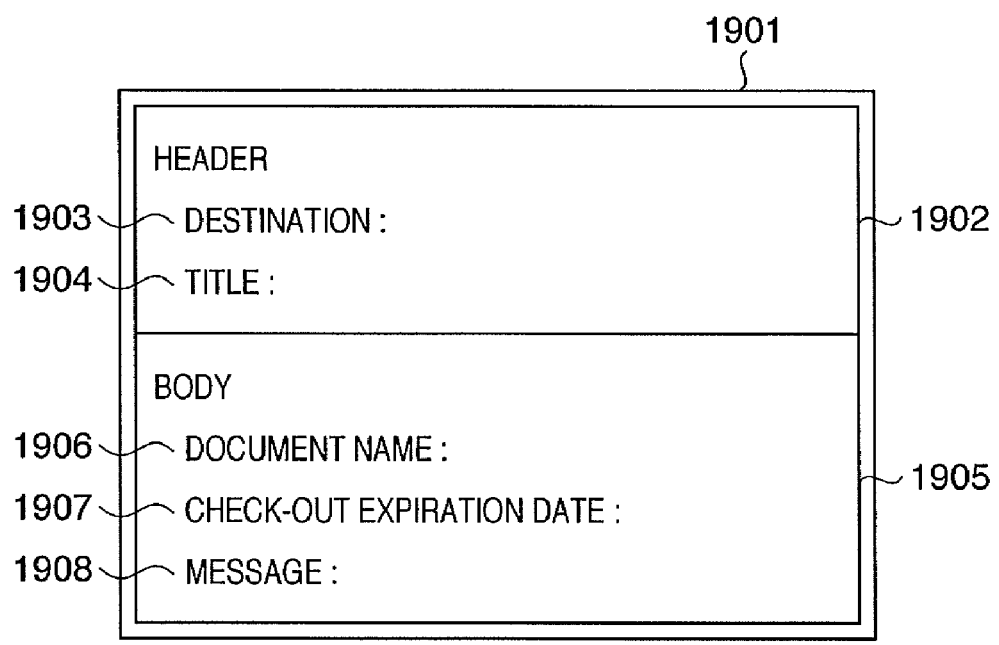
FIG. 19 is a view showing an example of the format of transmission mail according to the first embodiment.

FIG. 19 is a view showing an example of the format of notification mail 1901 sent to the client apparatus of the embodiment.

A mail format 1901 in FIG. 19 includes a mail header area 1902 and a mail body area 1905. The mail header area 1902 includes a destination 1903 that describes a mail address as a destination, and a title 1904 that describes the title of the mail to be transmitted. On an actual mail protocol, a number of pieces of header information except the above-described information are also defined. In this embodiment, only pieces of minimum necessary information are shown, though it is not particularly impossible to add any other header information.

The mail body area 1905 includes a document name 1906 as a target, a check-out expiration date 1907 of the document with the document name 1906, and a message 1908 permanently displayed for the mail.

The mail format is prepared by setting data from an external program.

<Examples of Operation of Document Management Apparatus of Embodiment>

Examples of the operation of the document management apparatus according to the embodiment will be described below with reference to the flowcharts.

(Example of Processing of Causing Document Management Apparatus to Execute Document Check-Out Reservation)

Figure 20:
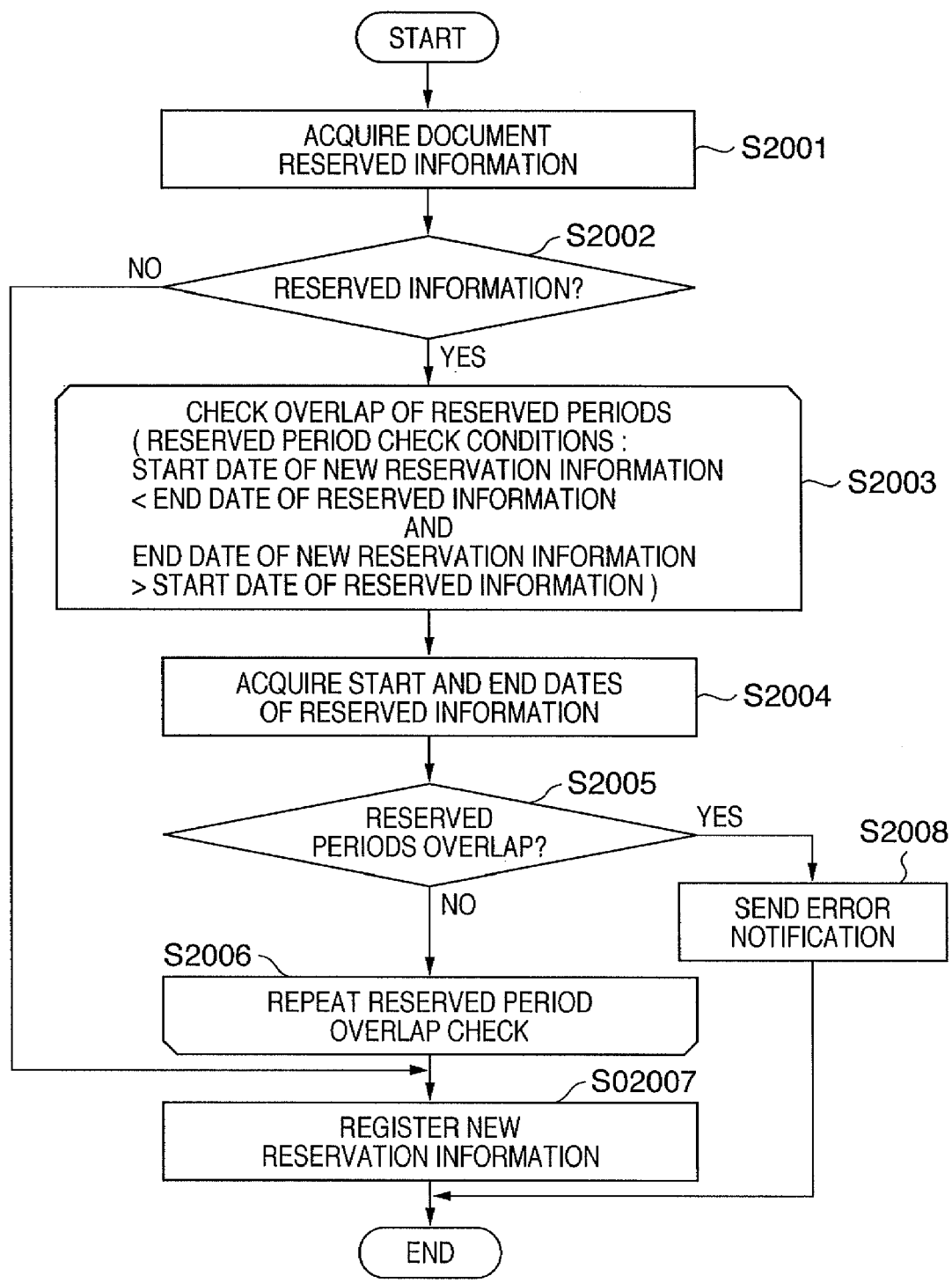
FIG. 20 is a flowchart illustrating an example of a procedure of check-out reservation processing according to the first embodiment.

FIG. 20 is a flowchart illustrating an example of a procedure of check-out reservation processing by the document management apparatus 101 shown in FIG. 1.

The processing in FIG. 20 is activated by pressing the button 1009 on the check-out reservation setting screen 1001 in FIG. 10, which is displayed on the CRT 409 of the client apparatus 102. FIG. 20 illustrates the sequence of processing executed by the document check-out reservation processing control unit 311 of the document management apparatus 101. The CPU 201 in FIG. 2 executes this processing.

Data necessary for this processing are the document ID 1003, reserved start date 1005, reserved end date 1006, check box 1007, which are input on the check-out reservation setting screen 1001 in FIG. 10, and the user ID of the user who is executing this operation.

As shown in FIG. 20, in step S2001, the check-out reservation information 631 is acquired from the check-out reservation information storage unit 305 via the check-out reservation information operation unit 306 of the document management apparatus 101. The check-out reservation information 631 matches the document ID 1003 in FIG. 10 which is received from the client apparatus 102. When the acquisition processing is ended, the process advances to step S2002.

In step S2002, it is determined whether the check-out reservation information 631 acquired in step S2001 exists. If the information exists, the process advances to step S2003. If the information does not exist, the process advances to step S2007.

In step S2003, control of the repetitive processing up to S2006 is done in a number as large as the number of records of the check-out reservation information 631 acquired in step S2001.

First, one of the records of the check-out reservation information 631 is specified, and the process advances to step S2004. In step S2004, the values of the reserved check-out date 633 and expected check-in date 635 of the check-out reservation information 631 are acquired from the record, and the process advances to step S2005.

In step S2005, it is confirmed whether the two items acquired in step S2004, and the reserved start date 1005 and reserved end date 1006 as input values in the check-out reservation processing satisfy the following conditions.

In this specification, "<" and ">" indicate the chronological order. A smaller value indicates an earlier date and time, and a larger value indicates a later date and time. Additionally, "=" indicates the same date and time.

Comparative Conditions:
(New reserved start date 1005)<(Reserved expected check-in date 635),
AND
(New reserved end date 1006)>(Reserved check-out date 633).

If the comparative conditions are satisfied, the period to be reserved newly overlaps the already reserved period. This is determined as an error, and the process advances to step S2008. If neither comparative conditions are satisfied, the period to be reserved newly does not overlap the reserved period. The process advances to step S2006.

Step S2006 indicates that overlap check is ended for one record of the check-out reservation information 631 acquired in step S2001. If the check-out reservation information 631 still has a record that has not undergone the overlap check, the process returns to step S2004. If all records of the check-out reservation information 631 are processed, the process advances to step S2007. Since it is confirmed that the new reserved data does not overlap any existing reserved data, the new check-out reservation information is registered in step S2007. In this case, a new record 638 is created by setting the following data in the items of the check-out reservation information 631.

Check-out reservation information to be set (FIG. 6D):
Document ID 632←input value "document ID 1003"
Reserved check-out date 633←input value "reserved start date 1005"
Reserving user ID 634←user ID of user who is logging in
Expected check-in date 635←input value "reserved end date 1006"
Preceding reservation tracking flag 636←input value "check box 1007"
Status 637←"unprocessed"

The newly created record 638 is stored in the check-out reservation information storage unit 305 via the check-out reservation information operation unit 306 of the document management apparatus 101. When the registration processing in step S2007 finishes, the check-out reservation processing is ended.

On the other hand, step S2008 is executed when, for example, an overlap error is detected in checking the reserved period. The error contents are output to the error screen 1301 in FIG. 13 to notify the user of the error contents. When the user confirms the error information and presses the button 1305 on the error screen 1301 in FIG. 13, the check-out reservation processing is ended without making a reservation.

When the processing is ended, the check-out reservation completion screen 1101 in FIG. 11 is displayed.

(Example of Processing of Causing Document Management Apparatus to Confirm End State of Reserved Period)

FIG. 21 is a flowchart illustrating an example of a procedure of reserved check-out period end state confirmation processing by the document management apparatus 101 shown in FIG. 1.

This processing is not executed in response to a user's action but executed periodically and automatically in the document management apparatus 101. The execution interval is not particularly limited. FIG. 21 illustrates the sequence of one cycle of the periodically executed processing. The document check-out reservation processing control unit 311 of the document management apparatus 101 executes the processing by using the CPU 201 in FIG. 2.

Data necessary for this processing is a threshold value of the number of remaining days in the reserved period for end warning. The contents are set in advance in the document management apparatus 101.

As shown in FIG. 21, in step S2101, of the pieces of reserved information existing in the check-out reservation information 631 in FIG. 6D, reserved information of which the reserved period will finish soon is acquired in accordance with the following conditions.

Acquisition Conditions:
(Status 637 is not "processed"),
AND
((This process executing current date)+(Threshold value of number of remaining days set in system))>(Expected check-in date 635),
OR
((This process executing current date)+(Threshold value of number of remaining days set in system))>(Reserved check-out date 633).

The records of the check-out reservation information 631 which satisfy the conditions are assumed to be sorted based on the document ID. When the acquisition processing is ended, the process advances to step S2102.

In step S2102, it is determined whether or not at least one record of the check-out reservation information 631 acquired in step S2101 exists. If at least one record exists, the process advances to step S2103. If no record exists, the processing is ended.

In step S2103, control of the repetitive processing up to S2107 is done in a number as large as the number of records of the check-out reservation information 631 acquired in step S2101.

First, one of the records of the check-out reservation information 631 is specified, and the process advances to step S2104. In step S2104, a record of the corresponding check-out information 621 is acquired from the check-out information storage unit 303 by using the check-out information operation unit 304. This acquisition is performed by using, as a key, the document ID 632 acquired from the record of the check-out reservation information 631 specified in step S2103. When the record acquisition processing is ended, the process advances to step S2105.

In step S2105, it is confirmed whether the check-out information 621 acquired in step S2104 exists. If the information exists, the process advances to step S2106. If the information does not exist, the process advances to step S2107.

In step S2106, the corresponding user information 641 is acquired from the user information storage unit 307 by using the user information operation unit 308. This acquisition is performed by using, as a key, the checking-out user ID 624 of the record of the check-out information 621 acquired in step S2104. Additionally, the corresponding document information 601 is acquired from the document information storage unit 301 by using the document information operation unit 302 using, as a key, the document ID 622 of the record of the same check-out information 621.

Using these pieces of acquired information, mail using the mail format 1901 shown in FIG. 19 is sent. Pieces of information to be designated in the mail format 1901 are created in the following way. The mail address 644 of the acquired user information 641 is set in the destination 1903. A character string "confirmation of check-out expiration date" is set in the title 1904. The document name 603 of the acquired document information 601 is set in the document name 1906. One of the expected check-in date 635 and reserved check-out date 633 of the check-out reservation information 631 specified in step S2103, which satisfies the acquisition condition in step S2101, is set in the check-out expiration date 1907. A message "It is near to the expiration date of check-out. Please perform check-in operation or cancel check-out reservation till the designated expiration date." is applied to the message 1908.

The created mail is sent immediately. When the mail sending is ended, the process advances to step S2107.

In step S2107, it is determined whether all records of the check-out reservation information 631 acquired in step S2101 are processed. If an unprocessed record remains, the process returns to step S2103. If no unprocessed record exits, the processing exits from the loop and finishes.

(Example of Processing of Causing Document Management Apparatus to Check Out Document Whose Reserved Period Should Start)

Figure 22:
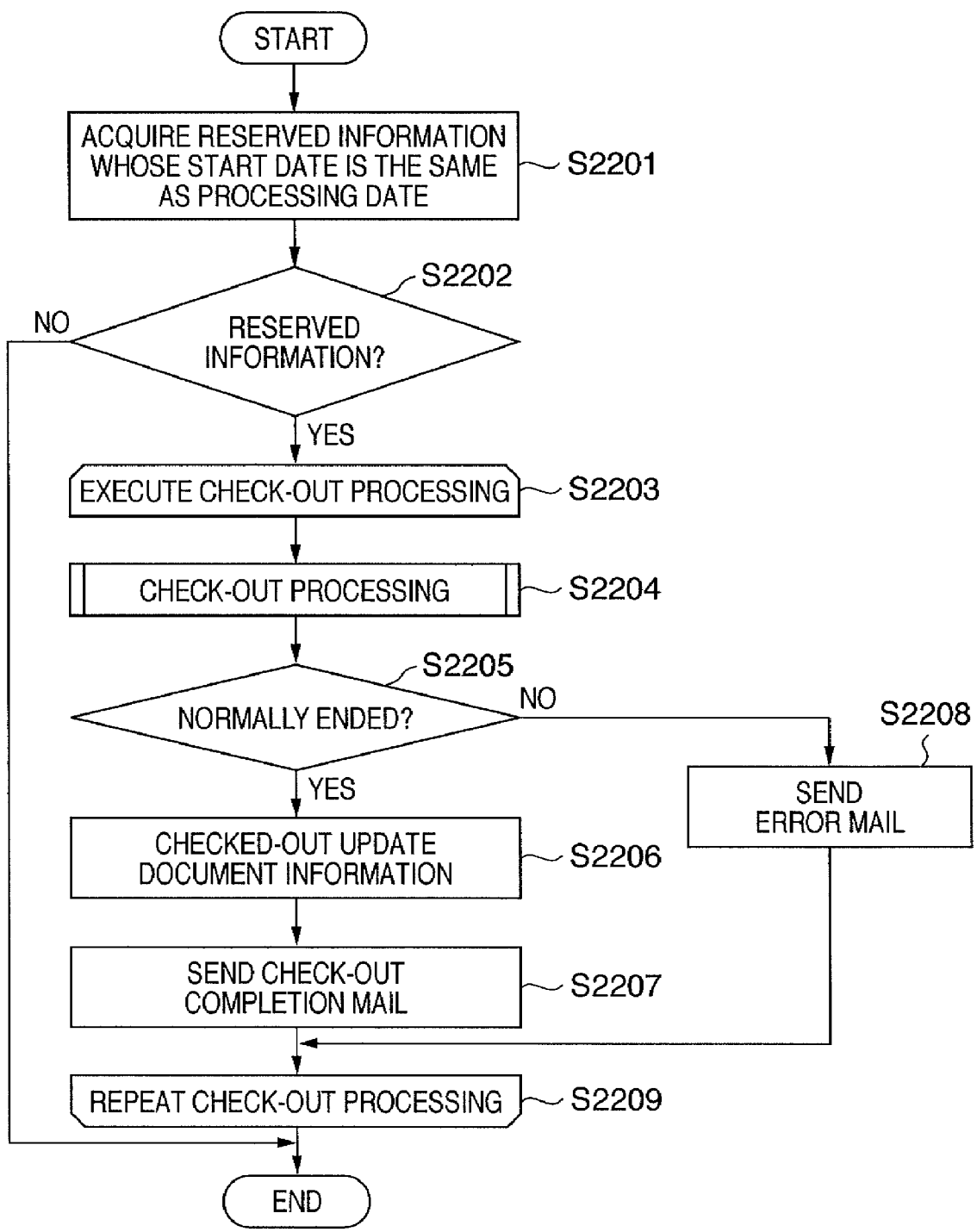
FIG. 22 is a flowchart illustrating an example of a procedure of reserved check-out period start processing according to the first embodiment.

FIG. 22 is a flowchart illustrating an example of a procedure of check-out reservation execution processing by the document management apparatus 101 shown in FIG. 1.

This processing is not executed in response to a user's action but executed periodically and automatically in the document management apparatus 101. The execution interval is not particularly limited. FIG. 22 illustrates the sequence of one cycle of the periodically executed processing. The document check-out reservation processing control unit 311 of the document management apparatus 101 executes the processing by using the CPU 201 in FIG. 2.

As shown in FIG. 22, in step S2201, of the pieces of reserved information existing in the check-out reservation information 631 in FIG. 6D, reserved information of which the reserved period should start is acquired in accordance with the following conditions.

Acquisition Conditions:
(Status 637 is not "processed"),
AND
(This process executing current date)>(Reserved check-out date 633).

The records of the check-out reservation information 631 which satisfy the conditions are assumed to be sorted on the basis of the document ID 632 and reserved check-out date 633. If a plurality of identical document IDs 632 exist, only a record whose reserved check-out date 633 indicates the earliest date is left, and the remaining records are deleted from the target records. When the target record acquisition processing based on the conditions is ended, the process advances to step S2202.

In step S2202, it is determined whether at least one record of the check-out reservation information 631 acquired in step S2201 exists. If at least one record exists, the process advances to step S2203. If no record exists, the processing is ended.

In step S2203, control of the repetitive processing up to S2209 is done as many as the records of the check-out reservation information 631 acquired in step S2201.

First, one of the records of the check-out reservation information 631 is specified, and the process advances to step S2204.

In step S2204, the check-out processing of a document corresponding to the document ID 632 described in the record of the check-out reservation information 631 to be processed, which is specified in step S2203, is executed. To do this, check-out actual processing shown in FIG. 24 is activated.

Figure 24:
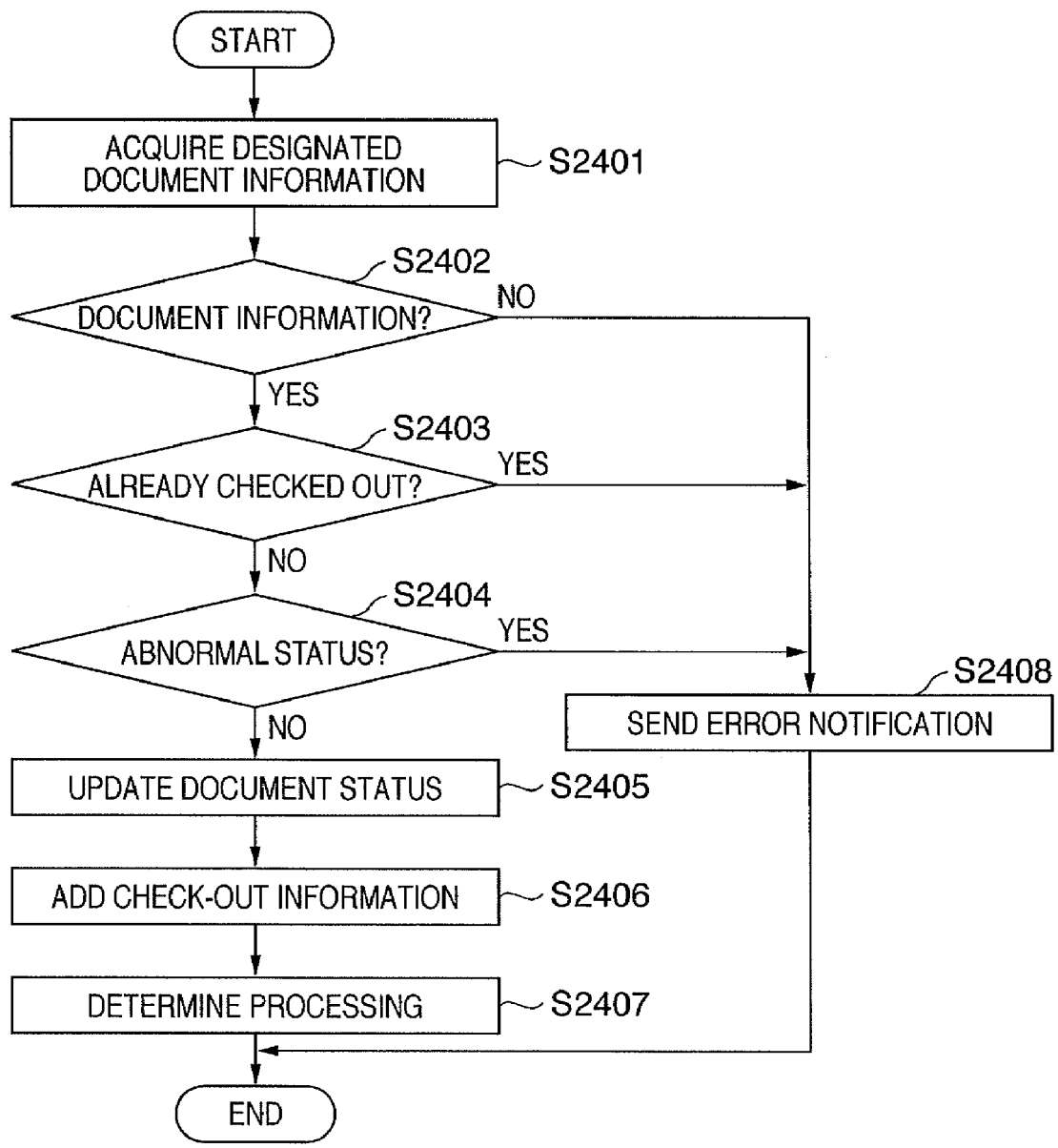
FIG. 24 is a flowchart illustrating an example of a procedure of check-out actual processing according to the first embodiment.

When the check-out actual processing in FIG. 24 is ended, the processing result is stored, and the process advances to step S2205.

In step S2205, the result of the check-out actual processing stored in step S2204 is determined. If the processing is normally ended, the process advances to step S2206. If the processing is abnormally ended, the process advances to step S2208.

In step S2206, since the check-out processing is normally ended, the checked-out reservation information is updated in the following way. The value of the status 637 of the record of the check-out reservation information 631 specified in step S2203 is changed to "on processing". The check-out reservation information 631 stored in the check-out reservation information storage unit 305 is updated via the check-out reservation information operation unit 306. When the update processing is ended, the process advances to step S2207.

In step S2207, since the check-out processing of the document is ended, the user who reserved check-out is notified by mail that the document is checked out. For this purpose, the corresponding document information 601 is acquired from the document information storage unit 301 by using the document information operation unit 302 using, as a key, the document ID 632 of the check-out reservation information 631 specified in step S2203. Additionally, the corresponding user information 641 is acquired from the user information storage unit 307 by using the user information operation unit 308 using the reserving user ID 634 as a key.

The mail to be sent in this step uses the mail format 1901 in FIG. 19. Pieces of information are designated in the mail format 1901 in the following way. The mail address 644 of the user information 641 acquired in this step is set in the destination 1903. A character string "check-out completion" is set in the title 1904. The document name 603 of the document information 601 acquired in this step is set in the document name 1906. The expected check-in date 635 of the check-out reservation information 631 specified in step S2203 is set in the check-out expiration date 1907. A message "Your check-out period starts. Please start operation of the checked-out document." is designated in the message 1908. When sending of the created mail is ended, the process advances to step S2209.

In step S2208, in accordance with the error of the check-out actual processing in step S2204, mails are sent respectively to the expected check-out user (who has reserved check-out of the shard document) and the now checking-out user (who is now checking-out the shard document).

For the expected check-out user, mail representing that the expected check-out is not normally performed is sent. For this purpose, the corresponding document information 601 is acquired from the document information storage unit 301 by using the document information operation unit 302 using, as a key, the document ID 632 of the check-out reservation information 631 specified in step S2203. Additionally, the corresponding user information 641 is acquired from the user information storage unit 307 by using the user information operation unit 308 using the reserving user ID 634 as a key.

The mail to be sent to the expected check-out user in this step uses the mail format 1901 in FIG. 19. Pieces of information are designated in the mail format 1901 in the following way. The mail address 644 of the user information 641 acquired in this step is set in the destination 1903. A character string "check-out failure" is set in the title 1904. The document name 603 of the document information 601 acquired in this step is set in the document name 1906. The reserved check-out date 633 of the check-out reservation information 631 specified in step S2203 is set in the check-out expiration date 1907. A message "Your check-out period has been reached, but the check-out processing has failed." is applied to the message 1908.

For the now checking-out user, mail to request check-in execution for checked-out shard document or check-out canceling is sent. For this purpose, the corresponding document information 601 is acquired from the document information storage unit 301 by using the document information operation unit 302 using, as a key, the document ID 632 of the check-out reservation information 631 specified in step S2203. Additionally, the corresponding user information 641 is acquired from the user information storage unit 307 by using the user information operation unit 308 using the checking-out user ID 624 of the check-out information 621 as a key. The checking-out user ID 624 is acquired from the check-out information storage unit 303 by using the check-out information operation unit 304 using the document ID 632 as a key.

The mail to be sent to the now checking-out user in this step uses the mail format 1901 in FIG. 19. Pieces of information are designated in the mail format 1901 in the following way. The mail address 644 of the user information 641 acquired in this step is set in the destination 1903. A character string "urgent check-in" is set in the title 1904. The document name 603 of the document information 601 acquired in this step is set in the document name 1906. The reserved check-out date 633 of the check-out reservation information 631 specified in step S2203 is set in the check-out expiration date 1907. A message "Your check-out period has already expired. Please execute urgent check-in or cancel check-out of document, because next check-out reservation of the document has been done by other user." is applied to the message 1908. When sending of the created mail is ended, the process advances to step S2209.

In step S2209, it is determined whether all records of the check-out reservation information 631 acquired in step S2201 are processed. If an unprocessed record remains, the process returns to step S2203. If no unprocessed record exits, the processing exits from the loop and finishes.

(Example of Processing of Causing User to Execute Check-Out)

Figure 23:
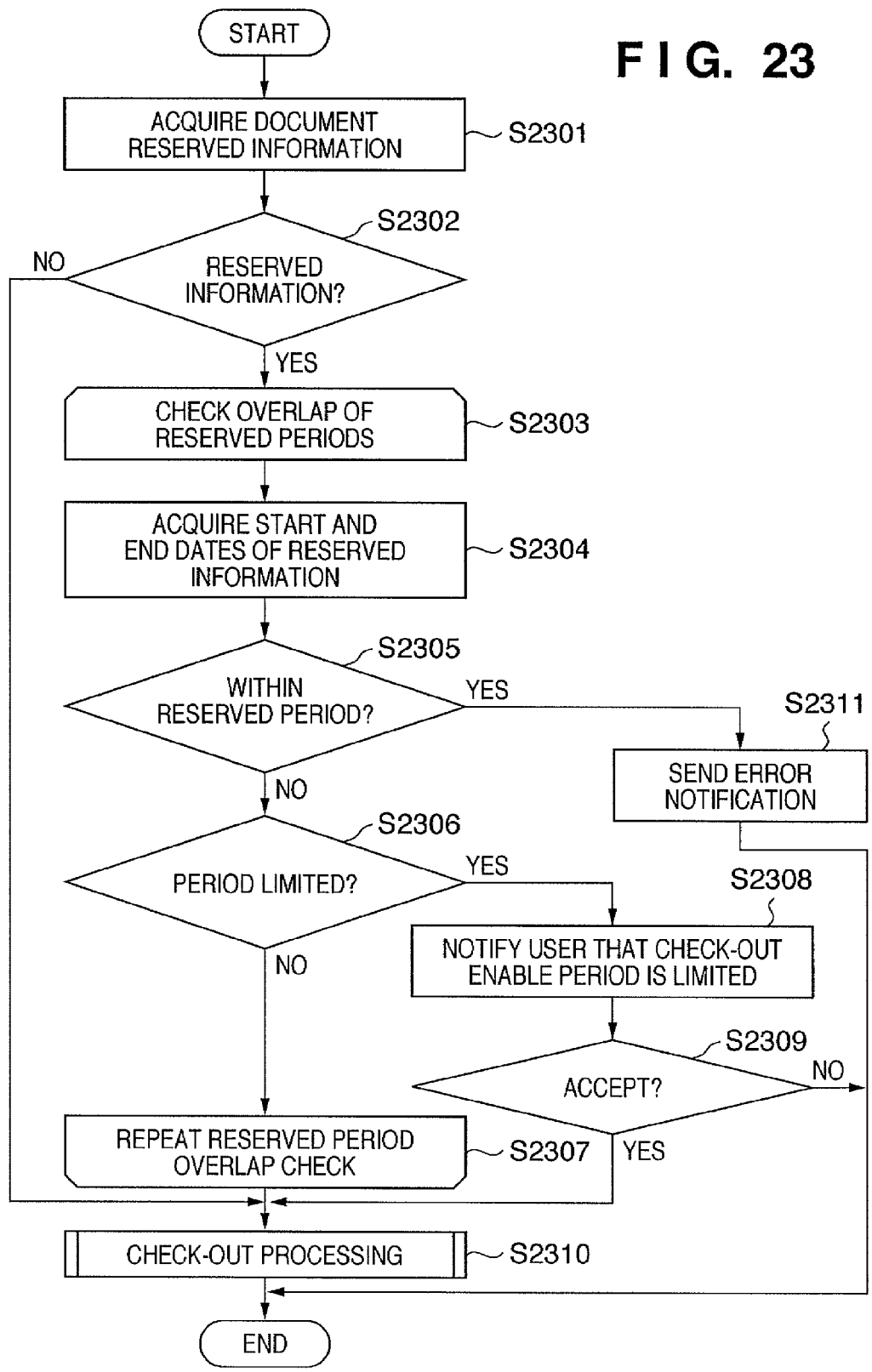
FIG. 23 is a flowchart illustrating an example of a procedure of check-out processing according to the first embodiment.

FIG. 23 is a flowchart illustrating an example of a procedure of check-out execution processing by the document management apparatus 101 shown in FIG. 1.

The processing in FIG. 23 is activated by pressing the button 1406 on the check-out screen 1401 in FIG. 14, which is displayed on the CRT 409 of the client apparatus 102. FIG. 23 illustrates the sequence of document check-out processing executed by the document check-out processing control unit 309 of the document management apparatus 101. The CPU 201 in FIG. 2 executes this processing.

Data necessary for this processing are the document ID 1402 designated on the check-out screen 1401, and the user ID of the user who is executing this operation.

As shown in FIG. 23, in step S2301, a list of check-out reservation information corresponding to the document ID 1402 of the input data is acquired. This is done by acquiring the check-out reservation information 631 corresponding to the document ID 1402 from the check-out reservation information storage unit 305 via the check-out reservation information operation unit 306. The records of the check-out reservation information 631 acquired at this time are assumed to be sorted in ascending order based on the reserved check-out date 633 of the items. When the acquisition processing is ended, the process advances to step S2302.

In step S2302, it is determined whether the records of the check-out reservation information 631 acquired in step S2301 exist. If the records exist, the process advances to step S2303. If no records exist, the process advances to step S2310.

In step S2303, control of the repetitive processing up to S2307 is done as many as the records of the check-out reservation information 631 acquired in step S2301.

First, one of the records of the check-out reservation information 631 is specified, and the process advances to step S2304. In step S2304, the reserved check-out date 633 and expected check-in date 635 of the record of the check-out reservation information 631 specified in step S2303 are acquired. When the acquisition processing is ended, the process advances to step S2305.

In step S2305, using the information of the reserved check-out date 633 and expected check-in date 635 acquired in step S2304, this process executing current date is compared with the reserved period in accordance with the following conditions.

Comparative Conditions:

(This process executing current date)>(Reserved check-out date 633),

AND (This process executing current date)<(Expected check-in date 635).

If these conditions are satisfied, the current time is included in the reserved period of the document to be checked out. It is therefore determined that the check-out processing itself is impossible. For this reason, if the conditions are satisfied, the process advances to step S2311. If these conditions are not satisfied, the compared record is not included in the check-out period, and the process advances to step S2306.

In step S2306, it is checked whether the following condition is satisfied outside the check-out period. The comparative condition for the check is as follows.

Comparative Condition:

(This process executing current date)<(Reserved check-out date 633)

If this condition is satisfied, the check-out period has not started yet, but a reservation later imposes a check-out limitation. The process advances to step S2308. Otherwise, no check-out limitation exists on the reservation information side, and the process advances to step S2307.

Step S2307 indicates that overlap check is ended for one record of the check-out reservation information 631 acquired in step S2301. If the check-out reservation information 631 still has an unprocessed record, the process returns to step S2303. If all records of the check-out reservation information 631 are processed, the process advances to step S2310.

It is determined by the comparison in step S2306 that reserved check-out should start after the current check-out processing. In step S2308, the document check-out processing control unit 309 prepares information representing that the check-out period is limited and sends it to the display content creation unit 316, thereby displaying the check-out limitation accepting screen 1501 in FIG. 15 for the checking-out user. The document ID 632 and reserved check-out date 633 of the check-out reservation information 631 specified in step S2303 are displayed on the check-out limitation accepting screen 1501. In particular, the reserved check-out date 633 is embedded in the message. Step S2308 includes processing up to display of the screen on the CRT 409 of the client apparatus 102.

When the user who sees the screen presses the button 1505 or 1506 on the check-out limitation accepting screen 1501 in FIG. 15 at his/her discretion, the process advances to step S2309.

In step S2309, which button is pressed by the user, the button 1505 (cancel) or button 1506 (accept), is determined. For canceling, the processing is ended without executing the check-out processing. For acceptance, it is determined that the user accepts the limitation on the check-out period. The processing exits from the loop of steps S2304 to S2307, and the process advances to step S2310.

In step S2310, the actual check-out processing is executed because the nonexistence of check-out reservation overlap is confirmed. Details of this processing will be described later with reference to the flowchart in FIG. 24. When the check-out processing in step S2310 finishes, the processing is ended.

It is determined in step S2305 that a reserved check-out period has already started, and another user is executing check-out. Hence, in step S2311, the error screen 1301 is displayed to notify the user who is requesting check-out that the target document is already checked out. When the user presses the button 1305 on the error screen 1301, the processing is ended.

(Example of Check-Out Actual Processing in Document Management Apparatus)

FIG. 24 is a flowchart illustrating an example of a procedure of check-out actual processing by the document management apparatus 101 shown in FIG. 1.

The processing in FIG. 24 is activated in step S2204 or S2310 in the check-out processing sequences in FIGS. 22 and 23. FIG. 24 illustrates the sequence of document check-out actual processing executed by the document check-out processing control unit 309 of the document management apparatus 101. The CPU 201 in FIG. 2 executes this processing.

Data necessary for this processing are the document ID of the check-out target and the user ID of the user who is executing this operation.

As shown in FIG. 24, in step S2401, the document information 601 and check-out information 621 corresponding to the document ID designated by the input data are acquired. When acquisition of the document information 601 and check-out information 621 is ended, the process advances to step S2402.

In step S2402, it is determined whether the document information 601 acquired in step S2401 exists. If the document information does not exist, an error occurs, and the process advances to step S2408. If the document information exists, the process advances to step S2403. In step S2403, it is determined whether the check-out information 621 acquired in step S2401 exists. If the information exists, another user is currently checking out the document, and an error occurs. The process advances to step S2408. If the check-out information 621 does not exist, the user can check out the document, and the process advances to step S2404. If the status 604 of the document information 601 acquired in step S2401 has a value other than "normal", an error occurs, and the process advances to step S2408. If the status is "normal", all check-out enable/disable checks are ended, and the process advances to step S2405.

In step S2405, the status value of the document information 601 acquired in step S2401 is changed to "on checked-out". This processing is done by causing the document check-out processing control unit 309 to update the existing data in the document information storage unit 301 via the document information operation unit 302. When the document information update processing is ended, the process advances to step S2406.

In step S2406, the document information is added to the check-out information 621 in FIG. 6C to indicate that the document is on checked-out. The following pieces of information are used as the items of the check-out information 621. The document ID given to the processing as the input data is used as the document ID 622. The execution date of this processing is used as the checked-out date. The user ID of the user who is executing the operation, which is given to the processing as the input data, like the document ID, is used as the checking-out user ID 624. Using these data, the document check-out processing control unit 309 adds new data to the check-out information storage unit 303 via the check-out information operation unit 304. When the check-out information addition processing is ended, the process advances to step S2407.

In step S2407, the update processing executed in step S2405 and S2406 is determined. With this processing determination, the check-out processing is completed, and the processing is ended.

In step S2408, the processing of the error that has occurred in each step is executed. The processing activation source is notified of the error, and the processing is ended.

(Example of Processing of Causing User to Execute Check-In)

Figure 25:
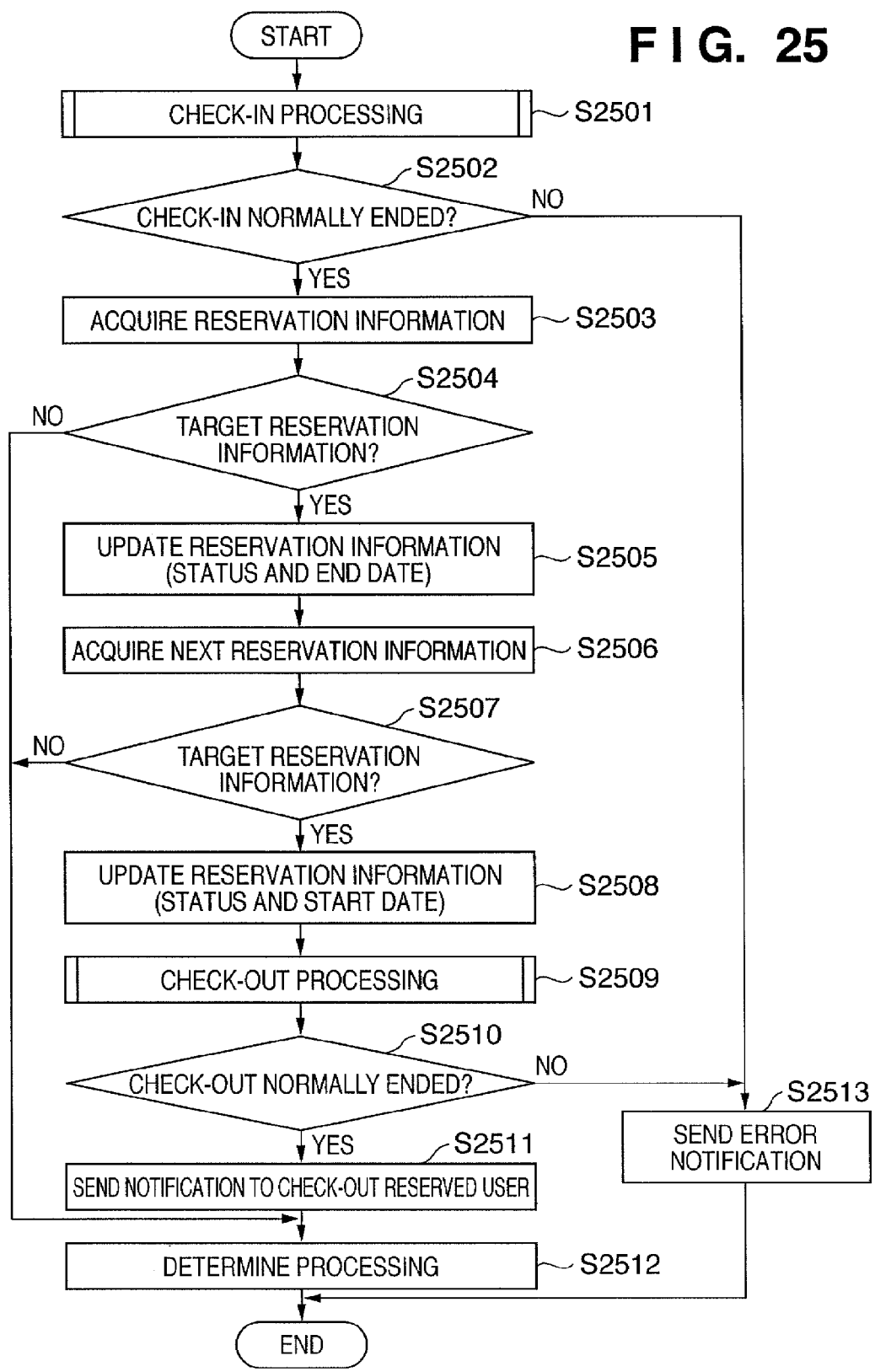
FIG. 25 is a flowchart illustrating an example of a procedure of check-in processing according to the first embodiment.

FIG. 25 is a flowchart illustrating an example of a procedure of check-in execution processing by the document management apparatus 101 shown in FIG. 1.

The processing in FIG. 25 is activated by pressing the button 1709 on the check-in screen 1701 in FIG. 17, which is displayed on the CRT 409 of the client apparatus 102. FIG. 25 illustrates the sequence of document check-in processing executed by the document check-in processing control unit 310 of the document management apparatus 101. The CPU 201 in FIG. 2 executes this processing.

Data necessary for this processing are the document ID 1703 designated on the check-in screen 1701, a registered document file designated in the document file information display area 1707 or by the button 1708, and the user ID of the user who is executing this operation.

Figure 26:
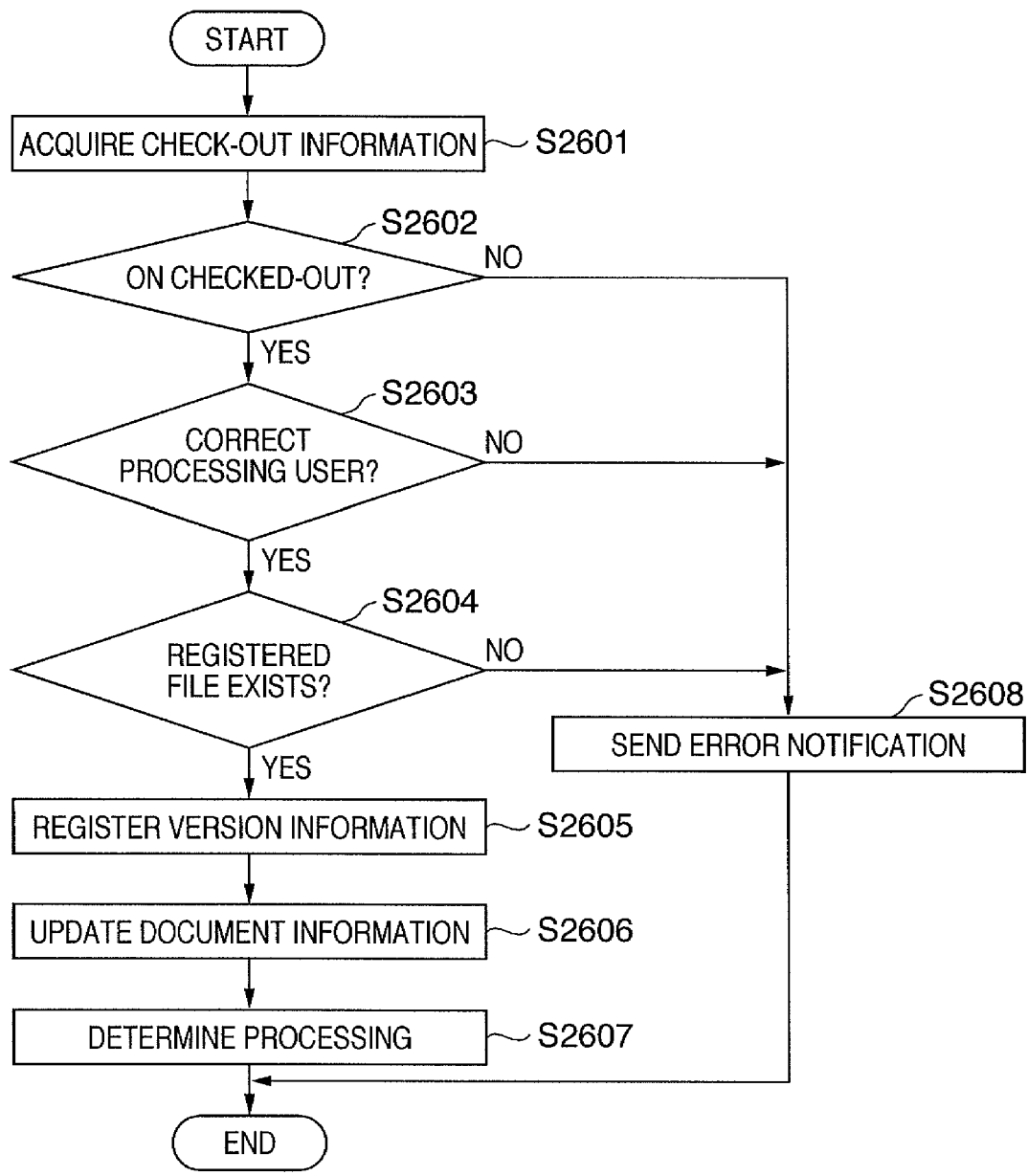
FIG. 26 is a flowchart illustrating an example of a procedure of check-in actual processing according to the first embodiment.

As shown in FIG. 25, in step S2501, the user checks in the document with the document ID designated on the check-in screen 1701 in FIG. 17. This processing will be described later in detail with reference to the flowchart in FIG. 26. In this step, processing activation to processing result acquisition in FIG. 26 is executed. After the processing result is stored, the process advances to step S2502.

In step S2502, the check-in processing result in step S2501 is acquired. If the result is an error, the process advances to step S2513. If the processing is normally ended, the process advances to step S2503.

In step S2503, it is confirmed whether the check-out reservation information 631 matching the document ID of the checked-in document exists. In this step, the check-out reservation information operation unit 306 acquires the check-out reservation information 631 that satisfies the following conditions.

Search Conditions:

Document ID 632=input data "Document ID 1703",
AND
(Reserved check-out date 633)>(Process executing date),
AND
(Expected check-in date 635)>(Process executing date).

When the information acquisition processing is ended, the process advances to step S2504.

In step S2504, it is checked whether the check-out reservation information 631 acquired in step S2503 has a record. If the check-out reservation information 631 has no record, it is determined that the current check-out is not check-out from reservation processing but direct check-out processing from the screen in FIG. 14 using the processing sequence in FIG.

23. The process advances to step S2512. If a record exists, the process advances to step S2505 to process the record.

In step S2505, the expected check-in date 635 is acquired from the record information of the check-out reservation information 631 acquired in step S2503. This information is temporarily stored and used in step S2507 later. The status 637 of the record is changed to "processed", and the expected check-in date 635 is changed to the process executing date. The document check-in processing control unit 310 updates existing data in the check-out reservation information storage unit 305 via the check-out reservation information operation unit 306. When the document information update processing is ended, the process advances to step S2506.

In step S2506, reservation information next to the checked-in document is acquired. In this step, the check-out reservation information operation unit 306 acquires the check-out reservation information 631 that satisfies the following conditions. For the search condition, the expected check-in date 635 temporarily stored in step S2505 is used.

Search Conditions:
Document ID 632=input data "Document ID 1703",
AND
(Reserved check-out date 633)≧((Temporarily stored expected check-in date)+1 day),
AND
(Preceding reservation tracking flag 636)=TRUE.

When the information search processing based on the search conditions is ended, the process advances to step S2507.

In step S2507, it is checked whether the check-out reservation information 631 acquired in step S2506 has a record. If no record exists, the start of reserved check-out need not be advanced by tracking, and the process advances to step S2512. If a record exists, the process advances to step S2508. This processing corresponds to expected period for performing check-out checking.

In step S2508, the reserving user ID 634 of the check-out reservation information 631 acquired in step S2506 is acquired. The reserving user ID 634 is used as input data in executing step S2509 later. The status 637 of the record is changed to "on processing", and the reserved check-out date 633 is changed to the process executing date. The document check-out processing control unit 309 updates existing data in the check-out reservation information storage unit 305 via the check-out reservation information operation unit 306. When the document information update processing is ended, the process advances to step S2509. This advancing processing corresponds to check-out start date change, or the first or second expected period for performing check-out change.

In step S2509, the reserving user ID stored in step S2508 and the document ID of the input data are given. The document check-out processing control unit 309 starts the check-out processing according to the check-out actual processing sequence shown in FIG. 24. When the check-out actual processing is ended, the process advances to step S2510.

In step S2510, it is determined whether the check-out processing in step S2509 is normally ended. If the processing is not normally ended, an error occurs, and the process advances to step S2513. If the processing is normally ended, the process advances to step S2511.

In step S2511, mail is sent to the user who has reserved check-out. For this purpose, the corresponding document information 601 is acquired from the document information storage unit 301 by using the document information operation unit 302 using, as a key, the document ID 632 of the check-out reservation information record specified in step S2506. Additionally, the corresponding user information 641 is acquired from the user information storage unit 307 by using the user information operation unit 308 using, as a key, the reserving user ID stored in step S2508.

The mail to be sent in this step uses the mail format 1901 in FIG. 19. Pieces of information are designated in the mail format 1901 in the following way. The mail address 644 of the user information 641 acquired in this step is set in the destination 1903. A character string "check-out completion" is set in the title 1904. The document name 603 of the document information 601 acquired in this step is set in the document name 1906. The expected check-in date 635 of the check-out reservation information 631 specified in step S2503 is set in the check-out expiration date 1907. A message "The preceding operation by an operator had completed before scheduled end date, therefore, your check-out period has already started. Please start operation of the checked-out document." is designated as the message 1908. When sending of the created mail is ended, the process advances to step S2512.

In step S2512, all pieces of information changed in this processing are determined. When information determination is ended, the processing is ended.

(Example of Check-In Actual Processing in Document Management Apparatus)

FIG. 26 is a flowchart illustrating an example of a procedure of check-in actual processing by the document management apparatus 101 shown in FIG. 1.

The processing in FIG. 26 is activated in the check-in processing sequence in FIG. 25. FIG. 26 illustrates the sequence of document check-in actual processing executed by the document check-in processing control unit 310 of the document management apparatus 101. The CPU 201 in FIG. 2 executes this processing.

Data necessary for this processing are the document ID of the check-out target, a registered document file designated on the input screen, and the user ID of the user who is executing this operation.

As shown in FIG. 26, in step S2601, the check-out information 621 that satisfies the following search condition is searched for and acquired.

Search Condition:
Document ID 622=input data "Document ID"

When the information acquisition processing based on the search condition is ended, the process advances to step S2602.

In step S2602, it is determined whether the check-out information 621 acquired in step S2601 has a record. If the document is currently on checked-out, a corresponding record should exist. If a record exists, the process advances to step S2603. If no record exists, an error occurs, and the process advances to step S2608. In step S2603, it is checked whether the checking-out user ID 624 of the record of the check-out information 621 acquired in step S2601 coincides with the user ID of the user who is executing the operation, which is given as the input data. If the user IDs are different, an error occurs due to illicit check-in access, and the process advances to step S2608. If the user IDs coincide with each other, the process advances to step S2604. In step S2604, it is confirmed whether the registered file given as the input data exists. If the document file does not exist, an error occurs, and the process advances to step S2608. If the file exists, the process advances to step S2605.

In step S2605, the version of the designated document is added as the check-in processing. First, the check-out information operation unit 304 acquires the version number of the latest version from version information stored in the check-out information storage unit 303 by using, as a key, the document ID of the input data. The value of the latest version is incremented to obtain the version number of the new version, thereby creating a new record of the version information 611.

For the new record, the document ID of the input data is designated as the document ID 612. The new version number obtained by the increment is designated as the version ID 613. The process executing date is designated as the registered date 614. The operating user ID of the input data is designated as the registering user ID 615. The registered document file of the input data is designated as the file content 616. The document check-in processing control unit 310 controls so that the document information operation unit 302 executes a new version adding operation to newly register the record created by the above data in the document information storage unit 301. When version information record registration is ended, the process advances to step S2606.

In step S2606, pieces of associated information are updated in accordance with the version addition. First, the document check-in processing control unit 310 controls so that the check-out information operation unit 304 executes an information deletion operation to delete the record acquired in step S2601 from the check-out information storage unit 303. Next, the document information operation unit 302 executes a document information acquisition operation to acquire, from the document information storage unit 301, a record of the document information 601 matching the document ID of the input data. The value of the status 604 of the acquired record is changed to "normal". The document check-in processing control unit 310 controls so that the document information operation unit 302 executes a document information update operation to update the record of the same document ID in the document information storage unit 301. When the update processing in this step is ended, the process advances to step S2607.

In step S2607, the update operations executed in step S2605 and S2606 is determined. When the information determination processing is ended, the processing is ended.

In step S2608, the processing of the error that has occurred in each step is executed. The processing activation source is notified of the error, and the processing is ended.

Second Embodiment

A document management apparatus according to the second embodiment of the present invention will be described below.

<Example of Configuration of Document Management System of Embodiment>

The configuration of the entire document management system including the document management system according to the second embodiment can be regarded as the same as that described in the first embodiment with reference to FIG. 1, and a description thereof will not be repeated.

<Example of Arrangement of Document Management Apparatus of Embodiment>

(Example of Hardware Configuration of Document Management Apparatus)

The hardware configuration of a document management apparatus 101 according to the second embodiment can also be regarded as the same as that described in the first embodiment with reference to FIG. 2, and a description thereof will not be repeated.

(Example of Functional Arrangement of Document Management Apparatus of Embodiment)

The functional arrangement of the document management apparatus 101 will be described next with reference to the block diagram of FIG. 27.

As shown in FIG. 27, the document management apparatus 101 includes the following elements.

The document management apparatus includes a document information storage unit 2701, document information operation unit 2702, check-out information storage unit 2703, and check-out information operation unit 2704. The document management apparatus also includes a check-out reservation information storage unit 2705, and check-out reservation information operation unit 2706, reservation flow information storage unit 2707, and reservation flow information operation unit 2708. The document management apparatus also includes a user information storage unit 2709 and user information operation unit 2710. These unit 2701-2710 serve as an information processing portion The document management apparatus includes a document check-out processing control unit 2711, document check-in processing control unit 2712, document check-out reservation processing control unit 2713, and user authentication processing control unit 2714, which serve as a processing control portion.

The document management apparatus also includes a network communication unit 2715, document information processing control unit 2716, and display content creation unit 2717.

The document information storage unit 2701 is a place to store registered document information and document files and is allocated in a RAM 202 or HDD 213. The document information operation unit 2702 includes an executable program which is stored in the RAM and executed by a CPU 201, and executes, for the document information storage unit 2701, input and output processing such as registration, update, deletion, and acquisition of document information or a document file.

The check-out information storage unit 2703 is a place to store check-out information of a document stored in the document information storage unit 2701 and is allocated in the RAM 202 or HDD 213. The check-out information operation unit 2704 includes an executable program which is stored in the RAM and executed by the CPU 201, and executes, for the check-out information storage unit 2703, input and output processing such as registration, update, deletion, and acquisition of check-out information.

The check-out reservation information storage unit 2705 is a place to store check-out reservation information of a document stored in the document information storage unit 2701 and is allocated in the RAM 202 or HDD 213. The check-out reservation information operation unit 2706 includes an executable program which is stored in the RAM and executed by the CPU 201, and executes, for the check-out reservation information storage unit 2705, input and output processing such as registration, update, deletion, and acquisition of check-out reservation information.

The reservation flow information storage unit 2707 is a place to store reservation flow information that associates one or more pieces of check-out reservation information stored in the check-out reservation information storage unit 2705 and manages them as a "flow (also called a group)" and is allocated in the RAM 202 or HDD 213. The reservation flow information operation unit 2708 includes an executable program which is stored in the RAM and executed by the CPU 201, and executes, for the reservation flow information storage unit 2707, input and output processing such as registration, update, deletion, and acquisition of reservation flow information. The operation of the reservation flow information operation unit 2708 implements flow management (group management).

The user information storage unit 2709 is a place to store information of a user who uses the document management apparatus 101 and is allocated in the RAM 202 or HDD 213. The user information operation unit 2710 includes an executable program which is stored in the RAM 202 and executed by the CPU 201, and executes, for the user information storage unit 2709, input and output processing such as registration, update, deletion, and acquisition of user information.

The document check-out processing control unit 2711 uses the document information operation unit 2702, check-out information operation unit 2704, check-out reservation information operation unit 2706, user information operation unit 2710, and display content creation unit 2717. The document check-out processing control unit 2711 controls check-out processing in response to a request of the document check-out processing transmitted from a client apparatus 102.

The document check-in processing control unit 2712 uses the document information operation unit 2702, check-out information operation unit 2704, check-out reservation information operation unit 2706, user information operation unit 2710, and display content creation unit 2717. The document check-in processing control unit 2712 controls check-in processing in response to a request of the document check-in processing transmitted from the client apparatus 102.

The document check-out reservation processing control unit 2713 uses the document information operation unit 2702, check-out information operation unit 2704, check-out reservation information operation unit 2706, reservation flow information operation unit 2708, user information operation unit 2710, and display content creation unit 2717. The document check-out reservation processing control unit 2713 controls check-out reservation processing in response to a request of the document check-out reservation processing transmitted from the client apparatus 102 and also controls reservation flow processing.

When connecting the client apparatus 102 to the document management apparatus 101, the user authentication processing control unit 2714 executes user authentication processing using the check-out reservation information operation unit 2706 and display content creation unit 2717.

The network communication unit 2715 is connected to a network via a modem 206 or NIC 205 and transmits a processing request received from the client apparatus 102 via a network 103 to each processing control unit in the document management apparatus 101. The network communication unit 2715 also transmits a processing result from each control unit in the document management apparatus 101 to the client apparatus 102.

The document information processing control unit 2716 uses the document information operation unit 2702, check-out information operation unit 2704, and check-out reservation information operation unit 2706. The document information processing control unit 2716 creates the display contents of a document information details display screen 3001 to be transmitted to the client apparatus 102.

The display content creation unit 2717 performs creating and formatting of display contents on a document management screen to be provided to the client apparatus 102. In particular, the display content creation unit 2717 is assumed to provide display contents in accordance with the display form on the client side and create display contents in a hypertext format such as HTML or binary format for dedicated client software.

<Example of Arrangement of Client Apparatus of Embodiment>

(Example of Hardware Configuration of Client Apparatus)

The hardware configuration of the client apparatus 102 according to the second embodiment can be regarded as the same as that described in the first embodiment with reference to FIG. 4, and a description thereof will not be repeated.

(Example of Functional Arrangement of Client Apparatus)

The functional arrangement of the client apparatus 102 can be regarded as the same as that described in the first embodiment with reference to FIG. 5, and a description thereof will not be repeated.

<Formats and Configurations of Data Handled in Embodiment>

FIGS. 28A to 28G are views for explaining the formats and configurations of data used in this embodiment. Data items below are minimum necessary items for the explanation of the embodiment.

Figure 28A:
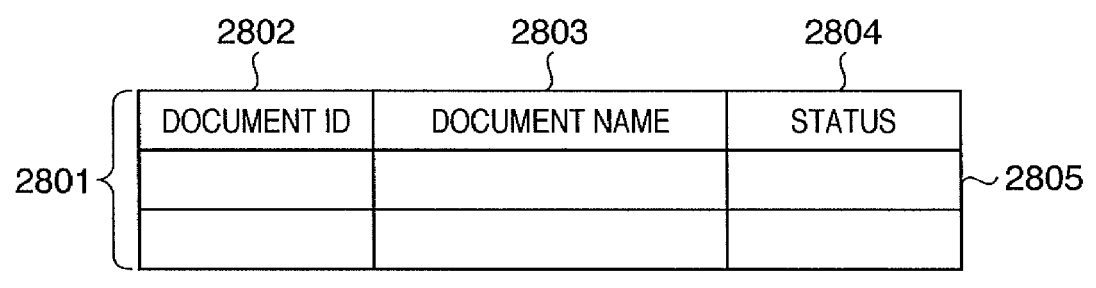

FIGS. 28A and 28B are views showing the formats and configurations of information stored in the document information storage unit 2701 of the document management apparatus 101 shown in FIG. 27.

Document information 2801 in FIG. 28A represents a format of information stored for each document. The document information 2801 includes, as items, a document ID 2802, document name 2803, and status 2804 representing a status. One of "normal", "abnormal", and "on checked-out" is set as a status value represented by the status 2804.

Each piece of document information represents unique information based on the document ID 2802. One unit stored in the document information 2801 is expressed as a record 2805.

Version information 2811 in FIG. 28B represents a format of information stored for each version which changes every time the document is updated.

The version information 2811 is managed in a table including, as items, a document ID 2812, version ID 2813, registered date 2814, registering user ID 2815, and file content 2816. The document ID 2812 is linked with the document ID 2802 defined in the document information 2801.

Each piece of version information represents unique information based on the document ID 2812 and version ID 2813. One unit stored in the version information 2811 is expressed as a record 2817.

FIG. 28C is a view showing the format and configuration of information stored in the check-out information storage unit 2703 of the document management apparatus 101 shown in FIG. 27.

Check-out information 2821 represents a format for storing information of each document that is on checked-out.

The check-out information 2821 is managed in a table including, as items, a document ID 2822, checked-out date 2823, and checking-out user ID 2824. The document ID 2822 is linked with the document ID 2802 defined in the document information 2801. Document information which has information in this table is currently on checked-out.

Each check-out information represents unique information based on the document ID 2822. One unit stored in the check-out information 2821 is expressed as a record 2825.

FIG. 28D is a view showing the format and configuration of information stored in the check-out reservation information storage unit 2705 of the document management apparatus 101 shown in FIG. 27.

Check-out reservation information 2831 is managed in a table including the following items. The items include a reservation ID 2832, document ID 2833, reserved check-out date 2834, reserving user ID 2835, expected check-in date 2836, preceding reservation tracking flag 2837, and status 2838.

Each check-out reservation information represents unique information based on the reservation ID 2832. The document ID 2833 is linked with the document ID 2802 defined in the document information 2801. One of "unprocessed", "on processing", "processed" is set as a status value represented by the status 2838. Document information which has information in this table currently has a check-out reservation. One unit stored in the check-out reservation information 2831 is expressed as a record 2839.

Figure 28E:
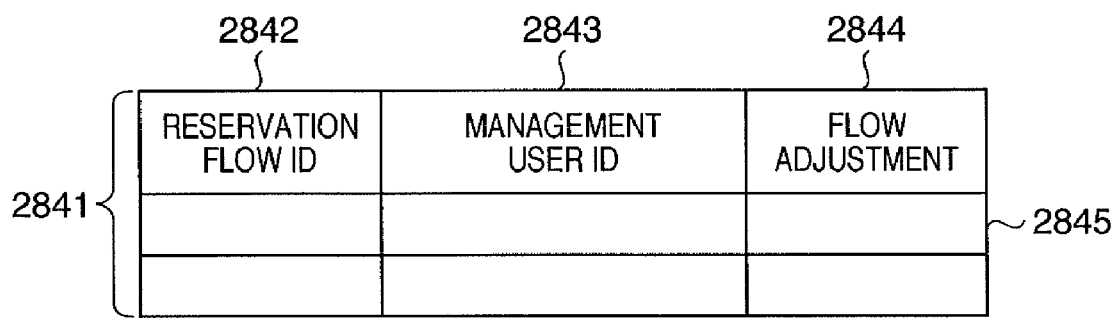
FIG. 28E is a view showing an example of the data structure of reservation flow information according to the second embodiment.

FIGS. 28E and 28F are views showing the formats and configurations of information stored in the reservation flow information storage unit 2707 of the document management apparatus 101 shown in FIG. 27.

Reservation flow information 2841 in FIG. 28E represents the information of a reservation flow that puts one or more pieces of check-out reservation information 2831 into a flow.

The reservation flow information 2841 is managed in a table including, as items, a reservation flow ID 2842, management user ID 2843, and flow adjustment 2844.

Each piece of reservation flow information represents a unique information based on the reservation flow ID 2842. The management user ID 2843 represents a user who manages the reservation flow information and is linked with a user ID 2862 (to be described later). One of "adjust" and "no adjust" is set as a flow adjustment value represented by the flow adjustment 2844. One unit stored in the reservation flow information 2841 is expressed as a record 2845.

Reservation flow configuration information 2851 in FIG. 28F defines the association between the check-out reservation information 2831 and the reservation flow information 2841, and represents check-out reservation information included in each of reservation flows.

The reservation flow configuration information 2851 is managed in a table including, as items, a reservation flow ID 2852, flow order 2853, and reservation ID 2854.

The reservation flow ID 2852 is linked with the reservation flow ID 2842 defined in the reservation flow information 2841. The flow order 2853 takes an integer value of 1 or more. The flow order 2853 represents the time-sequential order of pieces of check-out reservation information in one reservation flow by numerical values 1, 2, 3, .... A numeral value is never designated twice in one reservation flow. The reservation ID 2854 represents check-out reservation information included in the reservation flow information and is linked with the reservation ID 2832 defined in the check-out reservation information 2831.

The reservation flow configuration information represents unique information based on the reservation flow ID 2852 and flow order 2853. A piece of check-out reservation information is never set as the configuration information of a plurality of reservation flows. For this reason, the reservation flow configuration information 2851 can represent unique information based on the reservation ID 2854. One unit stored in the reservation flow configuration information 2851 is expressed as a record 2855. Creating one reservation flow indicates that one record is created in the reservation flow information 2841, and one or more records are created in the reservation flow configuration information.

FIG. 28G is a view showing the format and configuration of information stored in the user information storage unit 2709 of the document management apparatus 101 shown in FIG. 27.

User information 2861 represents a format to hold the user information of a user who can access the document management apparatus 101 and operate a document. The user information 2861 is managed in a table including, as items, the user ID 2862, a user name 2863, and a mail address 2864.

Each piece of user information represents unique information based on the user ID 2862. The user information defined herein is used as the registering user ID 2815 in FIG. 28B, the checking-out user ID 2824 in FIG. 28C, the reserving user ID 2835 in FIG. 28D, or the management user ID in FIG. 28E. One unit held as the user information 2861 is expressed as a record 2865.

<Examples of Display Screens of Embodiment>

Screens the document management apparatus 101 used in this embodiment displays on the client apparatus 102 will be described next. The screens to be described herein display minimum necessary contents and can display any other information. The screen configurations and expression methods shown in the drawings are not particularly limited to those of the embodiment.

(Example of Document Browsing Screen)

FIG. 29 is a view showing an example of a document browsing screen displayed on a CRT 409 of the client apparatus 102 in FIG. 1.

A document browsing screen 2901 in FIG. 29 is used to browse document information managed by the document management apparatus 101 and includes a document information display area 2902 and buttons 2907 to 2910.

The document information display area 2902 is an area to display a list of document information managed by the document management apparatus 101 and identify each document and includes, as displayed document information, a document ID 2903, document name 2904, and status 2905. When the user of the client apparatus 102 selects document information from the document list, a selected document 2906 changes its display manner to indicate that it is being selected.

The button 2907 activates processing of displaying a list of check-out reservations made for a document selected as the selected document 2906. When the user presses the button 2907, the document information of the selected document 2906 in the document information display area 2902 is transmitted to the document check-out reservation processing control unit 2713.

The button 2908 activates check-in processing of a document selected as the selected document 2906. When the user presses the button 2908, the document information of the selected document 2906 in the document information display area 2902 is transmitted to the document check-in processing control unit 2712.

The button 2909 activates check-out processing of a document selected as the selected document 2906. When the user presses the button 2909, the document information of the selected document 2906 in the document information display area 2902 is transmitted to the document check-out processing control unit 2711.

The button 2910 activates processing of displaying detailed information of a document selected as the selected document 2906. When the user presses the button 2910, the information of the selected document 2906 in the document information display area 2902 is transmitted to the document information processing control unit 2716.

(Example of Document Information Details Display Screen)

Figure 30:
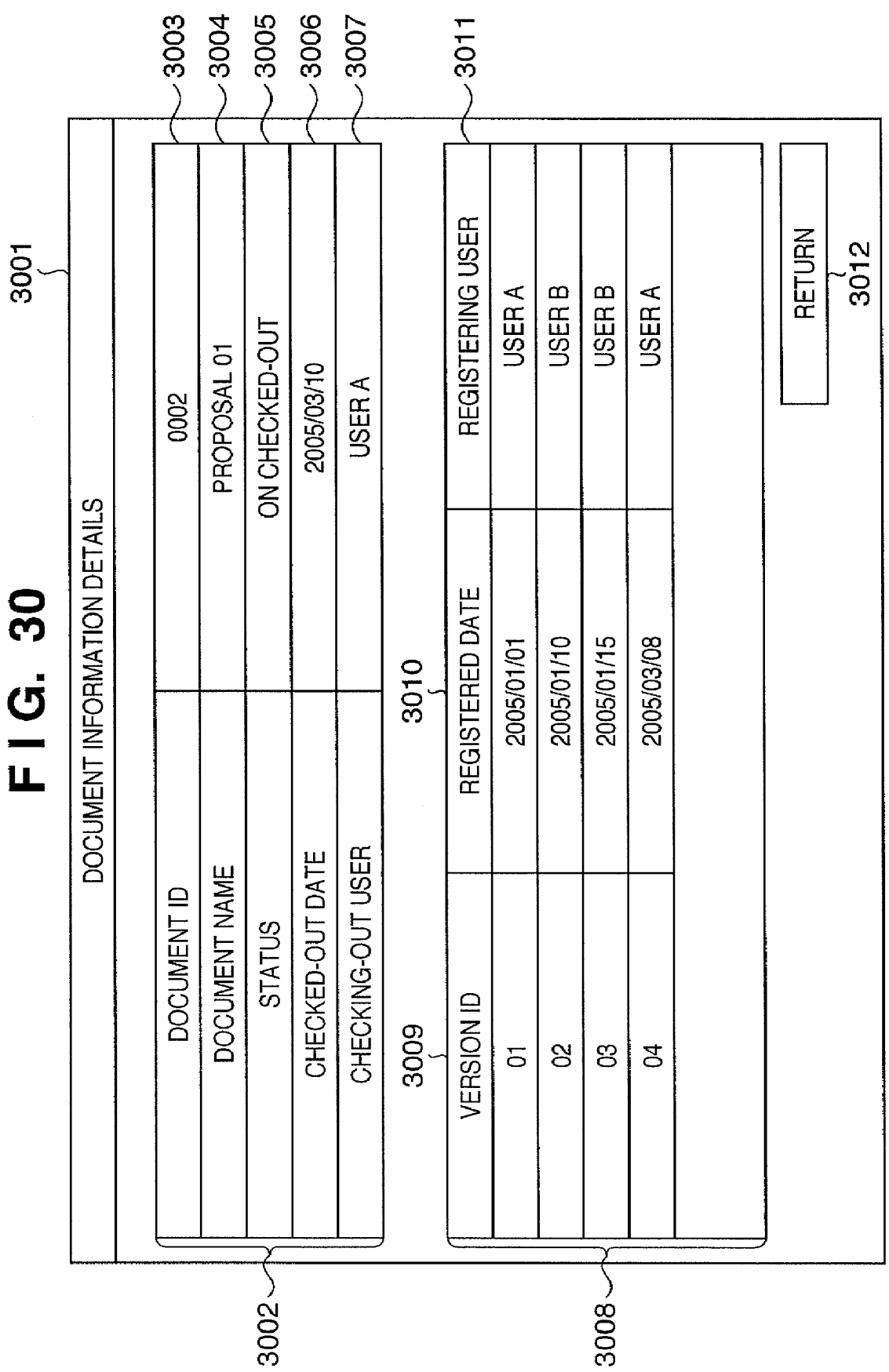
FIG. 30 is a view showing an example of a document information details display screen according to the second embodiment.

FIG. 30 is a view showing an example of a document information details display screen 3001 displayed on the CRT 409 of the client apparatus 102 in FIG. 1.

A document information details display screen 3001 in FIG. 30 is used to display the detailed information of the selected document (which is "proposal 01" here) selected on the document browsing screen 2901 in FIG. 29. The document information details display screen 3001 includes a document information display area 3002, document version information display area 3008, and button 3012.

The document information display area 3002 is an area to display information held by a document and the state of the document and includes a document ID 3003, document name 3004, status 3005, checked-out date 3006, and checking-out user 3007. The checked-out date 3006 and checking-out user 3007 are displayed only when the status 3005 is "on checked-out".

The document version information display area 3008 is an area to display the log of version information updated for a document and includes a version ID 3009, registered date 3010, and registering user 3011.

The button 3012 finishes the screen. When the user presses the button 3012, the screen returns to the document browsing screen 2901 in FIG. 29.

(Example of Check-Out Reservation List Screen)

FIG. 31 is a view showing an example of a check-out reservation list screen 3101 displayed on the CRT 409 of the client apparatus 102 in FIG. 1.

The check-out reservation list screen 3101 in FIG. 31 is used to display check-out reservation information set for the selected document (which is "specification 01" here) selected on the document browsing screen 2901 in FIG. 29. The check-out reservation list screen 3101 includes a document information display area 3102, check-out reservation information display area 3106, and buttons 3110 to 3112.

The document information display area 3102 is an area to display information held by a document and the state of the document and includes a document ID 3103, document name 3104, and status 3105.

The check-out reservation information display area 3106 includes a reserved start date 3107, reserved end date 3108, and reserving user 3109. The data displayed here are pieces of check-out reservation information related to a document designated by the document ID 3103 registered in the check-out reservation information 2831 in FIG. 28D and are displayed in ascending order of reserved start dates 3107.

The button 3110 finishes the screen. When the user presses the button 3110, the screen returns to the document browsing screen 2901 in FIG. 29.

The button 3111 activates processing of canceling check-out reservation information displayed in the check-out reservation information display area 3106. The user selects one of pieces of reservation information displayed on the check-out reservation information display area 3106 and presses the button 3111. With this operation, the selected reservation information is transmitted to the document check-out reservation processing control unit 2713 of the document management apparatus 101. The screen changes to a check-out reservation canceling screen 3501 in FIG. 35.

The button 3112 activates a reservation flow designation processing for a check-out reservation corresponding to the document ID 3103. When the user presses the button 3112, the document information displayed on the screen is transmitted to the document check-out reservation processing control unit 2713 of the document management apparatus 101, and the screen changes to a reservation flow designation screen 3201 in FIG. 32.

(Example of Reservation Flow Designation Screen)

Figure 32:
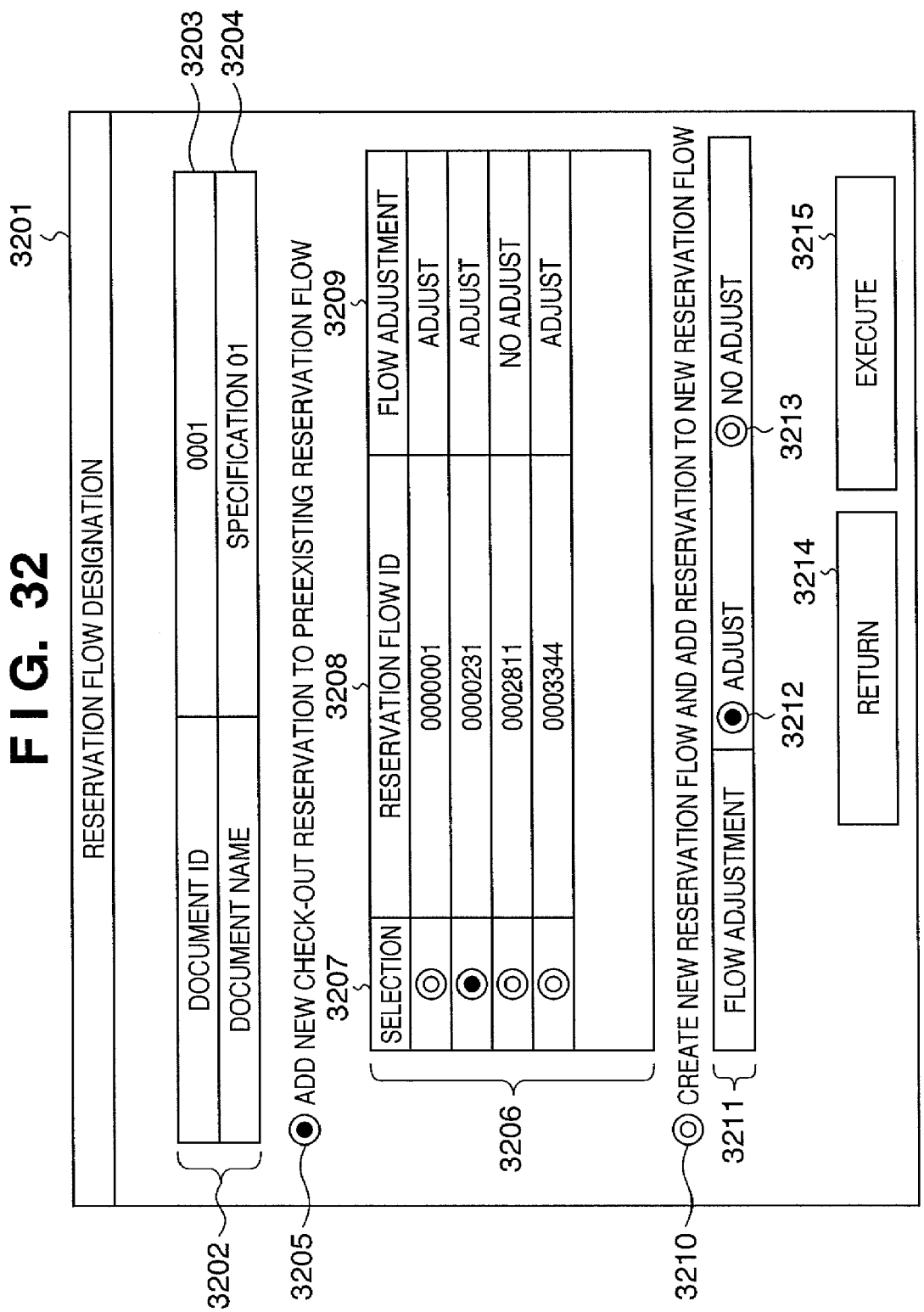
FIG. 32 is a view showing an example of a reservation flow designation screen according to the second embodiment.

FIG. 32 is a view showing an example of a reservation flow designation screen 3201 displayed on the CRT 409 of the client apparatus 102 in FIG. 1.

The reservation flow designation screen 3201 in FIG. 32 is used to, in adding a check-out reservation for a document displayed on the check-out reservation list screen 3101 in FIG. 31, designate a reservation flow including the check-out reservation. The reservation flow designation screen 3201 includes a document information display area 3202, radio button 3205, preexisting reservation flow selection area 3206, radio button 3210, new reservation flow information designation area 3211, and buttons 3214 and 3215.

The document information display area 3202 includes a document ID 3203 and document name 3204. The document ID and document name of a document displayed on the check-out reservation list screen 3101 in FIG. 31 are displayed here.

The radio buttons 3205 and 3210 make a pair. When one of them is ON, the other is OFF. The user turns on the radio button 3205 to add a new check-out reservation to one of preexisting reservation flows. Conversely, the user turns on the radio button 3210 to create a new reservation flow and add a new check-out reservation to it.

The preexisting reservation flow selection area 3206 includes a selection 3207, reservation flow ID 3208, and flow adjustment 3209. A list of reservation flows managed by the user who is operating this screen is displayed here. More specifically, pieces of reservation flow information whose management user ID 2843 matches the user ID of the user who is operating this screen are extracted from the reservation flow information registered in the reservation flow information 2841 in FIG. 28E and displayed in ascending order of reservation flow ID.

The selection 3207 includes radio buttons which allow the user to select only one of reservation flows displayed in the preexisting reservation flow selection area 3206. The selection 3207 is usable only when the radio button 3205 is ON.

The new reservation flow information designation area 3211 includes radio buttons 3212 and 3213. The radio buttons 3212 and 3213 make a pair. When one of them is ON, the other is OFF. In the new reservation flow information designation area 3211, the user designates a value to be set in the flow adjustment 2844 of the reservation flow information 2841 to be newly created and registered in FIG. 28E. When the radio button 3212 is ON, "adjust" is set in the flow adjustment 2844. When the radio button 3213 is ON, "no adjust" is set in the flow adjustment 2844. The meanings of "adjust" and "no adjust" of the flow adjustment will be described later in detail in association with a check-out reservation setting screen in FIG. 33.

The button 3214 finishes the screen without processing. When the user presses the button 3214, the screen returns to the check-out reservation list screen 3101 in FIG. 31.

The button 3215 activates check-out reservation and reservation flow setting processing about the document ID 3203. When the user presses the button 3215, the following information is transmitted to the document check-out reservation processing control unit 2713 of the document management apparatus 101, and the screen changes to a check-out reservation setting screen 3301 in FIG. 33. The information includes document information displayed on the screen and information representing which button is ON, the radio button 3205 or 3210. When the user presses the button 3215 while the radio button 3205 is ON, the information includes reservation flow information corresponding to a radio button of the selection 3207 turned on in the preexisting reservation flow selection area 3206. When the user presses the button 3215 while the radio button 3210 is ON, the information includes information designated in the new reservation flow information designation area 3211.

(Example of Check-Out Reservation Setting Screen)

Figure 33:
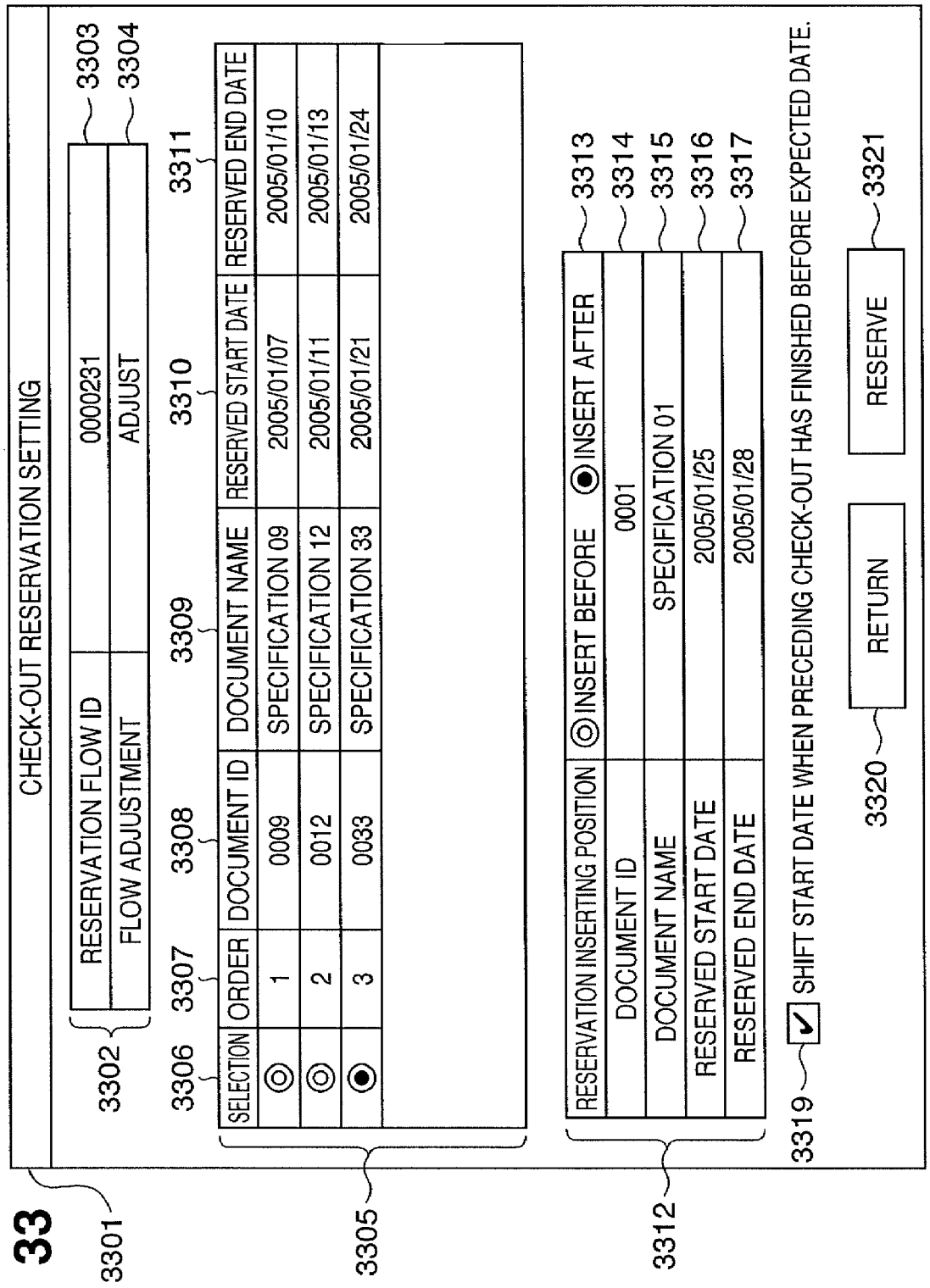
FIG. 33 is a view showing an example of a check-out reservation setting screen according to the second embodiment.

FIG. 33 is a view showing an example of a check-out reservation setting screen displayed on the CRT 409 of the client apparatus 102 in FIG. 1.

The check-out reservation setting screen 3301 in FIG. 33 is used as a setting screen to add a check-out reservation to a reservation flow designated for selection or new creation on the reservation flow designation screen 3201 in FIG. 32. The check-out reservation corresponds to a document displayed in the check-out reservation list screen 3101 in FIG. 31. The check-out reservation setting screen 3301 includes a reservation flow information display area 3302, check-out reservation list information display area 3305, check-out reservation setting information display area 3312, check box 3319, and buttons 3320 and 3321.

The reservation flow information display area 3302 includes a reservation flow ID 3303 and flow adjustment 3304. When the user selects to add a check-out reservation to a preexisting reservation flow on the reservation flow designation screen 3201 in FIG. 32, the information of the selected reservation flow is displayed. When the user selects to newly add a reservation flow on the reservation flow designation screen 3201, no information is displayed in the reservation flow ID 3303 because no reservation flow information is added yet. However, the flow adjustment 3304 displays the flow adjustment value designated in the new reservation flow information designation area 3211 on the reservation flow designation screen 3201 in FIG. 32.

The check-out reservation list information display area 3305 includes a selection 3306, order 3307, document ID 3308, document name 3309, reserved start date 3310, and reserved end date 3311. When the user selects to add a check-out reservation to a preexisting reservation flow on the reservation flow designation screen 3201 in FIG. 32, the items of the check-out reservation list information display area 3305 are set based on the following information.

The base information includes the reservation flow ID 3303 in the reservation flow information display area 3302, and the record 2855 of the reservation flow configuration information 2851 in FIG. 28F, whose reservation flow ID 2852 matches the reservation flow ID 3303. The information also includes the record 2839 of the check-out reservation information 2831 in FIG. 28D, whose reservation ID 2832 matches the reservation ID 2854 of the record 2855. The information also includes the record 2805 of the document information 2801 in FIG. 28A, whose document ID 2802 matches the document ID 2833 of the record 2839.

As a result, the items are displayed in the check-out reservation list information display area 3305 in ascending order of order 3307. In the items, the flow orders 2853 are displayed in the order 3307. The document IDs 2833 are displayed in the document ID 3308. The document names 2803 are displayed in the document name 3309. The reserved check-out dates 2834 are displayed in the reserved start date 3310. The expected check-in dates 2836 are displayed in the reserved end date 3311.

The selection 3306 includes radio buttons which allow the user to select only one of the pieces of information from the displayed list. In an example of FIG. 33, the selected radio button is indicated in a form of black inner circle.

When the user selects to create a new reservation flow and add a check-out reservation in the reservation flow designation screen 3201 in FIG. 32, no information is displayed in the check-out reservation list information display area 3305. The selection 3306 is not displayed, either.

The check-out reservation setting information display area 3312 includes a reservation inserting position 3313, document ID 3314, document name 3315, reserved start date 3316, and reserved end date 3317.

The reservation inserting position 3313 includes radio buttons "insert before" and "insert after". Input to the reservation inserting position 3313 is enabled only in the following case. First, the user selects to add a check-out reservation to a preexisting reservation flow on the reservation flow designation screen 3201 in FIG. 32. Additionally, one or more pieces of check-out reservation information are displayed in the check-out reservation list information display area 3305, and one of the radio buttons of the selection 3306 is turned on.

The user can turn on one of the radio buttons "insert before" and "insert after" of the reservation inserting position 3313. In an example of FIG. 33, the selected radio button is indicated in a form of black inner circle. This indicates that a new check-out reservation should be added before or after a check-out reservation whose selection 3306 is ON. When the user selects to create a new reservation flow and add a check-out reservation on the reservation flow designation screen 3201 in FIG. 32, no information is displayed in the check-out reservation list information display area 3305. Hence, the reservation inserting position 3313 is also unusable.

The reserved start date 3316 and reserved end date 3317 are in an input enable state to make the user designate the reserved period. The user designates expected start and end dates using a predetermined format (year, month, and day in this example).

However, when the user designates a position to insert a check-out reservation by the selection 3306 in the check-out reservation list information display area 3305 and the reservation inserting position 3313, date values that can be designated as the reserved start date 3316 and reserved end date 3317 are limited. When check-out reservation information exists before the inserting position, only dates later than the reserved end date 3311 of the check-out reservation information before can be designated as the reserved start date 3316. When check-out reservation information exists after the inserting position, only dates earlier than the reserved start date 3310 of the check-out reservation information after can be designated as the reserved end date 3317.

The check box 3319 is used to designate whether to advance a start of reserved check-out if the previous reservation is canceled, or the document is checked in before the reserved end date. When the check box 3319 has a check mark, the next check-out starts immediately after the end of the previous reservation. Without a check mark, check-out is not performed until the designated reserved start date.

The difference between the check box 3319 and the flow adjustment 3304 in the reservation flow information display area 3302 will be described herein in detail.

The flow adjustment 3304 designates whether or not to advance the reserved check-out start date in the reservation flow to which a check-out reservation is to be added. The flow adjustment 3304 is designated when one check-out reservation flow has at least two registered check-out reservations, and the check-in of the first check-out reservation is executed before the expected check-out end date. The flow adjustment 3304 designates whether or not to advance the check-out start date of the next check-out reservation. If the user designates "adjust" and advancing by flow adjustment is possible, advancing is executed. If the user designates "no adjust", advancing is not executed.

The example in FIG. 33 will be explained. The flow adjustment 3304 in the reservation flow information display area 3302 is designated to "adjust". This indicates that advancing by flow adjustment is executed in this reservation flow. In the check-out reservation of the first line of the check-out reservation list information display area 3305, that is, the document whose order 3307 and document ID 3308 are "1" and "0009", respectively, the reserved end date 3311 is "Jan. 10, 2005". In the document of the second line, that is, the document whose order 3307 and document ID 3308 are "2" and "0012", respectively, the reserved start date 3310 is "Jan. 11, 2005". This indicates that check-in of the document with the document ID "0009" is scheduled on Jan. 10, 2005, and check-out of the document with the document ID "0012" is scheduled on the next day, that is, Jan. 11, 2005.

With "flow adjustment", if the document of the first line with the document ID "0009" is checked in one day before the expected check-in date, that is, on Jan. 9, 2005, the reserved start date of the next document with document ID "0012" is advanced to Jan. 10, 2005. The reserved end date is also shifted by the number of shifted days. Even for the third and subsequent reservations, the reserved start date and reserved end date are shifted if possible.

The check box 3319 does not set advancing of each check-out reservation in a reservation flow, unlike "flow adjustment". With the setting of the check box 3319, when a plurality of check-out reservations are registered for one document and check-in of a preceding check-out reservation is executed before the expected check-in date, the reserved start date of the next check-out reservation is advanced.

The button 3320 cancels the set contents on the screen and changes the screen to a reservation flow designation screen 3201 in FIG. 32.

The button 3321 activates processing of registering the check-out reservation information set on the screen. When the user presses the button 3321, the following information is transmitted to the document check-out reservation processing control unit 2713 of the document management apparatus 101. The document management apparatus 101 registers the information in the reservation flow information storage unit 2707 and check-out reservation information storage unit 2705. Then, the screen changes to a check-out reservation completion screen 3401 in FIG. 34. The information includes the reservation flow information displayed on the check-out reservation setting screen 3301. When one or more pieces of check-out reservation information are displayed in the check-out reservation list information display area 3305, the information includes the order 3307 of the line with the selection 3306 turn on. The information also includes the information input to the check-out reservation setting information display area 3312.

Figure 36:
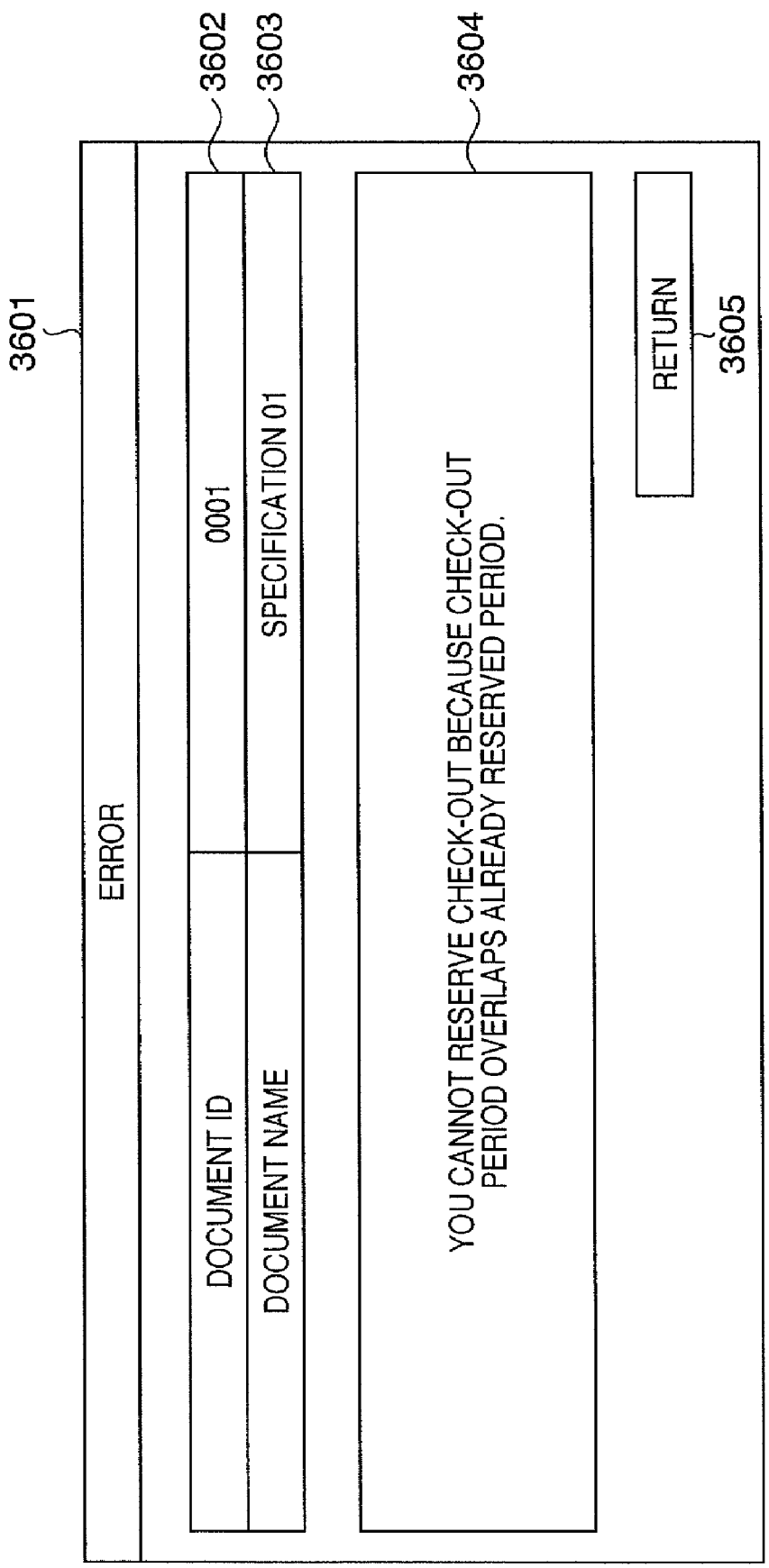
FIG. 36 is a view showing an example of an error screen according to the second embodiment.

If an error has occurred during the processing of the document check-out reservation processing control unit 2713, the screen changes to an error screen 3601 in FIG. 36. The sequence of this processing will be described later in detail with reference to FIG. 43.

(Example of Check-Out Reservation Completion Screen)

Figure 34:
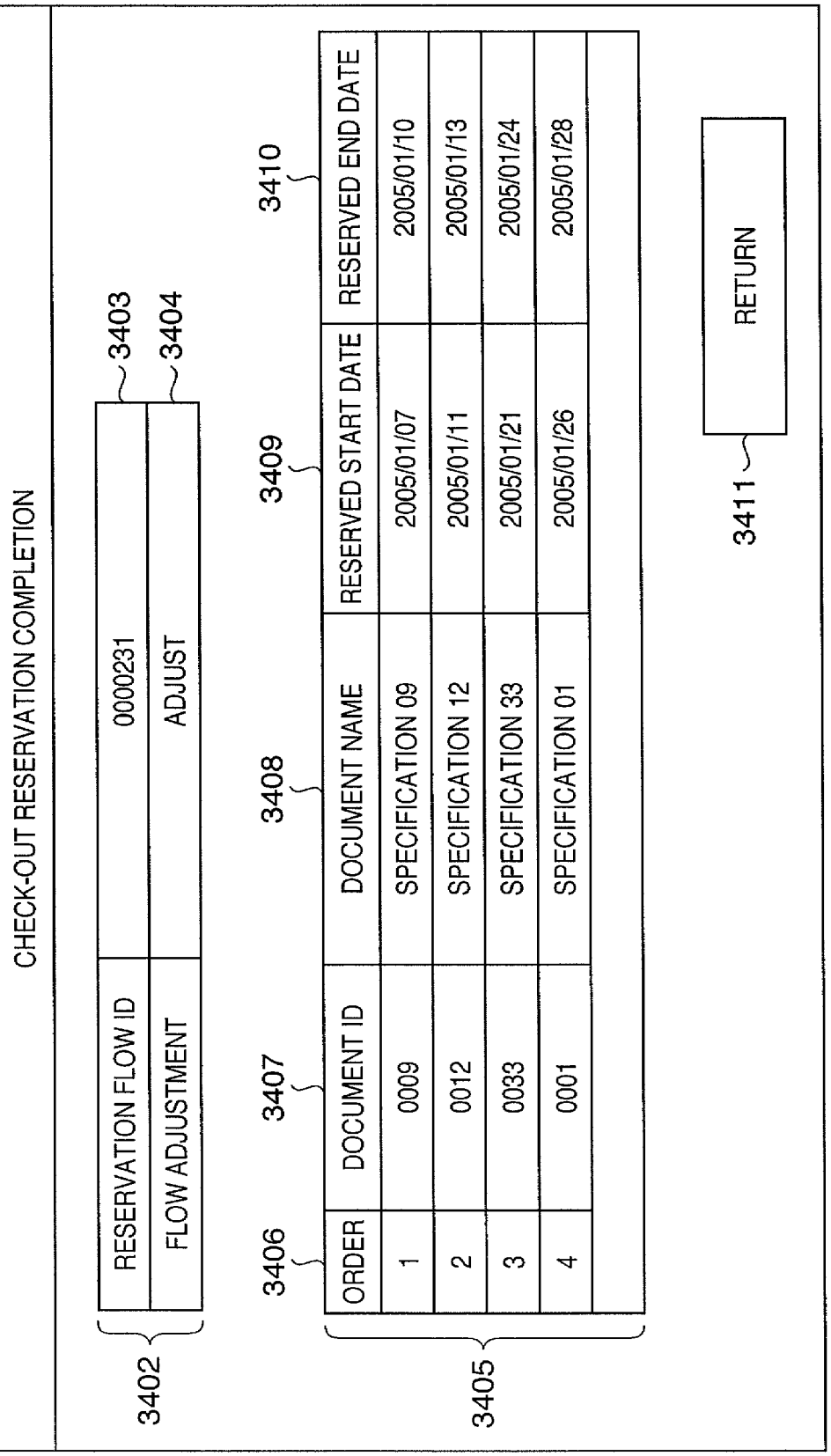
FIG. 34 is a view showing an example of a check-out reservation completion screen according to the second embodiment.

FIG. 34 is a view showing an example of the check-out reservation completion screen 3401 displayed on the CRT 409 of the client apparatus 102 in FIG. 1.

The check-out reservation completion screen 3401 in FIG. 34 is used to display the result of the document check-out reservation processing activated by pressing the button 3321 on the check-out reservation setting screen 3301 in FIG. 33. The check-out reservation completion screen 3401 includes a reservation flow information display area 3402, check-out reservation list information display area 3405, and button 3411.

The reservation flow information display area 3402 includes a reservation flow ID 3403 and flow adjustment 3404. When the user selects to add a check-out reservation to a preexisting reservation flow on the reservation flow designation screen 3201 in FIG. 32, the information of the selected reservation flow is displayed. When the user selects to newly add a reservation flow on the reservation flow designation screen 3201, the reservation flow ID of the newly added reservation flow is displayed. The flow adjustment 3404 indicates the flow adjustment value designated in the new reservation flow information designation area 3211 of the reservation flow designation screen 3201 in FIG. 32.

The check-out reservation list information display area 3405 includes an order 3406, document ID 3407, document name 3408, reserved start date 3409, and reserved end date 3410.

The check-out reservation list information display area 3405 is the same as the check-out reservation list information display area 3305 in FIG. 33. That is, the check-out reservation list information display area 3405 is a display area to confirm check-out reservation information registered in the reservation flow, including the check-out reservation information newly added in FIG. 33. The newly added check-out reservation information is highlighted as compared to the remaining check-out reservation information, as shown in the check-out reservation list information display area 3405.

The check-out reservations are listed in ascending order of order 3406. The newly added check-out reservation information is inserted to a position designated by the selection 3306 and reservation inserting position 3313 in FIG. 33. For each check-out reservation information after the inserting position, the sequence number of the order 3406 is incremented by one upon inserting a piece of check-out reservation information.

On the check-out reservation setting screen 3301 in FIG. 33, the order 3307 indicates sequence numbers 1, 2, and 3. The selection 3306 corresponding to "2" is turned on, and "insert after" of the reservation inserting position 3313 is selected. When a new check-out reservation is added, the new check-out reservation information is added to the third position after "2". The third check-out reservation information before addition is displayed as fourth check-out reservation information in the check-out reservation list information display area 3405.

The button 3411 finishes the screen. When the user presses the button 3411, the screen returns to the check-out reservation list screen 3101 in FIG. 31.

(Example of Check-Out Reservation Canceling Screen)

FIG. 35 is a view showing an example of the check-out reservation canceling screen 3501 displayed on the CRT 409 of the client apparatus 102 in FIG. 1.

The check-out reservation canceling screen 3501 in FIG. 35 is used as a confirmation screen in canceling check-out reservation information displayed on the check-out reservation list screen 3101 in FIG. 31, when the user presses the button 3111. The check-out reservation canceling screen 3501 includes a document ID 3502, document name 3503, reserved start date 3504, reserved end date 3505, and buttons 3506 and 3507.

The document ID 3502, document name 3503, reserved start date 3504, and reserved end date 3505 are areas to display cancel target reservation information from the document information in FIG. 28A and the check-out reservation information in FIG. 28D. The displayed contents represent the contents selected in the check-out reservation information display area 3106 of the check-out reservation list screen 3101 in FIG. 31.

The button 3506 is used to cancel the processing of canceling the reservation information displayed on the screen. When the user presses the button 3506, the screen returns to the check-out reservation list screen 3101 in FIG. 31 without executing the reservation cancel processing.

The button 3507 activates processing of canceling the check-out reservation information displayed on the screen. When the user presses the button 3507, the check-out reservation information displayed on the screen is transmitted to the document check-out reservation processing control unit 2713 of the document management apparatus 101. The check-out reservation information is deleted from the checkout reservation information in FIG. 28D which is stored in the check-out reservation information storage unit 2705 and the reservation flow information in FIG. 28F which is stored in the reservation flow information storage unit 2707. Then, the screen changes to the check-out reservation list screen 3101 in FIG. 31. After deletion of the reservation information, if a reservation follows the canceled reservation, reserved period shifting processing is done in accordance with the contents of the reservation before the screen changes to the check-out reservation list screen 3101.

If an error has occurred during the processing of the document check-out reservation processing control unit 2713, the screen changes to the error screen 3601 in FIG. 36.

(Example of Error Screen)

FIG. 36 is a view showing an example of the error screen 3601 displayed on the CRT 409 of the client apparatus 102 in FIG. 1.

The error screen 3601 in FIG. 36 is used to display, on the client apparatus 102, error contents when an error has occurred during each processing executed in the document management apparatus 101. The error screen 3601 includes a document ID 3602 of the target document with an error, document name 3603, error message display area 3604, and button 3605.

The document ID 3602 and document name 3603 are areas to display the target document information with the error.

The error message display area 3604 displays the contents of the error that has occurred. The message displayed here need not always be a character string and can be any other means such as an image.

The button 3605 finishes the screen. When the user presses the button 3605, the screen returns to the document browsing screen 2901 in FIG. 29 or the check-out reservation list screen 3101 in FIG. 31.

(Example of Check-Out Screen)

Figure 37:
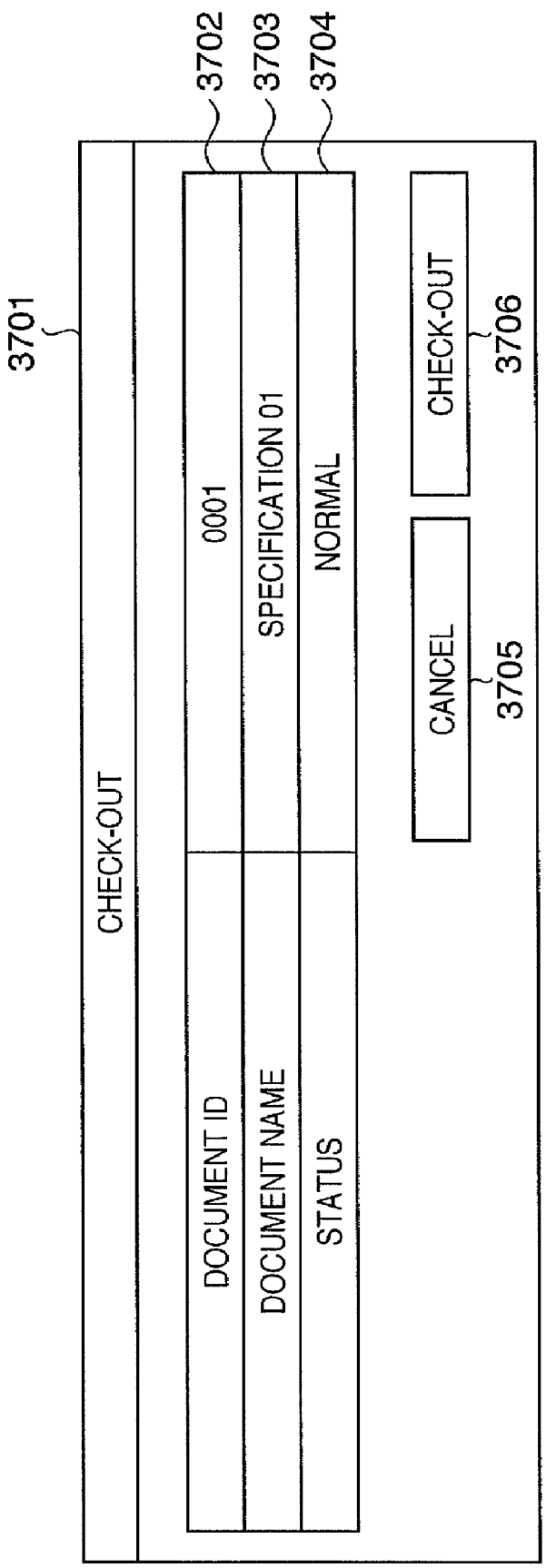
FIG. 37 is a view showing an example of a check-out screen according to the second embodiment.

FIG. 37 is a view showing an example of a check-out screen displayed on the CRT 409 of the client apparatus 102 in FIG. 1.

A check-out screen 3701 in FIG. 37 is used to confirm the check-out processing of the selected document (which is "specification 01" here) selected on the document browsing screen 2901 in FIG. 29. The check-out screen 3701 includes a document ID 3702, document name 3703, status 3704, and buttons 3705 and 3706.

The document ID 3702, document name 3703, and status 3704 are areas to display the latest information, at the time of displaying this screen, of the selected document 2906 selected on the document browsing screen 2901 in FIG. 29.

The button 3705 is used to cancel the processing of checking out the document information displayed on the screen. When the user presses the button 3705, the screen returns to the document browsing screen 2901 in FIG. 29 without executing the check-out processing.

The button 3706 activates processing of checking out the document indicated by the document ID 3702. When the user presses the button 3706, the document information displayed on the screen is transmitted to the document check-out processing control unit 2711 of the document management apparatus 101. When the document check-out processing control unit 2711 finishes the check-out processing, the screen changes to a check-out completion screen 3901 in FIG. 39. However, if a limitation is found in the check-out processing of the document check-out processing control unit 2711, the contents of the limitation are displayed on a check-out limitation accepting screen 3801 in FIG. 38. After the user accepts the limitation, the check-out processing is performed. If an error has occurred during the processing of the document check-out processing control unit 2711, the screen changes to the error screen 3601 in FIG. 36. The sequence of the check-out processing will be described later in detail with reference to FIG. 46.

(Example of Check-Out Limitation Accepting Screen)

FIG. 38 is a view showing an example of the check-out limitation accepting screen 3801 displayed on the CRT 409 of the client apparatus 102 in FIG. 1.

The check-out limitation accepting screen 3801 in FIG. 38 includes a document ID 3802, document name 3803, limitation content display area 3804, and buttons 3805 and 3806.

The document ID 3802 and document name 3803 are areas to display the document information of the check-out target.

The limitation content display area 3804 is an area to display the contents of a limitation for the user in check-out processing. The limitation content display area 3804 displays, for example, a message representing that the period when the user can check out and operate a document is limited by another reservation.

The button 3805 is used to cancel the document information check-out processing if the user cannot agree with the limitation contents displayed on the screen. When the user presses the button 3805, the screen returns to the document browsing screen 2901 in FIG. 29 without executing the check-out processing.

The button 3806 is used to continue the document information check-out processing if the user can agree with the limitation contents displayed on the screen. When the user presses the button 3806, the document check-out processing control unit 2711 of the document management apparatus 101 executes the check-out processing. When the check-out processing is ended, the screen changes to the check-out completion screen 3901 in FIG. 39. If an error has occurred during the processing of the document check-out processing control unit 2711, the screen changes to the error screen 3601 in FIG. 36.

(Example of Check-Out Completion Screen)

Figure 39:
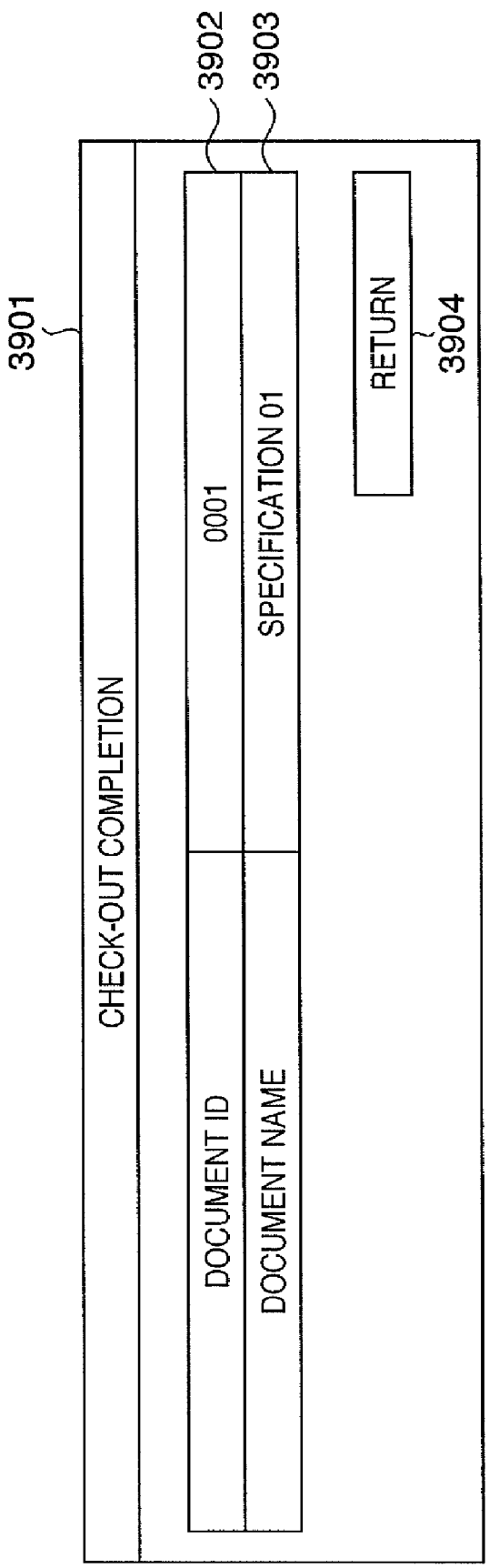
FIG. 39 is a view showing an example of a check-out completion screen according to the second embodiment.

FIG. 39 is a view showing an example of the check-out completion screen 3901 displayed on the CRT 409 of the client apparatus 102 in FIG. 1.

The check-out completion screen 3901 in FIG. 39 is used to display the result of the check-out processing and includes a document ID 3902, document name 3903, and button 3904. The check-out processing is activated by pressing the button 3706 on the check-out screen 3701 in FIG. 37 or the button 3806 on the check-out limitation accepting screen 3801 in FIG. 38.

The document ID 3902 and document name 3903 are areas to notify the user of the document information that is checked out.

The button 3904 finishes the screen. When the user presses the button 3904, the screen returns to the document browsing screen 2901 in FIG. 29.

(Example of Check-In Screen)

Figure 40:
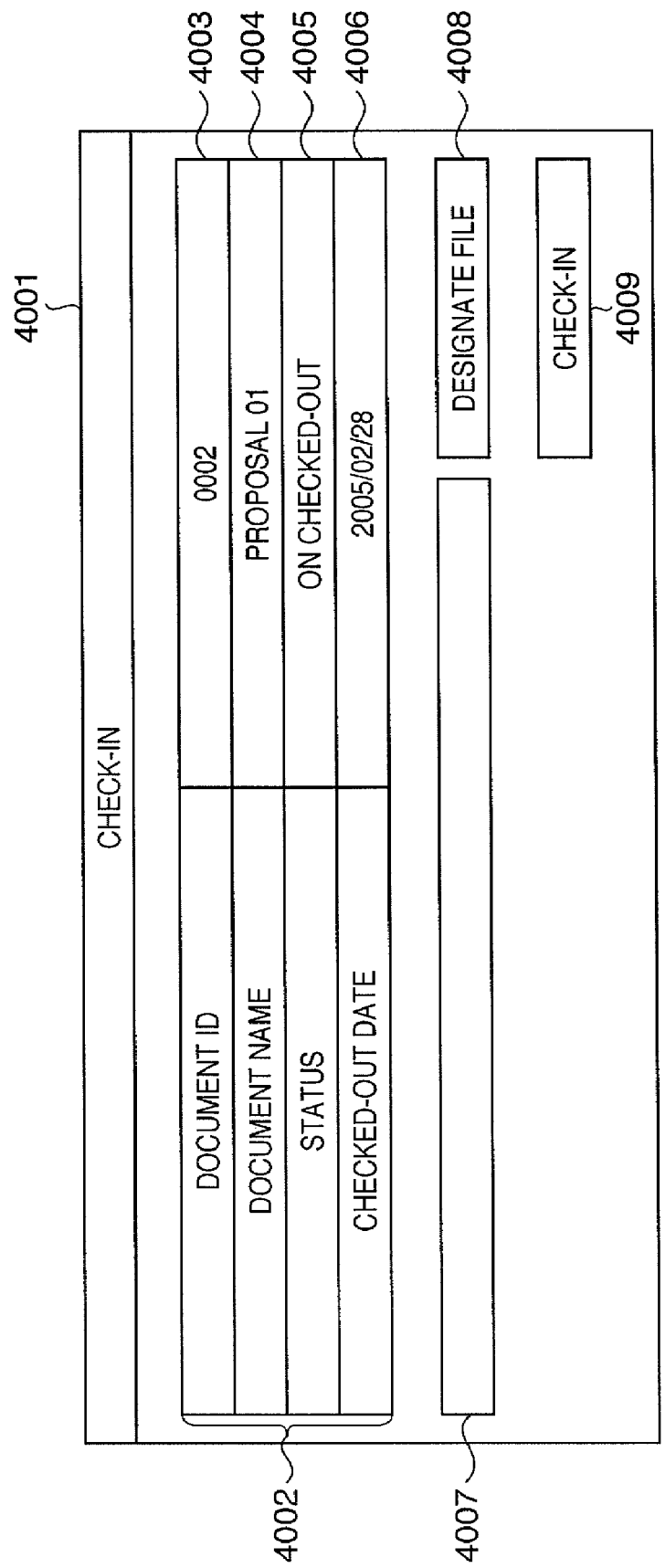
FIG. 40 is a view showing an example of a check-in screen according to the second embodiment.

FIG. 40 is a view showing an example of a check-in screen 4001 displayed on the CRT 409 of the client apparatus 102 in FIG. 1.

The check-in screen 4001 in FIG. 40 is used to execute check-in processing setting of the selected document (which is "proposal 01" here) selected on the document browsing screen 2901 in FIG. 29. The check-in screen 4001 includes a check-in document information display area 4002, document file information display area 4007 where a document file is registered in check-in, and buttons 4008 and 4009.

The check-in document information display area 4002 is an area to display the latest information, at the time of displaying this screen, of the selected document 2906 as a check-in target. The check-in document information display area 4002 includes a document ID 4003, document name 4004, status 4005, and checked-out date 4006.

The document file information display area 4007 is an area to display information indicating a document file to be registered at the time of check-in. The document file information display area 4007 displays the path and file name of the document information to be registered. The user can also directly input the information.

The button 4008 activates processing of designating a file to be registered. The operation of this button makes it possible to identify a local file provided by the client apparatus or a file in a remote site to be accessed via the network. The screen for this is provided by the OS and has no particular characteristic feature in the embodiment, and a detailed description based on a drawing will be omitted. The path and file name of a registration target document selected on the selection screen displayed by the button are displayed in the document file information display area 4007.

The button 4009 activates check-in processing of registering the file designated in the document file information display area 4007 as a new version of the document. When the user presses the button 4009, information necessary for checking in the document displayed on the screen is transmitted to the document check-in processing control unit 2712 of the document management apparatus 101.

When the document check-in processing control unit 2712 finishes the check-in processing, the screen changes to a check-in completion screen 4101 in FIG. 41. If an error has occurred during the processing of the document check-in processing control unit 2712, the screen changes to the error screen 3601 in FIG. 36. The sequence of the check-in processing will be described later in detail with reference to FIG. 48.

(Example of Check-In Completion Screen)

FIG. 41 is a view showing an example of the check-in completion screen 4101 displayed on the CRT 409 of the client apparatus 102 in FIG. 1.

The check-in completion screen 4101 in FIG. 41 is used to display the result of the document check-in processing activated by pressing the button 4009 on the check-in screen 4001 in FIG. 40. The check-in completion screen 4101 includes a document ID 4102, document name 4103, status 4104, latest version ID 4105, and button 4106.

The document ID 4102, document name 4103, status 4104, and latest version ID 4105 are areas to notify the user of the document information that is checked in.

The button 4106 finishes the screen. When the user presses the button 4106, the screen returns to the document browsing screen 2901 in FIG. 29.

<Example of Format of Notification Mail of Embodiment>

Figure 42:
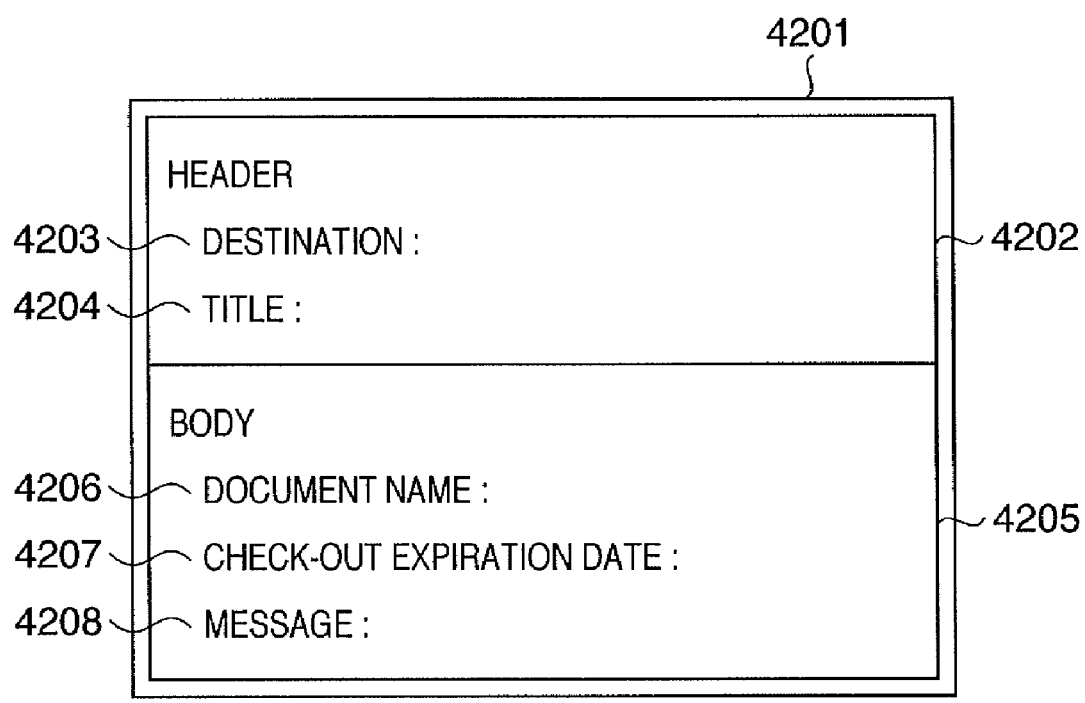
FIG. 42 is a view showing an example of the format of transmission mail according to the second embodiment.

FIG. 42 is a view showing an example of the format of notification mail to the client apparatus used in this embodiment.

A mail format 4201 in FIG. 42 includes a mail header area 4202 and a mail body area 4205.

The mail header area 4202 includes a destination 4203 that describes a mail address as a destination, and a title 4204 that describes the title of the mail to be transmitted. On an actual mail protocol, a number of pieces of header information except the above-described information are also defined. In this embodiment, only pieces of minimum necessary information are shown, though it is not particularly impossible to add any other header information.

The mail body area 4205 includes a document name 4206 as a target, a check-out expiration date 4207 of the document with the document name 4206, and a message 4208 permanently displayed for the mail.

The mail format is prepared by setting data from an external program.

<Examples of Operation of Document Management Apparatus of Embodiment>

Examples of the operation of the document management apparatus according to the embodiment will be described below with reference to the flowcharts.

(Example of Processing of Causing Document Management Apparatus 101 to Execute Document Check-Out Reservation)

Figure 43:
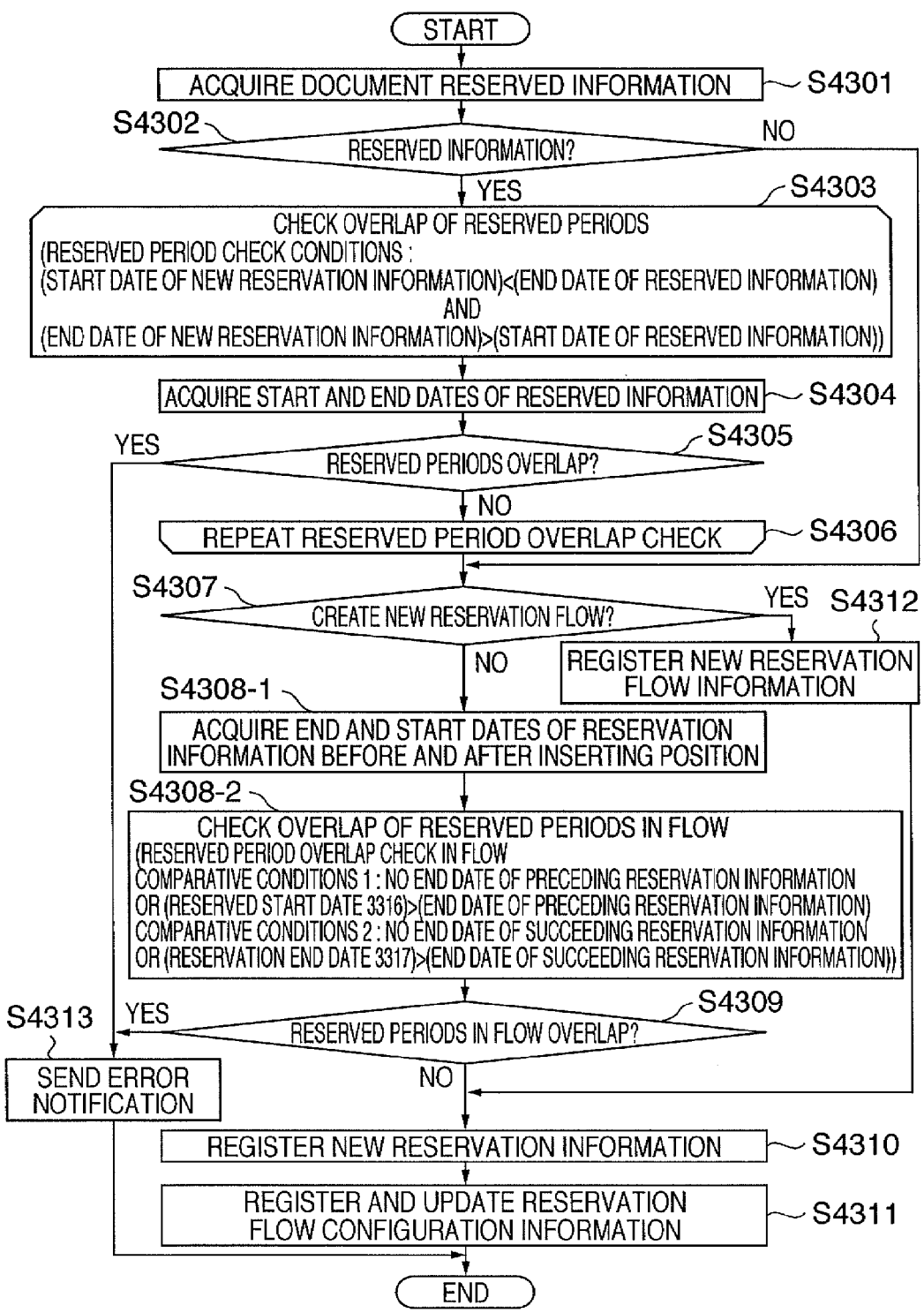
FIG. 43 is a flowchart illustrating an example of a procedure of check-out reservation processing according to the second embodiment.

FIG. 43 is a flowchart illustrating an example of a procedure of check-out reservation processing by the document management apparatus 101 shown in FIG. 1.

The processing in FIG. 43 is activated by pressing the button 3321 on the check-out reservation setting screen 3301 in FIG. 33, which is displayed on the CRT 409 of the client apparatus 102. FIG. 43 illustrates the sequence of processing executed by the document check-out reservation processing control unit 2713 of the document management apparatus 101. The CPU 201 in FIG. 2 executes this check-out reservation processing.

Data necessary for this check-out reservation processing are as follows. The information includes the reservation flow ID 3303, flow adjustment 3304, selection 3306, and reservation inserting position 3313, which are input on the check-out reservation setting screen 3301. The information also includes the document ID 3314, reserved start date 3316, reserved end date 3317, check box 3319, and the user ID of the user who is executing this operation.

As shown in FIG. 43, in step S4301, the check-out reservation information 2831 is acquired from the check-out reservation information storage unit 2705 via the check-out reservation information operation unit 2706 of the document management apparatus 101. The check-out reservation information 2831 matches the document ID 3314 in FIG. 33 which is received from the client apparatus 102. When the acquisition processing is ended, the process advances to step S4302. In step S4302, it is determined whether the check-out reservation information acquired in step S4301 exists. If the information exists, the process advances to step S4303. If the information does not exist, the process advances to step S4307.

In step S4303, control of the repetitive processing up to S4306 is done in a number as large as the number records of the check-out reservation information 2831 acquired in step S4301.

First, one of the records of the check-out reservation information 2831 is specified, and the process advances to step S4304. In step S4304, the values of the reserved check-out date 2834 and expected check-in date 2836 of the check-out reservation information 2831 are acquired from the record, and the process advances to step S4305.

In step S4305, it is confirmed whether the two items acquired in step S4304, and the reserved start date 3316 and reserved end date 3317 as input values in the check-out reservation processing satisfy the following conditions.

Comparative Conditions:

(New reserved start date 3316)<(Reserved expected check-in date 2836),

AND (New reserved end date 3317)>(Reserved check-out date 2834).

If the comparative conditions are satisfied, the period to be reserved newly overlaps the already reserved period. This is determined as an error, and the process advances to step S4313. If neither comparative conditions are satisfied, the period to be reserved newly does not overlap the reserved period. The process advances to step S4306. This determination corresponds to an insertion enable/disable determination means.

Step S4306 indicates that overlap check is ended for one record of the check-out reservation information 2831 acquired in step S4301. If the check-out reservation information 2831 still has a record, the process returns to step S4304. If all records of the check-out reservation information 2831 are processed, the process advances to step S4307.

Since it is confirmed that the new reserved data does not overlap any existing reserved data, and registration of the new check-out reservation information is enabled, the processing of the reservation flow in which the check-out reservation information should be registered is determined in step S4307.

When the user turns on the radio button 3205 on the reservation flow designation screen 3201 in FIG. 32, a reservation flow to which a check-out reservation is to be added is selected by the selection 3207 in the preexisting reservation flow selection area 3206. The reservation flow ID is designated in the reservation flow ID 3303 on the check-out reservation setting screen 3301 in FIG. 33. On the other hand, when the user turns on the radio button 3210 on the reservation flow designation screen 3201, new reservation flow creation is selected. Hence, the reservation flow ID 3303 on the check-out reservation setting screen 3301 is blank.

As described above, if the reservation flow ID 3303 is blank, the process advances to step S4312 to create a new reservation flow. To add a check-out reservation to a preexisting reservation flow, the process advances to step S4308.

In step S4308-1, pieces of check-out reservation information before and after the position where a new check-out reservation should be added to a preexisting reservation flow are acquired. The check-out reservation information immediately before the inserting position of the new reservation information will be referred to as "preceding reservation information", and the check-out reservation information immediately after the inserting position will be referred to as "succeeding reservation information".

To add new check-out reservation information to a preexisting reservation flow, a piece of existing reservation information should have been selected by the selection 3306 on the check-out reservation setting screen 3301 in FIG. 33, and the order 3307 should have been acquired. Hence, a record that matches the reservation flow ID 2852 and flow order 2853 of the reservation flow configuration information 2851 in FIG. 28F is searched for on the basis of the reservation flow ID 3303 and designated order 3307. Consequently, the reservation ID 2854 of the corresponding record is acquired. When the user designates "insert before" of the reservation inserting position 3313, the reservation ID is that of succeeding reservation information (="succeeding reservation ID"). When the user designates "insert after" of the reservation inserting position 3313, the reservation ID is that of preceding reservation information (="preceding reservation ID").

When the user designates "insert before" of the reservation inserting position 3313, the value of the order 3307 used for the search is decremented by one, and a record that matches the reservation flow ID 2852 and flow order 2853 is searched for. If a matching record exists in the reservation flow configuration information 2851, the reservation ID 2854 of the record is the "preceding reservation ID". The check-out reservation information 2831 in FIG. 28D is searched using the preceding reservation ID, thereby acquiring a record whose reservation ID 2832 matches the preceding reservation ID. The "expected check-in date" of the record is the "end date of preceding reservation information". However, if the topmost check-out reservation information is designated as the reservation inserting position, no corresponding data exists. In this case, there is no "end date of preceding reservation information".

On the other hand, when the user designates "insert after" of the reservation inserting position 3313, the value of the order 3307 is incremented by one, and a record that matches the reservation flow ID 2852 and flow order 2853 is searched for. If a matching record exists in the reservation flow configuration information 2851, the reservation ID 2854 of the record is the "succeeding reservation ID". The check-out reservation information 2831 in FIG. 28D is searched using the "succeeding reservation ID", thereby acquiring a record whose reservation ID 2832 matches the succeeding reservation ID. The "expected check-in date" of the record is the "start date of succeeding reservation information". However, if the endmost check-out reservation information is designated as the reservation inserting position, no corresponding data exists. In this case, there is no "start date of succeeding reservation information".

Using the "end date of preceding reservation information" and "start date of succeeding reservation information", determination in step S4309 is executed.

In step S4308-2, the reserved start date and reserved end date of the new check-out reservation information to be added are respectively compared with the "end date of preceding reservation information" and "start date of succeeding reservation information" acquired in step S4308-1. It is checked by this comparison whether the period of the check-out reservation information to be added overlaps the periods of the preceding and succeeding check-out reservation information in the reservation flow. The comparative conditions are as follows.

Comparative Condition 1:
No end date of preceding reservation information,
OR
(New reserved start date 3316)>(End date of preceding reservation information).

Comparative Condition 2:
No start date of succeeding reservation information,
OR
(New reserved end date 3317)>(Start date of succeeding reservation information).

In step S4309, it is checked whether or not a period of the new reserved check-out overlaps periods of the already reserved check-out information in the flow. When both comparative conditions 1 and 2 are satisfied, it is determined that an appropriate period is set. The process advances to step S4310 to register the new check-out reservation information. If one of the conditions is not satisfied, the period overlaps the preceding or succeeding reservation information in the reservation flow. This is determined as an error, and the process advances to step S4313.

In step S4310, new data are registered in the check-out reservation information 2831.

As for the items of the check-out reservation information 2831, a new record 2839 is created based on the data set in the following way.

The reservation ID 2832 is set by newly generating a unique ID value. This ID uniquely identifies the record 2839 in the check-out reservation information 2831. The document ID 3314 designated on the check-out reservation setting screen 3301 in FIG. 33 is set in the document ID 2833.

The reserved start date 3316 designated on the check-out reservation setting screen 3301 in FIG. 33 is set in the reserved check-out date 2834. The user ID of the user who is currently logging in is set in the reserving user ID 2835. The reserved end date 3317 designated on the check-out reservation setting screen 3301 in FIG. 33 is set in the expected check-in date 2836.

If the check box 3319 on the check-out reservation setting screen 3301 in FIG. 33 is ON, "TRUE" is set in the preceding reservation tracking flag 2837. If the check box 3319 is OFF, "FALSE" is set. "Unprocessed" is set in the status 2838.

In step S4311, reservation flow configuration information corresponding to the check-out reservation information registered in step S4310 is newly registered in the reservation flow configuration information 2851. In addition, the flow order values in the preexisting reservation flow configuration information are changed.

As for the items of the reservation flow configuration information 2851, a new record 2855 is created based on the data set in the following way.

The values to be set in the flow order 2853 and update of the flow order values in the preexisting reservation flow configuration information will be described first.

The flow order 2853 is set by sorting pieces of check-out reservation information 2831 with the same reservation flow ID in ascending order of reserved check-out date 2834 and assigning consecutive numbers 1, 2, 3, . . . sequentially from the top.

When the user selects "create new reservation flow information and add check-out reservation" on the reservation flow designation screen 3201, only one piece of check-out reservation information added in step S4310 exists in the reservation flow that is currently being processed. In this case, the flow order 2853 is "1". Additionally, the processing of updating flow order values in preexisting reservation flow configuration information does not occur.

When the user selects "add check-out reservation to preexisting reservation flow" on the reservation flow designation screen 3201, the check-out reservation information can be inserted between pieces of existing check-out reservation information. Hence, not only new record addition to the reservation flow configuration information but also the processing of updating the values of the flow orders 2853 of other records having the same reservation flow ID is necessary.

First, the check-out reservation information 2831 is searched to acquire all records 2839 having the same reservation flow ID as the reservation flow ID that is currently being processed. To do this, the reservation ID 2832 and record 2839 are necessary. The reservation IDs 2832 of the acquired information also include the reservation ID of the check-out reservation information added in step S4310 in response to the current processing request. The records are sorted in ascending order of reserved check-out date 2834, and consecutive numbers 1, 2, 3, . . . are assigned to the records sequentially from the top. With this processing, the reservation IDs 2832 and new flow order values corresponding to them are decided. That is, the correspondence table of the reservation IDs and flow order values is completed.

Based on the correspondence table of the reservation IDs and flow order values, the reservation flow configuration information 2851 is searched based on the reservation ID of the preexisting reservation flow configuration information. The new flow order value in the correspondence table is set in the flow order 2853, and the data is updated. This processing is repeatedly executed.

The flow order 2853 of the new reservation flow configuration information to be added now has a value corresponding to the reservation ID of the check-out reservation information 2831 added in step S4310. The flow order 2853 of the reservation flow configuration information is decided in the above-described manner.

When the user selects "add check-out reservation to preexisting reservation flow" by turning on the radio button 3205 on the reservation flow designation screen 3201 in FIG. 32, setting is done in the following way. That is, the reservation flow ID 3303 designated on the check-out reservation setting screen 3301 in FIG. 33 is set. When the user selects "create new reservation flow information and add check-out reservation" by turning on the radio button 3210 on the reservation flow designation screen 3201, setting is done in the following way. That is, the reservation flow ID 2842 of the record 2846 additionally registered in the reservation flow information 2841 in step S4313 (to be described later) is set.

The reservation ID 2854 of the reservation flow configuration information is the same as that designated in the reservation ID 2832 of the check-out reservation information 2831 added in step S4310.

With the above processing, the values of the items of the record 2855 of the new reservation flow configuration information 2851 to be added are decided. This information is newly registered, and step S4311 is ended.

Step S4312 is processing when the user selects to create a new reservation flow by turning on the radio button 3210 on the reservation flow designation screen 3201. In this processing, a new record 2845 of the reservation flow information 2841 is created and registered. The values of items included in the record 2845 are decided in the following way.

As the reservation flow ID 2842, information that uniquely identifies the reservation flow information 2841 is arbitrarily created and set. In this embodiment, the information is arbitrarily created in the processing. However, the user may designate a value. The management user ID 2843 is the ID of the user who is currently logging in. The flow adjustment 2844 is decided depending on the states of the radio buttons 3212 and 3213 in the new reservation flow information designation area 3211 in FIG. 32. When the radio button 3212 is ON, "adjust" is set. When the radio button 3213 is ON, "no adjust" is set. The record 2845 is created based on the above contents and newly recorded in the reservation flow information 2841. The process advances to the next step.

Step S4313 is executed when, for example, an overlap error is detected in checking the reserved period. The error contents are output to the error screen 3601 in FIG. 36 to notify the user of the error contents. When the user confirms the error information and presses the button 3605 on the error screen 3601, the check-out reservation processing is ended without making a reservation.

When the processing is ended, the check-out reservation completion screen 3401 in FIG. 34 is displayed.

(Example of Processing of Causing Document Management Apparatus 101 to Confirm End State of Reserved Period)

Figure 44:
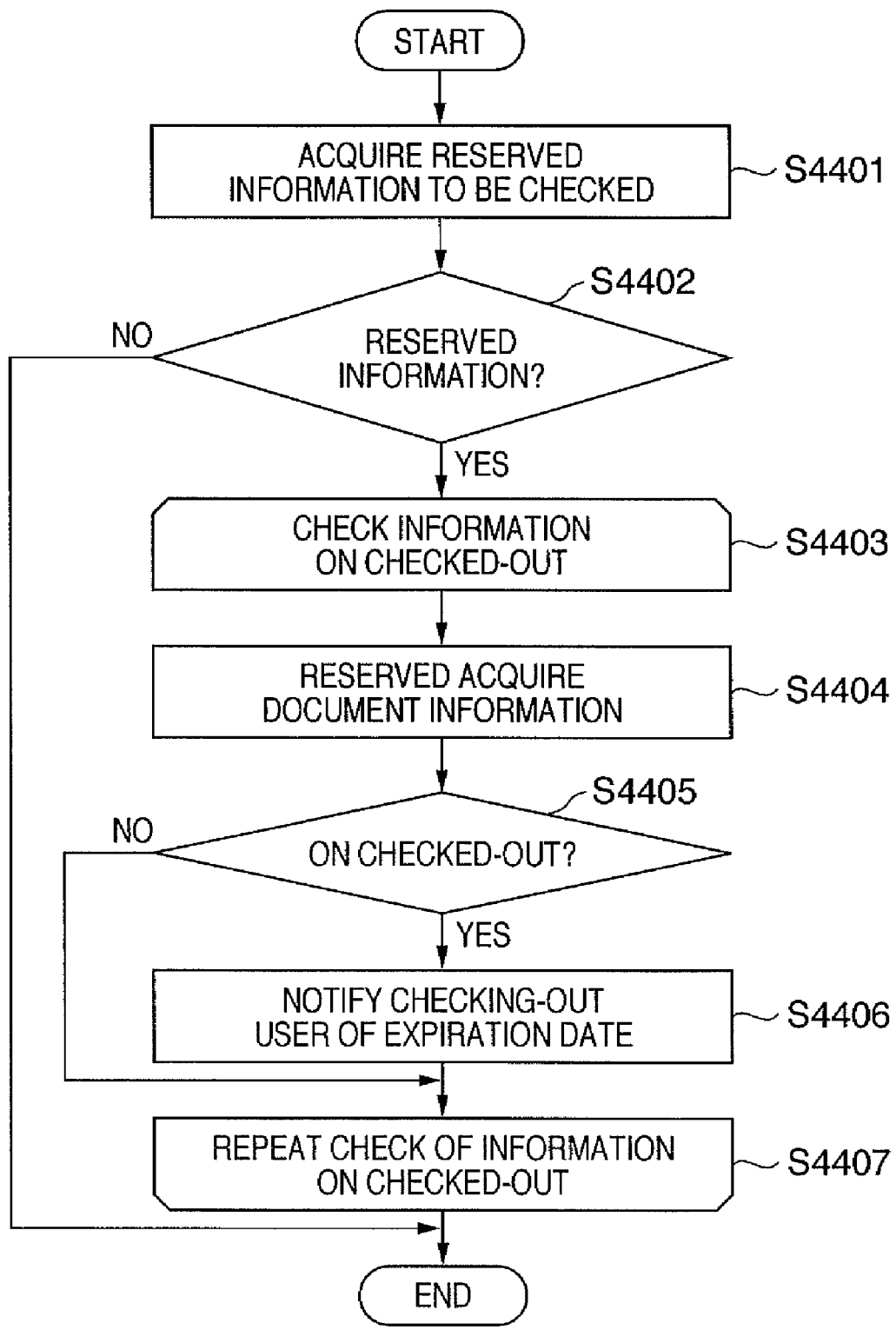
FIG. 44 is a flowchart illustrating an example of a procedure of reserved check-out period end state confirmation processing according to the second embodiment.

FIG. 44 is a flowchart illustrating an example of a procedure of reserved check-out period end state confirmation processing by the document management apparatus 101 shown in FIG. 1.

This processing is not executed in response to a user's action but executed periodically and automatically in the document management apparatus 101. The execution interval is not particularly limited. FIG. 44 illustrates the sequence of one cycle of the periodically executed processing. The document check-out reservation processing control unit 2713 of the document management apparatus 101 executes the processing by using the CPU 201 in FIG. 2.

Data necessary for this processing is a threshold value of the number of remaining days in the reserved period for end warning. The contents are set in advance in the document management apparatus 101.

As shown in FIG. 44, in step S4401, of the pieces of reserved information existing in the check-out reservation information 2831 in FIG. 28D, reserved information of which the reserved period should finish is acquired in accordance with the following conditions.

Acquisition Conditions:
Status 2838 is not "processed",
AND
((This process executing current date)+(Threshold value of number of remaining days set in system))>(Expected check-in date 2836).

First acquisition condition is used to acquire information whose status 2838 is "unprocessed" (=check-out is not executed yet) or "on processing" (=check-out is current being executed) from the check-out reservation information 2831. Next acquisition condition is used to acquire information whose expected check-in date 2836 is near a predetermined period (threshold value of the number of remaining days in the reserved period) from the processing date or information which has already passed the expected check-in date 2836. The records of the check-out reservation information 2831 which satisfy the conditions are assumed to be sorted based on the document ID. When the acquisition processing is ended, the process advances to step S4402.

In step S4402, it is determined whether at least one record of the check-out reservation information 2831 acquired in step S4401 exists. If at least one record exists, the process advances to step S4403. If no record exists, the processing is ended.

In step S4403, control of the repetitive processing up to S4407 is done as many as the records of the check-out reservation information 2831 acquired in step S4401.

First, one of the records of the check-out reservation information 2831 is specified, and the process advances to step S4404. In step S4404, the document ID 2833 acquired from the record of the check-out reservation information 2831 specified in step S4403 is used as a key. A record of the corresponding check-out information 2821 is acquired from the check-out information storage unit 2703 by using the check-out information operation unit 2704. When the record acquisition processing is ended, the process advances to step S4405.

In step S4405, it is confirmed whether the check-out information 2821 acquired in step S4404 exists. If the information exists, the process advances to step S4406. If the information does not exist, the process advances to step S4407.

In step S4406, the checking-out user ID 2824 of the record of the check-out information 2821 acquired in step S4404 is used as a key. The corresponding user information 2861 is acquired from the user information storage unit 2709 by using the user information operation unit 2710. The document ID 2822 of the record of the same check-out information 2821 is used as a key. The corresponding document information 2801 is acquired from the document information storage unit 2701 by using the document information operation unit 2702.

Using these pieces of acquired information, a mail using the mail format 4201 shown in FIG. 42 is sent. Pieces of information to be designated in the mail format 4201 are set in the following way. The mail address 2864 of the acquired user information 2861 is set in the destination 4203. A character string "confirmation of check-out expiration date" is set in the title 4204. The document name 2803 of the acquired document information 2801 is set in the document name 4206.

One of the expected check-in date 2836 and reserved check-out date 2834 of the check-out reservation information 2831 specified in step S4403, which satisfies the acquisition condition in step S4401, is set in the check-out expiration date 4207. A message "It is near to the expiration date of check-out. Please perform check-in operation or cancel check-out reservation until the designated expiration date." is applied to the message 4208. The created mail is sent immediately. When the mail sending is ended, the process advances to step S4407.

In step S4407, it is determined whether all records of the check-out reservation information 2831 acquired in step S4401 are processed. If an unprocessed record remains, the process returns to step S4403. If no unprocessed record exits, the processing exits from the loop and finishes.

(Example of Processing of Causing Document Management Apparatus 101 to Check Out Document Whose Reserved Period Should Start)

Figure 45:
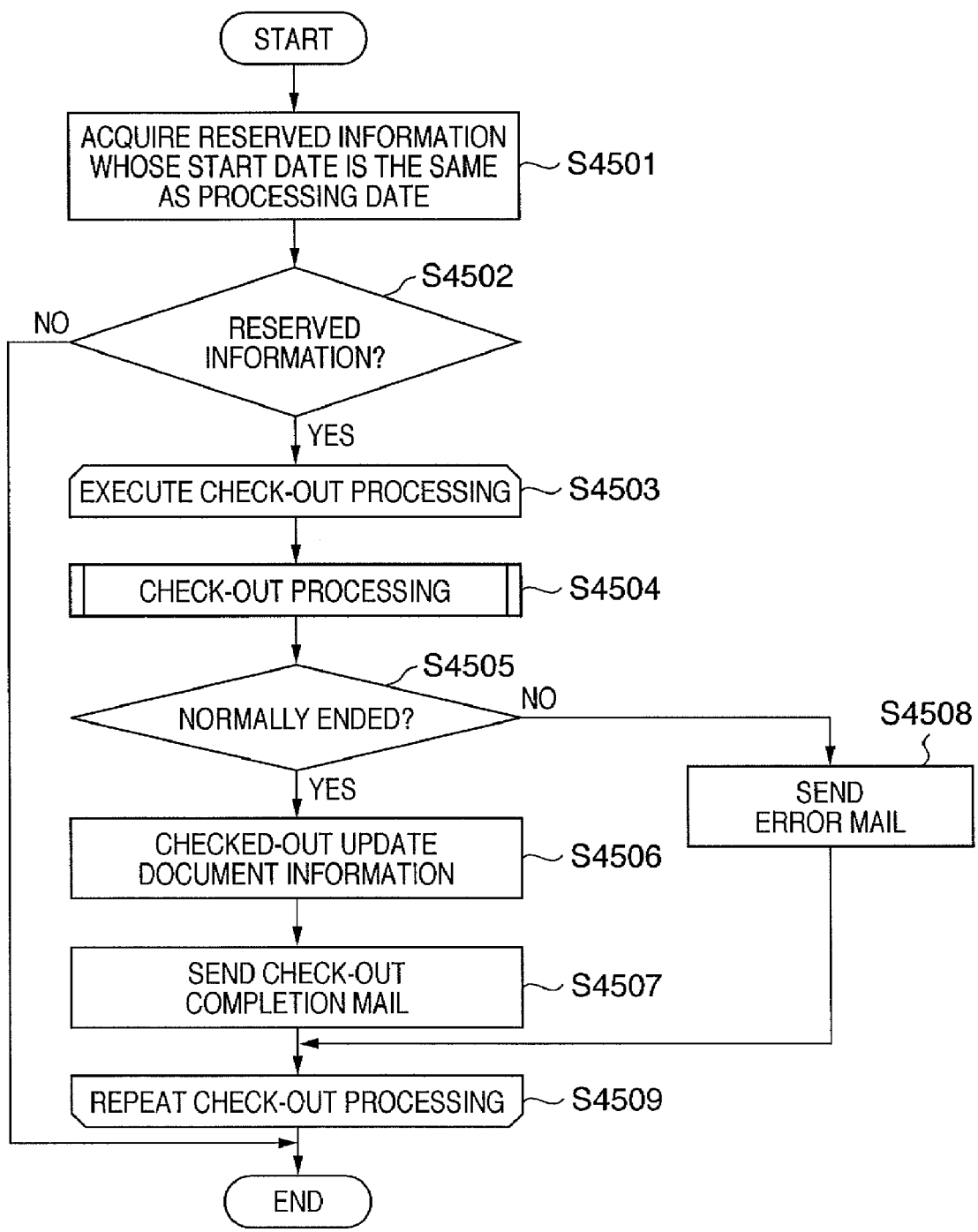
FIG. 45 is a flowchart illustrating an example of a procedure of reserved check-out period start processing according to the second embodiment.

FIG. 45 is a flowchart illustrating an example of a procedure of check-out reservation execution processing by the document management apparatus 101 shown in FIG. 1.

This processing is not executed in response to a user's action but executed periodically and automatically in the document management apparatus 101. The execution interval is not particularly limited. FIG. 45 illustrates the sequence of one cycle of the periodically executed processing. The document check-out reservation processing control unit 2713 of the document management apparatus 101 executes the processing by using the CPU 201 in FIG. 2.

As shown in FIG. 45, in step S4501, of the pieces of reserved information existing in the check-out reservation information 2831 in FIG. 28D, reserved information of which the reserved period should start is acquired in accordance with the following conditions.

Acquisition Conditions:
Status 2838 is not "processed",
And
(This process executing current date)≧(Reserved check-out date 2834).

The records of the check-out reservation information 2831 which satisfy the conditions are assumed to be sorted based on the document ID 2833 and reserved check-out date 2834. If a plurality of identical document IDs 2833 exist, only a record whose reserved check-out date 2834 indicates the earliest date is left, and the remaining records are deleted from the target records. When the target record acquisition processing based on the conditions is ended, the process advances to step S4502. In step S4502, it is determined whether at least one record of the check-out reservation information 2831 acquired in step S4501 exists. If at least one record exists, the process advances to step S4503. If no record exists, the processing is ended.

In step S4503, control of the repetitive processing up to S4509 is done as many as the records of the check-out reservation information 2831 acquired in step S4501.

Figure 47:
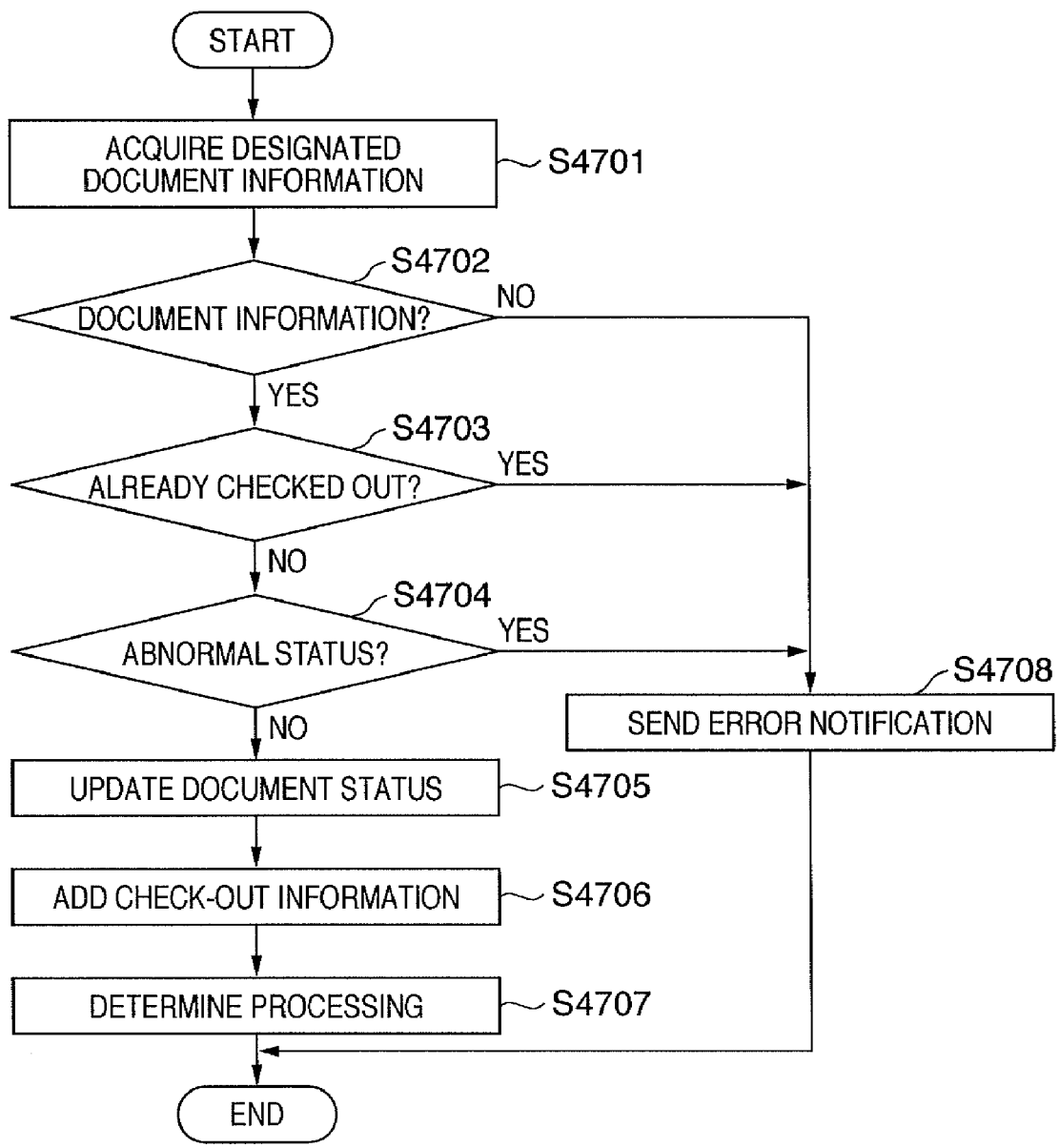
FIG. 47 is a flowchart illustrating an example of a procedure of check-out actual processing according to the second embodiment.

First, one of the records of the check-out reservation information 2831 is specified, and the process advances to step S4504. In step S4504, check-out actual processing shown in FIG. 47 is activated. The check-out processing of a document corresponding to the document ID 2833 described in the record of the check-out reservation information 2831 to be processed, which is specified in step S4503, is executed. When the check-out actual processing in FIG. 47 is ended, the processing result is stored, and the process advances to step S4505.

In step S4505, the result of the check-out actual processing stored in step S4504 is determined. If the processing is normally ended, the process advances to step S4506. If the processing is abnormally ended, the process advances to step S4508.

In step S4506, since the check-out processing is normally ended, the checked-out reservation information is updated in the following way. The value of the status 2838 of the record of the check-out reservation information 2831 specified in step S4503 is changed to "on processing". The check-out reservation information 2831 stored in the check-out reservation information storage unit 2705 is updated via the check-out reservation information operation unit 2706. When the update processing is ended, the process advances to step S4507.

In step S4507, since the check-out processing of the document is ended, the user who reserved check-out is notified by mail that the document is checked out. For this purpose, the corresponding document information 2801 is acquired from the document information storage unit 2701 by using the document information operation unit 2702 using, as a key, the document ID 2833 of the check-out reservation information 2831 specified in step S4503. Additionally, the corresponding user information 2861 is acquired from the user information storage unit 2709 by using the user information operation unit 2710 using the reserving user ID 2835 as a key.

The mail to be sent in this step uses the mail format 4201 in FIG. 42. Pieces of information are designated in the mail format 4201 in the following way. The mail address 2864 of the user information 2861 acquired in this step is set in the destination 4203. A character string "check-out completion" is set in the title 4204. The document name 2803 of the document information 2801 acquired in this step is set in the document name 4206. The expected check-in date 2836 of the check-out reservation information 2831 specified in step S4503 is set in the check-out expiration date 4207. A message "Your check-out period starts. Please start operation of the checked-out document." is designated in the message 4208. When sending of the created mail is ended, the process advances to step S4509.

In step S4508, in accordance with the error of the check-out actual processing in step S4504, mails are respectively sent to the users, one being the expected check-out user and another being the now checking-out user.

For the expected check-out user, mail representing that the reserved check-out is not normally performed is sent. For this purpose, the corresponding document information 2801 is acquired from the document information storage unit 2701 by using the document information operation unit 2702 using, as a key, the document ID 2833 of the check-out reservation information 2831 specified in step S4503. Additionally, the corresponding user information 2861 is acquired from the user information storage unit 2709 by using the user information operation unit 2710 using the reserving user ID 2835 as a key.

The mail to be sent to the expected check-out user in this step uses the mail format 4201 in FIG. 42. Pieces of information are designated in the mail format 4201 in the following way. The mail address 2864 of the user information 2861 acquired in this step is set in the destination 4203. A character string "check-out failure" is set in the title 4204. The document name 2803 of the document information 2801 acquired in this step is set in the document name 4206. The reserved check-out date 2834 of the check-out reservation information 2831 specified in step S4503 is set in the check-out expiration date 4207. A message "Your check-out period has been reached, but the check-out processing has failed." is applied to the message 4208.

For the now checking-out user, mail to request check-in execution or check-out canceling is sent. For this purpose, the corresponding document information 2801 is acquired from the document information storage unit 2701 by using the document information operation unit 2702 using, as a key, the document ID 2833 of the check-out reservation information 2831 specified in step S4503. Additionally, the corresponding user information 2861 is acquired from the user information storage unit 2709 by using the user information operation unit 2710 using the checking-out user ID 2824 of the check-out information 2821 as a key. The checking-out user ID 2824 is acquired from the check-out information storage unit 2703 by using the check-out information operation unit 2704 using the document ID 2833 as a key.

The mail to be sent to the now checking-out user in this step uses the mail format 4201 in FIG. 42. Pieces of information are designated in the mail format 4201 in the following way. The mail address 2864 of the user information 2861 acquired in this step is set in the destination 4203. A character string "urgent check-in" is set in the title 4204. The document name 2803 of the document information 2801 acquired in this step is set in the document name 4206. The reserved check-out date 2834 of the check-out reservation information 2831 specified in step S4503 is set in the check-out expiration date 4207. A message "Your check-out period has already expired. Please execute urgent check-in or cancel check-out of document, because next check-out reservation of the document has been done by other user." is applied to the message 4208. When sending of the created mail is ended, the process advances to step S4509.

In step S4509, it is determined whether all records of the check-out reservation information 2831 acquired in step S4501 are processed. If an unprocessed record remains, the process returns to step S4503. If no unprocessed record exits, the processing exits from the loop and finishes.

(Example of Processing of Causing User to Execute Check-Out)

Figure 46:
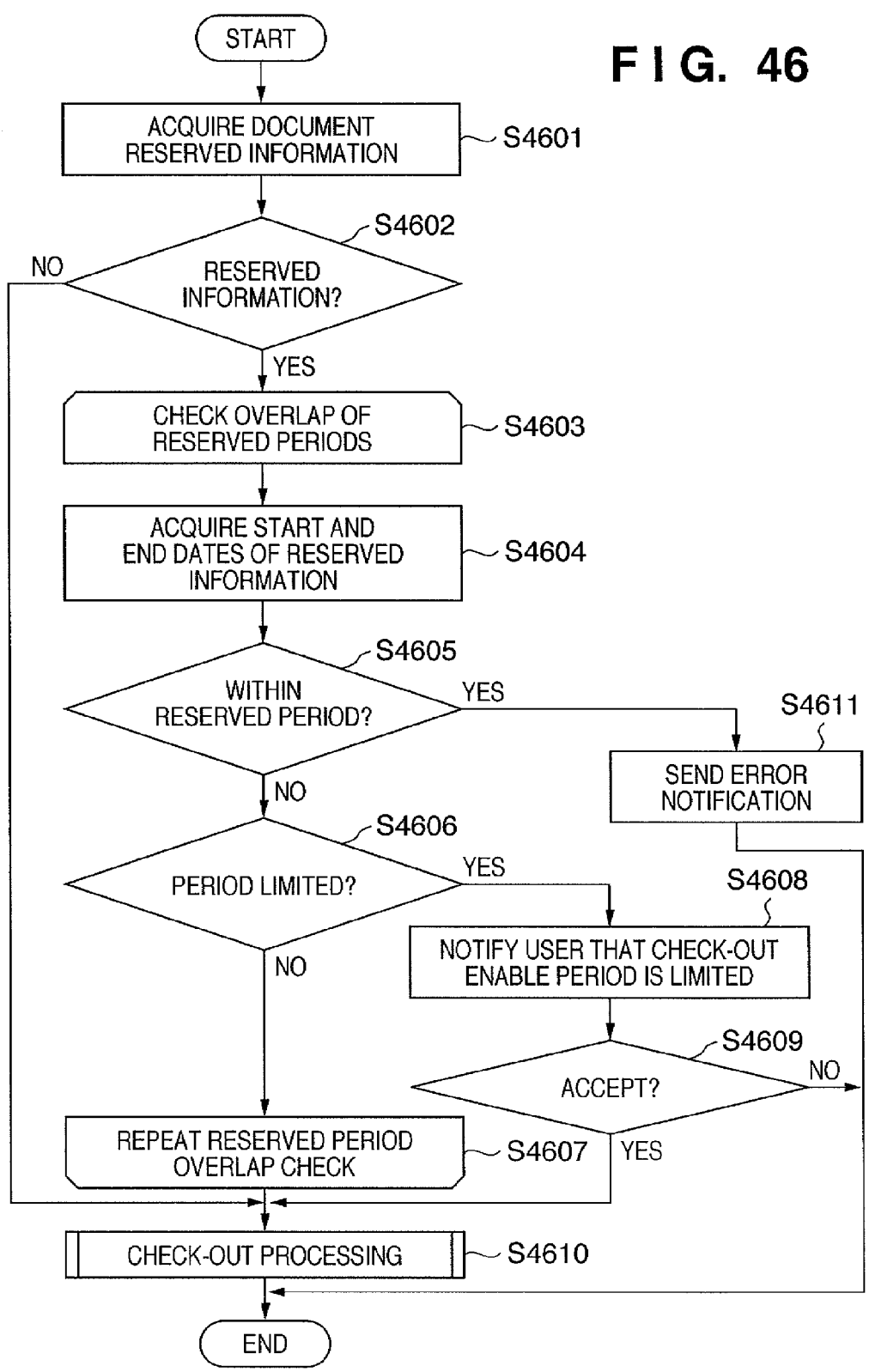
FIG. 46 is a flowchart illustrating an example of a procedure of check-out processing according to the second embodiment.

FIG. 46 is a flowchart illustrating an example of a procedure of check-out execution processing by the document management apparatus 101 shown in FIG. 1.

The processing in FIG. 46 is activated by pressing the button 3706 on the check-out screen 3701 in FIG. 37, which is displayed on the CRT 409 of the client apparatus 102. FIG. 46 illustrates the sequence of document check-out processing executed by the document check-out processing control unit 2711 of the document management apparatus 101. The CPU 201 in FIG. 2 executes this processing.

Data necessary for this processing are the document ID 3702 designated on the check-out screen 3701, and the user ID of the user who is executing this operation.

As shown in FIG. 46, in step S4601, a list of check-out reservation information corresponding to the document ID 3702 of the input data is acquired. This is done by acquiring the check-out reservation information 2831 corresponding to the document ID 3702 from the check-out reservation information storage unit 2705 via the check-out reservation information operation unit 2706. The records of the check-out reservation information 2831 acquired at this time are assumed to be sorted in ascending order based on the reserved check-out date 2834 of the items. When the acquisition processing is ended, the process advances to step S4602.

In step S4602, it is determined whether the records of the check-out reservation information 2831 acquired in step S4601 exist. If the records exist, the process advances to step S4603. If no records exist, the process advances to step S4610.

In step S4603, control of the repetitive processing up to S4607 is done in a number as large as the number of records of the check-out reservation information 2831 acquired in step S4601.

First, one of the records of the check-out reservation information 2831 is specified, and the process advances to step S4604. In step S4604, the reserved check-out date 2834 and expected check-in date 2836 of the record of the check-out reservation information 2831 specified in step S4603 are acquired. When the acquisition processing is ended, the process advances to step S4605.

In step S4605, using the information of the reserved check-out date 2834 and expected check-in date 2836 acquired in step S4604, this process executing current date is compared with the reserved period in accordance with the following conditions.

Comparative Conditions:
(This process executing current date)≧(Reserved check-out date 2834),
AND
(This process executing current date)<(Expected check-in date 2836).

If these conditions are satisfied, the current time is included in the reserved period of the document to be checked out. It is therefore determined that the check-out processing itself is impossible. For this reason, if the conditions are satisfied, the process advances to step S4611. If these conditions are not satisfied, the compared record is not included in the check-out period, and the process advances to step S4606.

In step S4606, it is checked whether the following condition is satisfied outside the check-out period. The comparative condition for the check is as follows.

Comparative Condition:
(This process executing current date)<(Reserved check-out date 2834).

If this condition is satisfied, the check-out period has not started yet, but a reservation later imposes a check-out limitation. The process advances to step S4608. Otherwise, no check-out limitation exists on the reservation information side, and the process advances to step S4607.

Step S4607 indicates that overlap check is ended for one record of the check-out reservation information 2831 acquired in step S4601. If the check-out reservation information 2831 still has an unprocessed record, the process returns to step S4603. If all records of the check-out reservation information 2831 are processed, the process advances to step S4610.

It is determined by the comparison in step S4606 that reserved check-out should start after the current check-out processing. In step S4608, therefore, the check-out limitation accepting screen 3801 in FIG. 38 is displayed for the checking-out user. This display is done by causing the document check-out processing control unit 2711 to prepare information representing that the check-out period is limited and send it to the display content creation unit 2717.

The document ID 2833 and reserved check-out date 2834 of the check-out reservation information 2831 specified in step S4603 are displayed on the check-out limitation accepting screen 3801. In particular, the reserved check-out date 2834 is embedded in the message. Step S4608 includes processing up to display of the screen on the CRT 409 of the client apparatus 102. When the user who sees the screen presses the button 3805 or 3806 on the check-out limitation accepting screen 3801 in FIG. 38 at his/her discretion, the process advances to step S4609.

In step S4609, which button is pressed by the user, the button 3805 (cancel) or button 3806 (accept), is determined. For canceling, the processing is ended without executing the check-out processing. For acceptance, it is determined that the user accepts the limitation on the check-out period. The processing exits from the loop of steps S4604 to S4607, and the process advances to step S4610.

In step S4610, the check-out actual processing is executed because the nonexistence of check-out reservation overlap is confirmed. Details of this check-out actual processing will be described later with reference to the flowchart in FIG. 47. When the check-out actual processing in step S4610 finishes, the processing is ended.

It is determined in step S4605 that a reserved check-out period has already started, and another user is executing check-out. Hence, in step S4611, the error screen 3601 is displayed to notify the user who is requesting check-out that the target document is already checked out. When the user presses the button 3605 on the error screen 3601, the processing is ended.

(Example of Check-Out Actual Processing in Document Management Apparatus 101)

FIG. 47 is a flowchart illustrating an example of a procedure of check-out actual processing by the document management apparatus 101 shown in FIG. 1.

The processing in FIG. 47 is activated in the check-out processing sequences in FIGS. 45 and 46. FIG. 47 illustrates the sequence of document check-out actual processing executed by the document check-out processing control unit 2711 of the document management apparatus 101. The CPU 201 in FIG. 2 executes this processing.

Data necessary for this processing are the document ID of the check-out target and the user ID of the user who is executing this operation.

As shown in FIG. 47, in step S4701, the check-out reservation information 2831 and check-out information 2821 corresponding to the document ID designated by the input data are acquired. When acquisition of the document information 2801 and check-out information 2821 is ended, the process advances to step S4702.

In step S4702, it is determined whether the document information 2801 acquired in step S4701 exists. If the document information does not exist, an error occurs, and the process advances to step S4708. If the document information exists, the process advances to step S4703. In step S4703, it is determined whether the check-out information 2821 acquired in step S4701 exists. If the information exists, another user is currently checking out the document, and an error occurs. The process advances to step S4708. If the check-out information 2821 does not exist, the user can check out the document, and the process advances to step S4704. If the status 2804 of the document information 2801 acquired in step S4701 has a value other than "normal", an error occurs, and the process advances to step S4708. If the status is "normal", all check-out enable/disable checks are ended, and the process advances to step S4705.

In step S4705, the status value of the document information 2801 acquired in step S4701 is changed to "on checked-out". This processing is done by causing the document check-out processing control unit 2711 to update the existing data in the document information storage unit 2701 via the document information operation unit 2702. When the document information update processing is ended, the process advances to step S4706.

In step S4706, the document information is added to the check-out information 2821 in FIG. 28C to indicate that the document is on checked-out. The following pieces of information are used as the items of the check-out information 2821. The document ID given to the processing as the input data is used as the document ID 2822. The execution date of this processing is used as the checked-out date. The user ID of the user who is executing the operation, which is given to the processing as the input data, like the document ID, is used as the checking-out user ID 2824. Using these data, the document check-out processing control unit 2711 adds new data to the check-out information storage unit 2703 via the check-out information operation unit 2704. When the check-out information addition processing is ended, the process advances to step S4707.

In step S4707, the update processing executed in step S4705 and S4706 is determined. With this processing determination, the check-out processing is completed, and the processing is ended.

In step S4708, the processing of the error that has occurred in each step is executed. The processing activation source is notified of the error, and the processing is ended.

(Example of Processing of Causing User to Execute Check-In)

Figure 48:
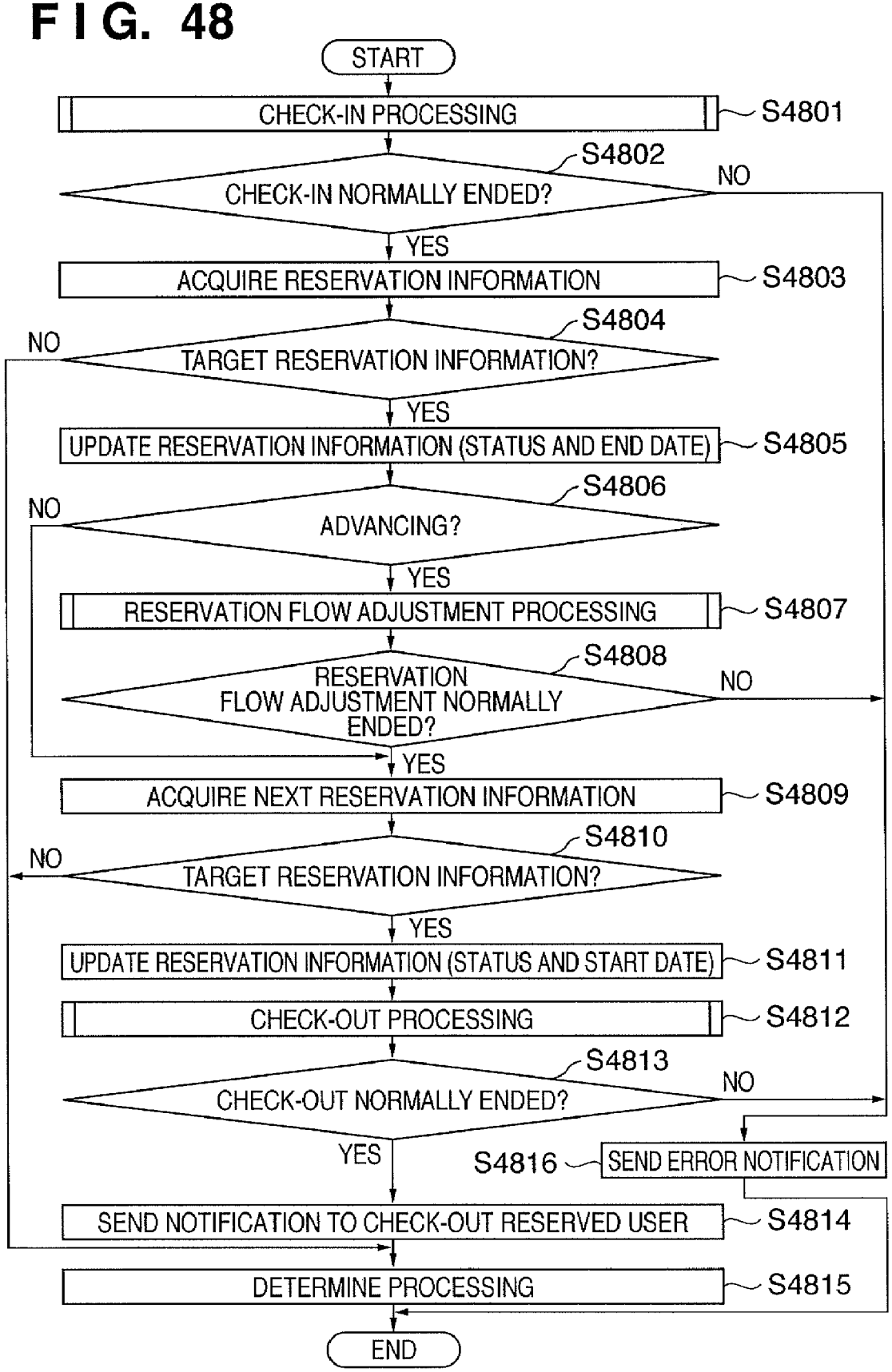
FIG. 48 is a flowchart illustrating an example of a procedure of check-in processing according to the second embodiment.

FIG. 48 is a flowchart illustrating an example of a procedure of check-in execution processing by the document management apparatus 101 shown in FIG. 1.

The processing in FIG. 48 is activated by pressing the button 4009 on the check-in screen 4001 in FIG. 40, which is displayed on the CRT 409 of the client apparatus 102. FIG. 48 illustrates the sequence of document check-in processing executed by the document check-in processing control unit 2712 of the document management apparatus 101. The CPU 201 in FIG. 2 executes this processing.

Data necessary for this processing are the document ID 4003 designated on the check-in screen 4001, a registered document file designated in the document file information display area 4007 or by the button 4008, and the user ID of the user who is executing this operation.

Figure 50:
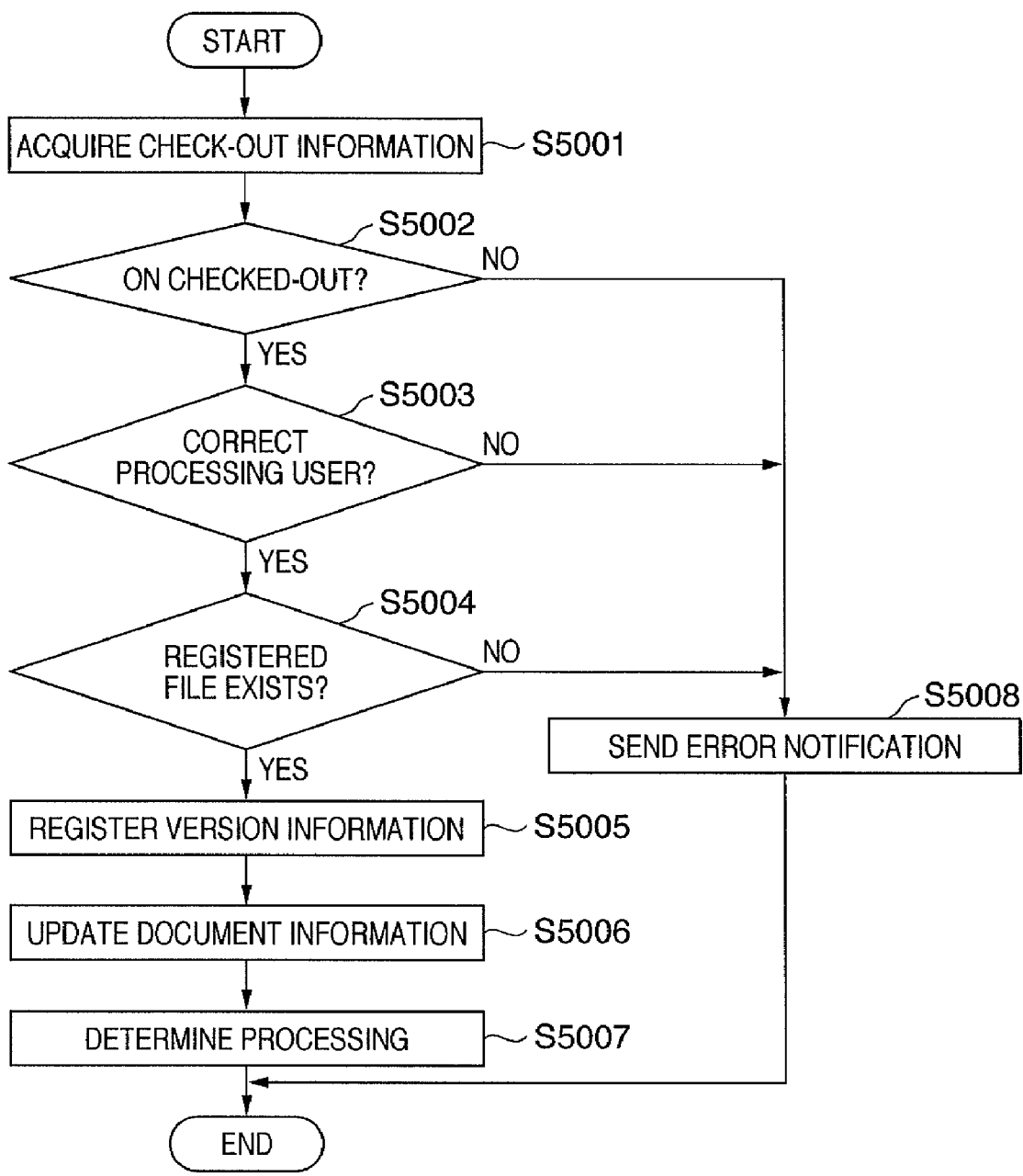
FIG. 50 is a flowchart illustrating an example of a procedure of check-in actual processing according to the second embodiment.

As shown in FIG. 48, in step S4801, the user checks-in the document with the document ID designated on the check-in screen 4001 in FIG. 40. This processing will be described later in detail with reference to the flowchart in FIG. 50. In this step, processes from processing activation to processing result acquisition in FIG. 50 are executed. After the processing result is stored, the process advances to step S4802.

In step S4802, the check-in processing result in step S4801 is acquired. If the result is an error, the process advances to step S4816. If the processing is ended normally, the process advances to step S4803.

In step S4803, it is confirmed whether the check-out reservation information 2831 matching the document ID of the checked-in document exists. In this step, the check-out reservation information operation unit 2706 acquires the check-out reservation information 2831 that satisfies the following conditions.

Search Conditions:
Document ID 2833=input data "Document ID 4003",
AND
(Reserved check-out date 2834)≧(Process executing date),
AND
(Expected check-in date 2836)≧(Process executing date).

When the information acquisition processing is ended, the process advances to step S4804.

In step S4804, it is checked whether the check-out reservation information 2831 acquired in step S4803 has a record. If the check-out reservation information 2831 has no record, it is determined that the current check-out is not check-out from reservation processing but direct check-out processing from the screen in FIG. 37 using the processing sequence in FIG. 46. In this case, the process advances to step S4815. If a record exists, the process advances to step S4805 to process the record.

In step S4805, the expected check-in date 2836 is acquired from the record information of the check-out reservation information 2831 acquired in step S4803. This information is temporarily stored and used in steps S4806 and S4809 later. The status 2838 of the record is changed to "processed", and the expected check-in date 2836 is changed to the process executing date. The document check-in processing control unit 2712 updates existing data in the check-out reservation information storage unit 2705 via the check-out reservation information operation unit 2706. When the document information update processing is ended, the process advances to step S4806.

In step S4806, it is determined whether the reservation flow advancing processing is necessary. The expected check-in date 2836 temporarily stored in step S4805 is compared with the actual process executing date of the current processing.

Comparative Condition:
(Temporarily stored expected check-in date)>(Process executing date)

Not times but only the "dates" are compared here.

If the comparative condition is satisfied, that is, if true, it indicates that check-in was executed one day before the expected date. In this case, the number of days between the temporarily stored expected check-in date and the processing date is temporarily stored as the "number of dates advanced to perform check-out operation". When the "number of dates advanced to perform check-out operation" is one or more, that is, when the above-described comparative condition is satisfied, the reservation flow of the user who has executed the check-in requires adjustment, that is, processing of advancing the succeeding reservation. Hence, the process advances to step S4807. If the comparative condition is not satisfied, that is, if false, the process advances to step S4809.

In step S4807, the reservation ID 2832 is acquired from the record information of the check-out reservation information 2831 updated in step S4805. The reservation ID 2832, the user ID of the user who is executing the operation, and the "number of dates advanced to perform check-out operation" temporarily stored in step S4806 are given to execute the reservation flow adjustment processing. The reservation flow adjustment processing will be described later in detail with reference to FIG. 49.

In step S4808, the result of the reservation flow adjustment processing in step S4807 is acquired. If the result is an error, the process advances to step S4816. If the processing is normally ended, the process advances to step S4809.

In step S4809, reservation information next to the checked-in document is acquired. In this step, the check-out reservation information operation unit 2706 acquires the check-out reservation information 2831 that satisfies the following conditions. For the search condition, the expected check-in date 2836 temporarily stored in step S4805 is used.

Search Conditions:
Document ID 2833=input data "Document ID 4003",
AND
(Reserved check-out date 2834)≧((Temporarily stored expected check-in date)+1 day)),
AND
Preceding reservation tracking flag 2837=TRUE When the information search processing based on the search conditions is ended, the process advances to step S4810.

In step S4810, it is checked whether the check-out reservation information 2831 acquired in step S4809 has a record.

If no record exists, the start of reserved check-out need not be advanced by tracking, and the process advances to step S4815. If a record exists, the process advances to step S4811.

In step S4811, the reserving user ID 2835 of the check-out reservation information 2831 acquired in step S4809 is acquired. The reserving user ID 2835 is used as input data in executing step S4812 later. The status 2838 of the record is changed to "on processing", and the reserved check-out date 2834 is changed to the process executing date. The document check-out processing control unit 2711 updates existing data in the check-out reservation information storage unit 2705 via the check-out reservation information operation unit 2706. When the document information update processing is ended, the process advances to step S4812.

In step S4812, the reserving user ID stored in step S4811 and the document ID of the input data are given. The document check-out processing control unit 2711 starts the check-out processing according to the check-out actual processing sequence shown in FIG. 47. When the check-out actual processing is ended, the process advances to step S4813.

In step S4813, it is determined whether the check-out processing in step S4812 is normally ended. If the processing is not normally ended, an error occurs, and the process advances to step S4816. If the processing is normally ended, the process advances to step S4814.

In step S4814, mail is sent to the user who has reserved check-out. For this purpose, the corresponding document information 2801 is acquired from the document information storage unit 2701 by using the document information operation unit 2702 using, as a key, the document ID 2833 of the check-out reservation information record specified in step S4809. Additionally, the corresponding user information 2861 is acquired from the user information storage unit 2709 by using the user information operation unit 2710 using, as a key, the reserving user ID stored in step S4811.

The mail to be sent in this step uses the mail format 4201 in FIG. 42. Pieces of information are designated in the mail format 4201 in the following way. The mail address 2864 of the user information 2861 acquired in this step is set in the destination 4203. A character string "check-out completion" is set in the title 4204. The document name 2803 of the document information 2801 acquired in this step is set in the document name 4206. The expected check-in date 2836 of the check-out reservation information 2831 specified in step S4803 is set in the check-out expiration date 4207. A message "The preceding operation by an operator had completed before scheduled end date, therefore, your check-out period has already started. Please start operation of the checked-out document." is designated as the message 4208. When sending of the created mail is ended, the process advances to step S4815.

In step S4815, all pieces of information changed in this processing are determined. When information determination is ended, the processing is ended.

(Example of Reservation Flow Adjustment Processing in Document Management Apparatus 101)

Figure 49:
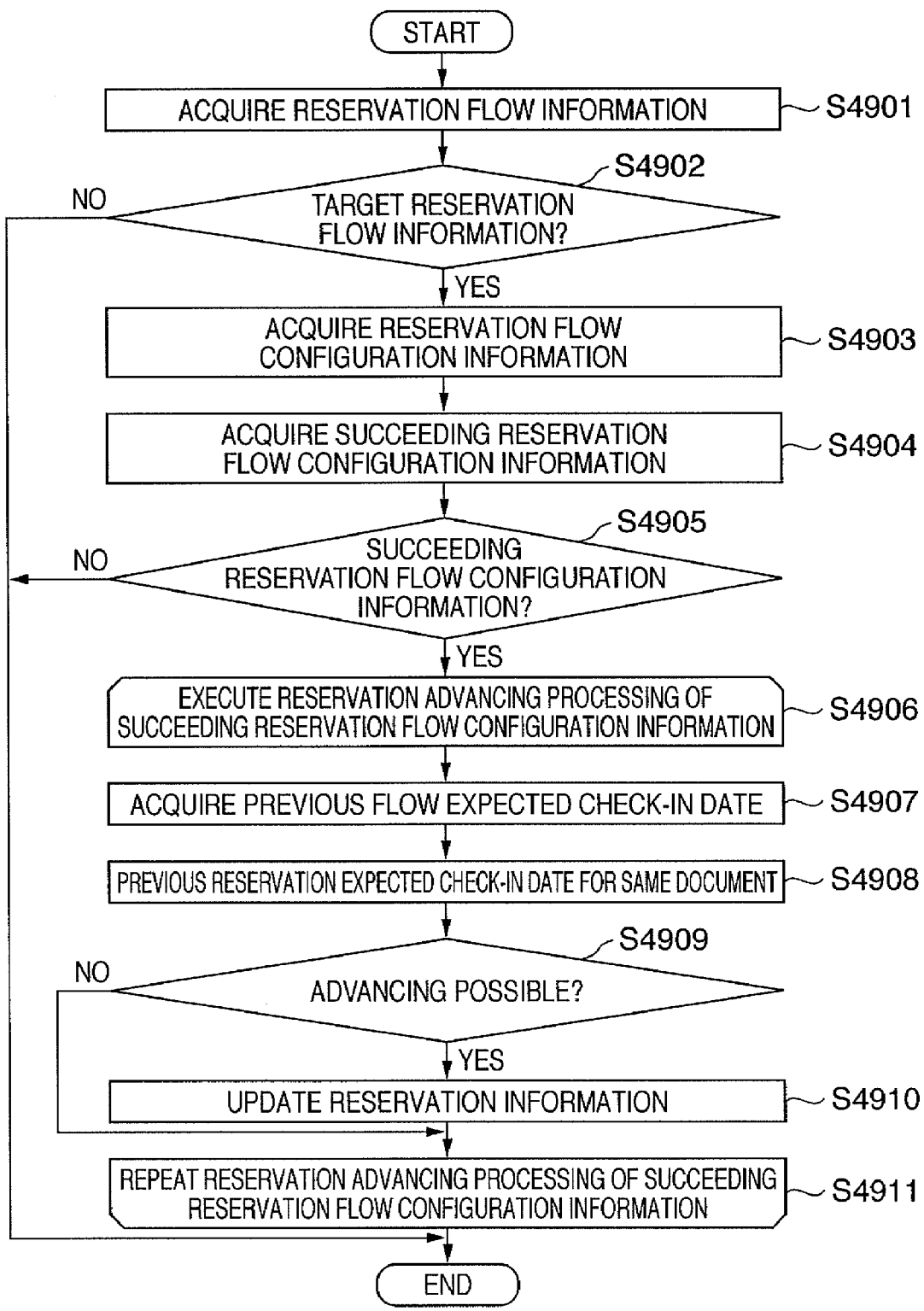
FIG. 49 is a flowchart illustrating an example of a procedure of reservation flow adjustment processing according to the second embodiment.

FIG. 49 is a flowchart illustrating an example of a procedure of reservation flow adjustment processing by the document management apparatus 101 shown in FIG. 1.

The processing in FIG. 49 is invoked by check-in processing (described with reference to FIG. 48) activated by pressing the button 4009 on the check-in screen 4001 in FIG. 40 displayed on then CRT 409 of the client apparatus 102. The processing in FIG. 49 is executed by the document check-in processing control unit 2712 of the document management apparatus 101 under the control of the CPU 201 in FIG. 2.

Data necessary for this processing are transferred from step S4807 in FIG. 48. More specifically, the data include the reservation ID 2832 of the check-out reservation information 2831 that has undergone check-in of the sequence in FIG. 48, the user ID of the user who is executing this operation, and the number of dates advanced to perform check-out operation.

In step S4901, reservation flow information to be processed is acquired based on the reservation ID 2832 and user ID transferred to the processing. First, the reservation flow information operation unit 2708 is instructed to acquire the reservation flow configuration information 2851 that satisfies the following condition.

Search Condition:
Reservation ID 2832=Reservation ID 2854.

The reservation flow ID 2852 is acquired from the record of the thus acquired reservation flow configuration information 2851. The reservation flow information operation unit 2708 is instructed to acquire the reservation flow information 2841 that satisfies the following conditions:

Search Conditions:
Reservation flow ID 2852=Reservation flow ID 2842,
AND
Management user ID=User ID of the user who is performing the operation,
AND
Flow adjustment 2844=adjust.

The record 2845 of the reservation flow information 2841 is found in the following case. That is, the record is found when the reservation flow information including the reservation information to be processed is the reservation flow information managed by the user who is executing the processing and to be subjected to reservation flow adjustment when a document check-in occurs. When the information acquisition is ended, the process advances to step S4902.

In step S4902, it is checked whether the record 2845 of the reservation flow information acquired in step S4901 exists. If no record exists, the sequence is ended, regarding that the processing is ended normally. If the record exists, the process advances to step S4903.

In step S4903, the reservation flow ID 2852 of the record 2845 of the reservation flow information whose existence is confirmed in step S4902 is designated. The reservation flow information operation unit 2708 is instructed to acquire the reservation flow configuration information 2851 that satisfies the following condition.

Search Condition:
(Reservation flow ID 2852 of record 2845 of reservation flow information)=Reservation flow ID 2852.

The reservation flow configuration information 2851 is acquired in ascending order of flow order 2853. When the record 2855 of the reservation flow configuration information 2851 of the target is acquired, the process advances to step S4904.

In step S4904, focus is placed on the reservation ID 2854 of the record 2855 of the reservation flow configuration information 2851 acquired in step S4903. Two or more records 2855 may have been acquired. The reservation ID 2854 of one of the records 2855 always has the same value as that of the reservation ID 2832 transferred from step S4807 in FIG. 48. The records 2855 are acquired in ascending order of flow order 2853. Hence, the acquired records are read sequentially from the top. When arrived at the record whose reservation ID 2854 has the same value as that of the reservation ID 2832 transferred from step S4807 in FIG. 48, already read records before it are discarded because they are unnecessary. With the record with the same value and the remaining unread records, the process advances to step S4905.

In step S4905, it is determined whether succeeding reservation flow configuration information as the flow adjustment target exists in the remaining records that are not discarded in step S4904.

One of the remaining records 2855 that are not discarded has the reservation ID 2854 equal to the reservation ID 2832 transferred from step S4807 in FIG. 48. The record next to this record is the record of the succeeding reservation flow configuration information as the flow adjustment target. Hence, it is checked whether two or more remaining records 2855 that are not discarded exist.

If the number of remaining records 2855 is 1 or less, the check-out reservation indicated by the reservation ID 2832 transferred from step S4807 in FIG. 48 is the last check-out reservation of the reservation flow including the check-out reservation. In this case, no succeeding check-out reservation to be adjusted exists. Hence, the sequence is ended, regarding that the processing is ended normally. If two or more remaining records 2855 that are not discarded exist in step S4904, the process advances to step S4906.

Processing in steps S4906 to S4911 is repeatedly executed for each of the second and subsequent remaining records 2855 that are not discarded. When all records are processed, the processing exits from step S4911 and advances to the next step.

Since the processing is executed from the second record of the remaining records 2855 that are not discarded, preceding data always exists. In step S4907, processing is performed by referring to the current processing target record and preceding record in the records 2855. In step S4907, the expected check-in date of the preceding check-out reservation information in the reservation flow is acquired. The reservation ID 2854 of the preceding record 2855 is acquired. The check-out information operation unit 2704 is instructed to acquire the check-out reservation information 2831 that satisfies the following condition.

Search Condition:

Reservation ID 2854 of preceding record=Reservation ID 2832.

The expected check-in date 2836 of the record 2839 that satisfies the condition is temporarily stored as a "previous flow expected check-in date". This data is used in step S4909 to be described later.

In step S4908, the expected check-in date of the previous check-out reservation information corresponding to the same document as that of the record 2855 of the reservation flow configuration information of the current processing target is acquired. The reservation ID 2854 is acquired from the record 2855 of the processing target. The check-out information operation unit 2704 is instructed to acquire the check-out reservation information 2831 that satisfies the following condition.

Search Condition 1:

Reservation ID 2854=Reservation ID 2832.

When the record 2839 that satisfies the condition is acquired, the reserved check-out date 2834 is temporarily stored as a "current reservation reserved check-out date". This data is used in step S4909 to be described later.

The document ID 2833 and reserved check-out date 2834 are acquired. The check-out information operation unit 2704 is instructed to acquire the check-out reservation information 2831 that satisfies the following condition.

Search Conditions 2:

(Document ID 2833 acquired based on search condition 1)=Document ID 2833,

AND (Reserved check-out date 2834 acquired based on search condition 1)>(Expected check-in date 2836).

The pieces of check-out reservation information 2831 acquired based on search conditions 2 are assumed to be sorted in ascending order of expected check-in date 2836. In this case, the last one of the acquired records 2839 has the largest expected check-in date 2836. Hence, the expected check-in date 2836 of the last record 2839 is the expected check-in date of the previous check-out reservation information corresponding to the same document as that of the record 2855 of the reservation flow configuration information of the current processing target. The expected check-in date 2836 is temporarily stored as a "previous reservation expected check-in date". The process advances to step S4909.

If no record satisfying search conditions 2 exists, no "previous reservation expected check-in date" is found, and the process advances to step S4909.

In step S4909, it is determined by using the following information whether the reserved check-out date and expected check-in date of the check-out reservation information in the reservation flow are allowed to be advanced.

As the information, the "number of dates advanced to perform check-out operation" transferred at the start of the sequence, the "current reserved check-out date" acquired in step S4908, the "previous flow expected check-in date" acquired in step S4907, and the "previous reservation expected check-in date" acquired in step S4908 are used.

Whether the dates are allowed to be advanced is determined by calculating the "number of dates allowed to be advanced". If the number of dates allowed to be advanced is one or more, it is determined that the dates are allowed to be advanced.

The "number of dates allowed to be advanced" is calculated in the following way.

Equation 1 to calculate the number of dates allowed to be advanced:

(Number of dates allowed to be advanced)=((Current reservation reserved check-out date)−(previous flow expected check-in date)).

The date difference is calculated based on the above equation. When the value is negative, the number of dates is "0".

Equation 2 to calculate the number of dates allowed to be advanced:

(Number of dates allowed to be advanced)=((Current reservation reserved check-out date)−(previous reservation expected check-in date)).

The date difference is calculated based on the above equation. When the value is negative, the number of dates is "0".

If no "previous reservation expected check-in date" is found in step S4908, the date difference is regarded to be equal to the "number of dates advanced to perform check-out operation".

The difference dates obtained by "equation 1 to calculate the number of dates allowed to be advanced", "equation 2 to calculate the number of dates allowed to be advanced", and the "number of dates advanced to perform check-out operation" are compared. The smallest number of dates is determined as the "number of dates allowed to be advanced".

If the "number of dates allowed to be advanced" obtained in the above-described way is one or more, the dates are allowed to be advanced. The process advances to step S4910. If the "number of dates allowed to be advanced" is less than one, the dates are not allowed to be advanced. The process advances to step S4911.

In step S4910, the reservation ID 2854 is acquired from the record 2855 to be processed. The check-out information operation unit 2704 is instructed to acquire the check-out reservation information 2831 that satisfies the following condition.

Search Condition:

Reservation ID 2854=Reservation ID 2832.

When the record 2839 that satisfies the condition is acquired, the reserved check-out date and expected check-in date are advanced by the "number of dates allowed to be advanced", thereby updating the record 2839.

In step S4911, if a record next to the remaining record 2855 that is not discarded in step S4905 remains, the process returns to step S4907 to repeat the processing. If no record remains, the sequence is ended.

(Example of Check-In Actual Processing in Document Management Apparatus 101)

FIG. 50 is a flowchart illustrating an example of a procedure of check-in actual processing by the document management apparatus 101 shown in FIG. 1.

The processing in FIG. 50 is activated in the check-in actual processing sequence in FIG. 48. FIG. 50 illustrates the sequence of document check-in actual processing executed by the document check-in processing control unit 2712 of the document management apparatus 101. The CPU 201 in FIG. 2 executes this processing.

Data necessary for this processing are the document ID of the check-out target, a registered document file designated on the input screen, and the user ID of the user who is executing this operation.

As shown in FIG. 50, in step S5001, the check-out information 2821 that satisfies the following search condition is searched for and acquired.

Search Condition:

Document ID 2822=input data "Document ID".

When the information acquisition processing based on the search condition is ended, the process advances to step S5002.

In step S5002, it is determined whether the check-out information 2821 acquired in step S5001 has a record. If the document is currently on checked-out, a corresponding record should exist. If a record exists, the process advances to step S5003. If no record exist, an error occurs, and the process advances to step S5008. In step S5003, it is checked whether the checking-out user ID 2824 of the record of the check-out information 2821 acquired in step S5001 coincides with the user ID of the user who is executing the operation, which is given as the input data. If the user IDs are different, an error occurs due to illicit check-in access, and the process advances to step S5008. If the user IDs coincide with each other, the process advances to step S5004. In step S5004, it is confirmed whether the registered file given as the input data exists. If the document file does not exist, an error occurs, and the process advances to step S5008. If the file exists, the process advances to step S5005.

In step S5005, the version of the designated document is added as the check-in processing. First, the check-out information operation unit 2704 acquires the version number of the latest version from version information stored in the check-out information storage unit 2703 by using, as a key, the document ID of the input data. The value of the latest version is incremented to obtain the version number of the new version, thereby creating a new record of the version information 2811.

For the new record, the following pieces of information are designated. The document ID of the input data is designated as the document ID 2812. The new version number obtained by the increment is designated as the version ID 2813. The process executing date is designated as the registered date 2814. The operating user ID of the input data is designated as the registering user ID 2815. The registered document file of the input data is designated as the file content 2816. The document check-in processing control unit 2712 controls so that the document information operation unit 2702 executes a new version adding operation to newly register the record created by the above data in the document information storage unit 2701. When version information record registration is ended, the process advances to step S5006.

In step S5006, pieces of associated information are updated in accordance with the version addition. First, the document check-in processing control unit 2712 controls so that the check-out information operation unit 2704 executes an information deletion operation to delete the record acquired in step S5001 from the check-out information storage unit 2703. Next, the document information operation unit 2702 executes a document information acquisition operation to acquire, from the document information storage unit 2701, a record of the document information 2801 matching the document ID of the input data. The value of the status 2804 of the acquired record is changed to "normal". The document check-in processing control unit 2712 controls so that the document information operation unit 2702 executes a document information update operation to update the record of the same document ID in the document information storage unit 2701. When the update processing in this step is ended, the process advances to step S5007.

In step S5007, the update operations executed in steps S5005 and S5006 are determined. When the information determination processing is ended, the processing is ended.

In step S5008, the processing of the error that has occurred in each step is executed. The processing activation source is notified of the error, and the processing is ended.

The arrangements of the apparatuses, the formats of information, and the procedures of flowcharts described in the embodiments are merely examples to implement the present invention. Changes and modifications which can be made are also incorporated in the present invention.

The present invention is also applicable to a system or integrated apparatus including a plurality of devices (for example, host computer, interface device, and printer) or an apparatus including a single device.

The object of the present invention is achieved even by supplying a storage medium (or recording medium) which records software program codes for implementing the functions of the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

The functions of the above-described embodiments are implemented not only by causing the computer to execute the readout program codes. The functions of the above-described embodiments are also implemented when the operating system (OS) running on the computer partially or wholly executes actual processing based on the instructions of the program codes.

The program codes read out from the storage medium are written in the memory of a function expansion card inserted into the computer or a function expansion unit connected to the computer. Then, the CPU of the function expansion card or function expansion unit partially or wholly executes actual processing based on the instructions of the program codes. The functions of the above-described embodiments are also implemented by such processing.

When the present invention is applied to the storage medium, the storage medium stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-168083, filed on Jun. 26, 2007, which is hereby incorporated by reference herein in its entirety.

What is claimed is:

1. A document management apparatus for storing, as a shared document in a storage unit, an electronic file accessible by a plurality of users via a network and managing the electronic file, comprising:
   a check-out start date reservation unit adapted to reserve, as a check-out start date, a start date of check-out processing of setting a shared document into an exclusive state based on an instruction by a user of the plurality of users, wherein in the exclusive state, the shared document can be updated by the user but cannot be updated by other users;
   a check-out unit adapted to set the shared document for which the check-out start date had been reserved into the exclusive state when current date has reached the check-out start date;
   a check-in unit adapted to release the shared document from the exclusive state in response to an instruction of the user checking-out the shared document; and
   a check-out start date change unit adapted to, when the shared document set into the exclusive state has been released from the exclusive state, automatically change a succeeding reserved check-out start date closest to the expected check-in date in all check-out start dates reserved for the shared document to a date immediately after the date on which the shared document has been released from the exclusive state.

2. The apparatus according to claim 1, wherein said check-out start date reservation unit comprises an expected check-in date reservation unit adapted to reserve an expected check-in date after the check-out start date to cause said check-in unit to release the shared document from the exclusive state.

3. The apparatus according to claim 2, wherein said check-out start date reservation unit further comprises:
   a comparison unit adapted to compare an expected check-out period from the check-out start date to the expected check-in date of the shared document with an expected check-out period already designated for the shared document by another user; and
   a determination unit adapted to determine that the reservation of the check-out start date and the expected check-in date has an error when the expected check-out periods overlap based on a result of comparison by said comparison unit.

4. The apparatus according to claim 3, wherein said check-out unit further comprises a check-out start unit adapted to set the shared document for which a checkout instruction is received from the user into the exclusive state, when a check-out period of the checkout instruction does not overlap the expected check-out period already designated for the shared document by another user upon receiving the check-out instruction from the user without reservation of the check-out start date.

5. The apparatus according to claim 2, further comprising an instruction unit adapted to instruct a terminal to display all expected check-out periods from check-out start dates to expected check-in dates reserved for the shared document.

6. The apparatus according to claim 2, further comprising a canceling unit adapted to cancel information of the check-out start date and the expected check-in date reserved for the shared document.

7. The apparatus according to claim 2, further comprising a group management unit adapted to create a check-out reservation group including at least two expected check-out periods each represented by a pair of a check-out start date and an expected check-in date designated for the shared document by a user, and manage the created check-out reservation group.

8. The apparatus according to claim 7, wherein said group management unit manages to allow each user to have at least two check-out reservation groups.

9. The apparatus according to claim 7, wherein said group management unit comprises an expected check-out period checking unit adapted to prevent overlap of the expected check-out periods belonging to a check-out reservation group.

10. The apparatus according to claim 7, wherein said group management unit comprises a first expected checkout period change unit adapted to, when check-in has done before an expected check-in date in a check-out reservation group, change the expected period of succeeding expected check-out without overlap of the expected check-out periods belonging to the check-out reservation group.

11. The apparatus according to claim 7, wherein said group management unit further comprises:
   an insertion unit adapted to insert an expected check-out for the shared document in a desired order of the check-out reservation group; and
   a reserved check-out canceling unit adapted to cancel an expected check-out for the shared document from the check-out reservation group.

12. The apparatus according to claim 11, wherein said insertion unit comprises a determination unit adapted to determine, before inserting the expected check-out for the shared document, whether insertion of the expected check-out is possible based on the expected check-out periods.

13. The apparatus according to claim 11, wherein said group management unit further comprises a second expected check-out period change unit adapted to change the expected check-out period of succeeding expected check-out after said reserved check-out canceling unit has cancelled the expected check-out for the shared document.

14. The apparatus according to claim 1, further comprising a selection unit adapted to select whether or not to cause said check-out start date change unit to change the succeeding reserved check-out start date in correspondence with a designation from the user in designating the check-out start date of the shared document.

15. A document management system including at least one client apparatus and a document management apparatus for storing, as a shared document in a storage unit, an electronic file accessible from the client apparatus by a plurality of users via a network and managing the electronic file, comprising:
   a check-out start date reservation unit adapted to reserve, as a check-out start date, a start date of check-out processing of setting a shared document into an exclusive state based on an instruction by a user of the plurality of users, wherein in the exclusive state, the shared document can be updated by the user but cannot be updated by other users;

a check-out unit adapted to set the shared document for which the check-out start date is reserved into the exclusive state when current date has reached the check-out start date;

a check-in unit adapted to release the shared document from the exclusive state in response to an instruction of the user checking-out the shared document; and a check-out start date change unit adapted to, when the shared document set into the exclusive state has been released from the exclusive state, automatically change a succeeding reserved check-out start date closest to the expected check-in date in all check-out start dates reserved for the shared document to a date immediately after the date on which the shared document has been released from the exclusive state.

16. A document management method of storing, as a shared document in a storage unit, an electronic file accessible by a plurality of users via a network and managing the electronic file, comprising:

a reservation step of reserving, as a check-out start date, a start date of check-out processing of setting a shared document into an exclusive state based on an instruction by a user of the plurality of users, wherein in the exclusive state, the shared document can be updated by the user but cannot be updated by other users;

a check-out step of setting the shared document for which the check-out start date is reserved into the exclusive state when current date has reached the check-out start date;

a check-in step releasing the shared document from the exclusive state in response to an instruction of the user checking-out the shared document; and a check-out start date change step of, when the shared document set into the exclusive state has been released from the exclusive state, automatically changing a succeeding reserved check-out start date closest to the expected check-in date in all check-out start dates reserved for the shared document to a date immediately after the date on which the shared document has been released from the exclusive state.

17. The method according to claim 16, wherein said reservation step comprises the step of reserving an expected check-in date after the check-out start date to release the shared document from the exclusive state in said check-in step.

18. The method according to claim 17, wherein said reservation step further comprises:

a comparison step of comparing an expected checkout period from the check-out start date to the expected check-in date of the shared document with an expected check-out period already designated for the shared document by another user; and a determination step of determining that the reservation of the check-out start date and expected check-in date has an error when the expected check-out periods overlap based on a result of comparison in said comparison step.

19. The method according to claim 17, further comprising a management step of creating a check-out reservation group including at least two expected check-out periods each represented by a pair of a check-out start date and an expected check-in date designated for the shared document by a user.

20. A non-transitory computer-readable storage medium storing a computer program that, when executed by a computer causes the computer to execute a document management method comprising:

a reservation step of reserving, as a check-out start date, a start date of check-out processing of setting a shared document into an exclusive state based on an instruction by a user of the plurality of users, wherein in the exclusive state, the shared document can be updated by the user but cannot be updated by other users;

a check-out step of setting the shared document for which the check-out start date is reserved into the exclusive state when current date has reached the check-out start date;

a check-in step releasing the shared document from the exclusive state in response to an instruction of the user checking-out the shared document; and a check-out start date change step of, when the shared document set into the exclusive state has been released from the exclusive state, automatically changing a succeeding reserved check-out start date closest to the expected check-in date in all check-out start dates reserved for the shared document to a date immediately after the date on which the shared document has been released from the exclusive state.

* * * * *